(12) United States Patent
Ross et al.

(10) Patent No.: US 10,843,250 B2
(45) Date of Patent: Nov. 24, 2020

(54) SMART INSTALLATION/PROCESSING SYSTEMS, COMPONENTS, AND METHODS OF OPERATING THE SAME

(71) Applicant: FATIGUE TECHNOLOGY, INC., Seattle, WA (US)

(72) Inventors: James Ryunoshin Ross, Seattle, WA (US); Timothy Howard Johnson, Seattle, WA (US); Doug R. Bakken, Seattle, WA (US); Kevin J. Dooley, Issaquah, WA (US)

(73) Assignee: FATIGUE TECHNOLOGY, INC., Seattle, WA (US)

( * ) Notice: Subject to any disclaimer, the term of this patent is extended or adjusted under 35 U.S.C. 154(b) by 0 days.

(21) Appl. No.: 16/183,504

(22) Filed: Nov. 7, 2018

(65) Prior Publication Data

US 2019/0070654 A1    Mar. 7, 2019

Related U.S. Application Data

(63) Continuation of application No. 13/750,604, filed on Jan. 25, 2013, now Pat. No. 10,130,985.
(Continued)

(51) Int. Cl.
*B21D 31/04* (2006.01)
*B29C 67/00* (2017.01)
(Continued)

(52) U.S. Cl.
CPC .............. *B21D 31/04* (2013.01); *B23P 9/025* (2013.01); *B23P 11/005* (2013.01); *B29C 67/00* (2013.01);
(Continued)

(58) Field of Classification Search
None
See application file for complete search history.

(56) References Cited

U.S. PATENT DOCUMENTS

| 295,593 A | 3/1884 | Thayer |
|---|---|---|
| 810,430 A | 1/1906 | Pfluger et al. |

(Continued)

FOREIGN PATENT DOCUMENTS

| AU | 2007204888 B2 | 7/2007 |
|---|---|---|
| BR | PI0706509-4 A2 | 3/2011 |

(Continued)

OTHER PUBLICATIONS

Merriam Webster's Collegiate Dictionary, Tenth Edition, 1997, p. 154.
(Continued)

*Primary Examiner* — Jason Lin
(74) *Attorney, Agent, or Firm* — Cozen O'Connor

(57) ABSTRACT

A processing system employs a processing tool to process workpieces, for example cold working holes and/or installing expandable members into holes. Sensors sense various aspects of the processing. Information regarding performance of the process and/or materials may be stored, for example a hole-by-hole or a workpiece-by-workpiece basis, allowing validation of processing. Information also allows dynamic operation of the processing tool. Analysis of response relationships (e.g., pressure or force versus position or distance) may provide insights into the process and materials, and/or facilitate the real-time feedback including control, alerts, ordering replacement for consumable components.

32 Claims, 31 Drawing Sheets

Related U.S. Application Data

(60) Provisional application No. 61/592,500, filed on Jan. 30, 2012.

(51) Int. Cl.
| | |
|---|---|
| G01B 13/10 | (2006.01) |
| C21D 7/02 | (2006.01) |
| B23P 9/02 | (2006.01) |
| B23P 11/00 | (2006.01) |
| G05B 19/00 | (2006.01) |
| G05B 19/418 | (2006.01) |

(52) U.S. Cl.
CPC ............... *C21D 7/02* (2013.01); *G01B 13/10* (2013.01); *G05B 19/00* (2013.01); *G05B 19/41815* (2013.01); *Y02P 90/08* (2015.11)

(56) References Cited

U.S. PATENT DOCUMENTS

| | | |
|---|---|---|
| 1,081,496 A | 12/1913 | Gillmor |
| 1,106,964 A | 8/1914 | Pahler |
| 1,226,090 A | 5/1917 | Ludlum |
| 1,297,142 A | 3/1919 | Gibbons |
| 1,480,298 A | 1/1924 | Pearson |
| 1,881,867 A | 10/1932 | Nelson |
| 1,979,686 A | 11/1934 | Hall et al. |
| 2,092,358 A | 9/1937 | Robertson |
| 2,146,461 A | 2/1939 | Bettington |
| 2,150,361 A | 3/1939 | Chobert |
| 2,188,596 A | 1/1940 | Hobert |
| 2,275,451 A | 3/1942 | Maxwell |
| 2,282,711 A | 5/1942 | Eklund |
| 2,357,123 A | 8/1944 | Maxwell |
| 2,385,294 A | 9/1945 | Lowy |
| 2,405,399 A | 8/1946 | Bugg et al. |
| 2,430,554 A | 11/1947 | Bugg et al. |
| 2,433,425 A | 12/1947 | Burckle |
| 2,468,985 A | 5/1949 | Krotz |
| 2,501,567 A | 3/1950 | Huck |
| 2,528,180 A | 10/1950 | Roehl |
| 2,538,623 A | 1/1951 | Keating |
| 2,583,719 A | 1/1952 | White |
| 2,608,751 A | 9/1952 | Hutton |
| 2,661,182 A | 12/1953 | Kipp |
| 2,672,175 A | 3/1954 | Howard |
| 2,695,446 A | 11/1954 | Meyer |
| 2,700,172 A | 1/1955 | Rohe |
| 2,808,643 A | 10/1957 | Weatherhead, Jr. |
| 2,887,003 A | 5/1959 | Brilmyer |
| 2,943,667 A | 7/1960 | Ewing et al. |
| 3,107,572 A | 10/1963 | Orloff |
| 3,128,999 A | 4/1964 | Schmitt |
| 3,129,630 A | 4/1964 | Wing et al. |
| 3,137,887 A | 6/1964 | Mannino et al. |
| 3,149,860 A | 9/1964 | Hallesy |
| 3,164,054 A | 1/1965 | Biesecker |
| 3,222,977 A | 12/1965 | Vaughn |
| 3,244,034 A | 4/1966 | Severdia |
| 3,252,493 A | 5/1966 | Smith |
| 3,262,353 A | 7/1966 | Waeltz et al. |
| 3,290,770 A | 12/1966 | Silverman et al. |
| 3,345,730 A | 10/1967 | Laverty |
| 3,358,492 A | 12/1967 | Richter |
| 3,377,907 A | 4/1968 | Hurd |
| 3,399,435 A | 9/1968 | Ackerman |
| 3,434,746 A | 3/1969 | Watts |
| 3,443,474 A | 5/1969 | Blakeley et al. |
| 3,498,648 A | 3/1970 | Hallesy |
| 3,537,163 A | 11/1970 | Steidl |
| 3,566,662 A | 3/1971 | Champoux |
| 3,578,367 A | 5/1971 | Harvill et al. |
| 3,596,948 A | 8/1971 | Spoehr |
| 3,601,771 A | 8/1971 | Dozier |
| 3,643,544 A | 2/1972 | Massa |
| 3,646,982 A | 3/1972 | Cushman |
| 3,657,956 A | 4/1972 | Bradley et al. |
| 3,674,292 A | 7/1972 | Demler, Sr. |
| 3,677,684 A | 7/1972 | Platz |
| 3,678,535 A | 7/1972 | Charles |
| 3,693,247 A | 9/1972 | Brown |
| 3,695,324 A | 10/1972 | Gulistan |
| 3,763,541 A | 10/1973 | Jaffe |
| 3,765,078 A | 10/1973 | Gulistan |
| 3,778,090 A | 12/1973 | Tobin |
| 3,787,945 A | 1/1974 | Pasek et al. |
| 3,820,297 A | 6/1974 | Hurd |
| 3,835,525 A | 9/1974 | King, Jr. |
| 3,835,688 A | 9/1974 | King, Jr. |
| 3,837,208 A | 9/1974 | Davis et al. |
| 3,875,649 A | 4/1975 | King, Jr. |
| 3,878,760 A | 4/1975 | Jeal et al. |
| 3,879,980 A | 4/1975 | King, Jr. |
| 3,888,102 A | 6/1975 | Nigido |
| 3,892,121 A | 7/1975 | Champoux et al. |
| 3,895,409 A | 7/1975 | Kwatonowski |
| 3,915,052 A | 10/1975 | Ruhl |
| 3,934,325 A | 1/1976 | Jaffe |
| 3,943,748 A | 3/1976 | King, Jr. |
| 3,949,535 A | 4/1976 | King, Jr. |
| 3,997,193 A | 12/1976 | Tsuda et al. |
| 4,003,288 A | 1/1977 | Jeal |
| 4,044,591 A | 8/1977 | Powderley |
| 4,089,247 A | 5/1978 | Dahl et al. |
| 4,142,439 A | 3/1979 | Landt |
| 4,143,580 A | 3/1979 | Luhm |
| 4,157,675 A | 6/1979 | King, Jr. |
| 4,164,807 A | 8/1979 | King, Jr. |
| 4,168,650 A | 9/1979 | Dahl et al. |
| 4,186,787 A | 2/1980 | Husain |
| 4,187,708 A | 2/1980 | Champoux |
| 4,230,017 A | 10/1980 | Angelosanto |
| 4,237,768 A | 12/1980 | Volkmann |
| 4,249,786 A | 2/1981 | Mahoff |
| 4,279,079 A | 7/1981 | Gamberini et al. |
| 4,295,691 A | 10/1981 | Rubenthaler |
| 4,295,766 A | 10/1981 | Shaw |
| 4,306,455 A | 12/1981 | Selleri |
| 4,348,814 A | 9/1982 | Possati et al. |
| 4,355,612 A | 10/1982 | Luksch |
| 4,364,697 A | 12/1982 | Binns |
| 4,370,081 A | 1/1983 | Briles |
| 4,371,154 A | 2/1983 | Winbigler |
| 4,386,515 A | 6/1983 | Starke |
| 4,397,061 A | 8/1983 | Kanzaka |
| 4,405,256 A | 9/1983 | King, Jr. |
| 4,423,619 A | 1/1984 | Champoux |
| 4,425,780 A | 1/1984 | Champoux |
| 4,447,944 A | 5/1984 | Mohrman |
| 4,457,652 A | 7/1984 | Pratt |
| 4,471,643 A | 9/1984 | Champoux et al. |
| 4,482,089 A | 11/1984 | Lindahl et al. |
| 4,491,358 A | 1/1985 | Choung |
| 4,494,398 A | 1/1985 | Svoboda |
| 4,522,378 A | 6/1985 | Nelson |
| 4,524,600 A | 6/1985 | Champoux et al. |
| 4,530,527 A | 7/1985 | Holmberg |
| 4,557,003 A | 12/1985 | Jones |
| 4,557,033 A * | 12/1985 | Champoux .............. B23P 9/025 29/525 |
| 4,557,650 A | 12/1985 | Molina |
| 4,579,491 A | 4/1986 | Kull |
| 4,583,388 A | 4/1986 | Hogenhout |
| 4,595,324 A | 6/1986 | Sadri |
| 4,597,282 A | 7/1986 | Hogenhout |
| 4,609,315 A | 9/1986 | Briles |
| 4,627,775 A | 12/1986 | Dixon |
| 4,640,479 A | 2/1987 | Shely et al. |
| 4,659,271 A | 4/1987 | Pratt et al. |
| 4,659,272 A | 4/1987 | Pratt |
| 4,665,732 A | 5/1987 | Hogenhout |
| 4,678,384 A | 7/1987 | Sparling et al. |
| 4,699,212 A | 10/1987 | Andersson et al. |
| 4,699,552 A | 10/1987 | Jeal |

(56) References Cited

U.S. PATENT DOCUMENTS

| | | | |
|---|---|---|---|
| 4,702,655 A | 10/1987 | Kendall | |
| 4,732,518 A | 3/1988 | Toosky | |
| 4,752,169 A | 6/1988 | Pratt | |
| 4,755,904 A | 7/1988 | Brick | |
| 4,759,237 A | 7/1988 | Fauchet et al. | |
| 4,779,445 A | 10/1988 | Rabe | |
| 4,787,793 A | 11/1988 | Harris | |
| 4,809,420 A | 3/1989 | Landy et al. | |
| 4,832,548 A | 5/1989 | Strobel | |
| 4,869,091 A | 9/1989 | Shemeta | |
| 4,872,332 A | 10/1989 | Potzas | |
| 4,877,363 A | 10/1989 | Williamson et al. | |
| 4,885,829 A | 12/1989 | Landy | |
| 4,900,205 A | 2/1990 | Sadri | |
| 4,905,766 A | 3/1990 | Dietz et al. | |
| 4,907,345 A | 3/1990 | Dall'Aglio et al. | |
| 4,934,038 A | 6/1990 | Caudill | |
| 4,934,170 A | 6/1990 | Easterbrook et al. | |
| 4,950,115 A | 8/1990 | Sadri | |
| 4,967,463 A | 11/1990 | Pratt | |
| 4,985,979 A | 1/1991 | Speakman | |
| 4,999,896 A | 3/1991 | Mangus et al. | |
| 5,007,153 A * | 4/1991 | Junkers | B25B 21/005 29/407.02 |
| 5,025,128 A | 6/1991 | Derbyshire | |
| 5,038,596 A | 8/1991 | Noonan et al. | |
| 5,006,179 A | 11/1991 | Pratt | |
| 5,069,586 A | 12/1991 | Casey | |
| 5,083,363 A | 1/1992 | Ransom et al. | |
| 5,093,957 A | 3/1992 | Do | |
| 5,096,349 A | 3/1992 | Landy et al. | |
| 5,103,548 A | 4/1992 | Reid et al. | |
| 5,110,163 A | 5/1992 | Benson et al. | |
| 5,123,792 A | 6/1992 | Strobel | |
| 5,127,254 A | 7/1992 | Copple et al. | |
| 5,129,253 A | 7/1992 | Austin et al. | |
| 5,178,502 A | 1/1993 | Sadri | |
| 5,207,461 A | 5/1993 | Lasko | |
| 5,213,460 A | 5/1993 | Sadri et al. | |
| 5,218,854 A | 6/1993 | Jarzebowicz et al. | |
| 5,238,342 A | 8/1993 | Stencel | |
| 5,245,743 A | 9/1993 | Landy et al. | |
| 5,253,773 A | 10/1993 | Choma et al. | |
| 5,256,017 A | 10/1993 | Smirnov et al. | |
| 5,305,627 A | 4/1994 | Quincey et al. | |
| 5,341,559 A | 8/1994 | Reid et al. | |
| 5,350,266 A | 9/1994 | Espey et al. | |
| 5,380,111 A | 1/1995 | Westrom | |
| 5,380,136 A | 1/1995 | Copple et al. | |
| 5,390,808 A | 2/1995 | Choma et al. | |
| 5,399,052 A | 3/1995 | Volkmann et al. | |
| 5,405,228 A | 4/1995 | Reid et al. | |
| 5,433,100 A | 7/1995 | Easterbrook et al. | |
| 5,466,016 A | 11/1995 | Briody et al. | |
| 5,468,104 A | 11/1995 | Reid et al. | |
| 5,478,122 A | 12/1995 | Seabra | |
| 5,496,140 A | 3/1996 | Gossmann et al. | |
| 5,498,110 A | 3/1996 | Stencel et al. | |
| 5,607,194 A | 3/1997 | Ridenour | |
| 5,609,434 A | 3/1997 | Yehezkieli et al. | |
| 5,615,474 A * | 4/1997 | Kellner | G05B 19/41815 29/703 |
| 5,632,582 A | 5/1997 | Gauron | |
| 5,634,751 A | 6/1997 | Stencel et al. | |
| 5,666,710 A * | 9/1997 | Weber | B21J 15/105 227/2 |
| 5,702,215 A | 12/1997 | Li | |
| 5,713,611 A | 2/1998 | Kurimoto et al. | |
| 5,722,312 A | 3/1998 | Kristensen | |
| 5,806,173 A | 9/1998 | Honma et al. | |
| 5,813,808 A | 9/1998 | Wu | |
| 5,816,761 A | 10/1998 | Cassatt et al. | |
| 5,860,213 A | 1/1999 | Knudson | |
| 5,885,318 A | 3/1999 | Shimizu et al. | |
| 5,943,898 A | 8/1999 | Kuo | |
| 5,947,326 A | 9/1999 | O'Hern et al. | |
| 5,947,667 A | 9/1999 | Cassatt et al. | |
| 6,036,418 A | 3/2000 | Stencel et al. | |
| 6,058,562 A | 5/2000 | Satou et al. | |
| 6,077,009 A | 6/2000 | Hazelman | |
| 6,077,010 A | 6/2000 | Reid et al. | |
| 6,092,275 A | 7/2000 | Kellner et al. | |
| 6,131,964 A | 10/2000 | Sareshwala | |
| 6,183,180 B1 | 2/2001 | Copple et al. | |
| 6,217,082 B1 | 4/2001 | Orcutt et al. | |
| 6,266,991 B1 | 7/2001 | Kuo | |
| 6,289,577 B1 | 9/2001 | Tanaka et al. | |
| 6,325,582 B1 | 12/2001 | Sadri et al. | |
| 6,328,513 B1 | 12/2001 | Niwa et al. | |
| 6,347,663 B1 | 2/2002 | Hunzinger et al. | |
| 6,370,786 B2 | 4/2002 | Ishii | |
| 6,430,461 B1 * | 8/2002 | Andorfer | B21B 37/00 700/148 |
| 6,487,767 B1 | 12/2002 | Reid et al. | |
| 6,488,460 B1 | 12/2002 | Smith et al. | |
| 6,490,805 B1 | 12/2002 | Forschler et al. | |
| 6,499,926 B2 | 12/2002 | Keener | |
| 6,537,005 B1 | 3/2003 | Denham | |
| 6,623,048 B2 | 9/2003 | Castel et al. | |
| 6,651,301 B1 | 11/2003 | Liu | |
| 6,705,149 B2 | 3/2004 | Cobzaru et al. | |
| 6,761,380 B2 | 7/2004 | Pachciarz et al. | |
| 6,773,039 B2 | 8/2004 | Muenster et al. | |
| 6,792,657 B2 | 9/2004 | Reid et al. | |
| 6,796,765 B2 | 9/2004 | Kosel et al. | |
| 6,826,820 B2 | 12/2004 | Denham et al. | |
| 6,901,797 B2 | 6/2005 | Hyatt et al. | |
| RE38,788 E | 9/2005 | Satou et al. | |
| 6,990,722 B2 | 1/2006 | Reid et al. | |
| 7,024,747 B2 * | 4/2006 | Easterbrook | B23P 9/025 29/446 |
| 7,024,908 B2 | 4/2006 | Poast et al. | |
| 7,024,909 B2 | 4/2006 | Cobzaru et al. | |
| 7,047,596 B2 | 5/2006 | Sucic et al. | |
| 7,059,816 B2 | 6/2006 | Toosky | |
| 7,100,264 B2 | 9/2006 | Skinner et al. | |
| 7,127,792 B2 | 10/2006 | Wakamori et al. | |
| 7,156,051 B2 | 1/2007 | Lorton et al. | |
| 7,273,338 B2 | 9/2007 | Summerlin | |
| 7,303,366 B2 | 12/2007 | Smith | |
| 7,325,796 B2 | 2/2008 | Moreland | |
| 7,375,277 B1 | 5/2008 | Skinner et al. | |
| 7,406,777 B2 | 8/2008 | Grover et al. | |
| 7,448,652 B2 | 11/2008 | Poast et al. | |
| 7,509,829 B2 | 3/2009 | Johnson | |
| 7,575,404 B2 | 8/2009 | Toosky et al. | |
| 7,617,712 B2 | 11/2009 | Glenn | |
| 7,641,430 B2 | 1/2010 | Johnson et al. | |
| 7,695,226 B2 | 4/2010 | March et al. | |
| 7,926,318 B2 | 4/2011 | Glenn | |
| 7,926,319 B2 | 4/2011 | Johnson | |
| 7,946,628 B2 | 5/2011 | Poast et al. | |
| 8,061,178 B2 | 11/2011 | Glenn | |
| 8,069,699 B2 | 12/2011 | Glenn et al. | |
| 8,117,885 B2 | 2/2012 | Glenn | |
| 8,191,395 B2 | 6/2012 | Glenn | |
| 8,297,897 B2 | 10/2012 | Auriol et al. | |
| 8,312,606 B2 | 11/2012 | Reid et al. | |
| 8,322,015 B2 | 12/2012 | Pratt et al. | |
| 8,348,566 B2 | 1/2013 | Pratt | |
| 8,353,193 B2 | 1/2013 | Johnson | |
| 8,387,436 B2 | 3/2013 | Glenn | |
| 8,402,806 B2 | 3/2013 | Glenn et al. | |
| 8,464,434 B1 | 6/2013 | Kostenick et al. | |
| 8,506,222 B2 | 8/2013 | Reid et al. | |
| 9,199,300 B2 * | 12/2015 | Buss | B21J 15/041 |
| 2003/0110618 A1 | 6/2003 | Magnuson | |
| 2003/0133771 A1 | 7/2003 | Dohm | |
| 2003/0221789 A1 | 12/2003 | Dods | |
| 2004/0111864 A1 | 6/2004 | Skinner et al. | |
| 2004/0213492 A1 | 10/2004 | Kim et al. | |
| 2006/0045649 A1 | 3/2006 | Johnson et al. | |
| 2006/0251490 A1 | 11/2006 | Kleinman et al. | |
| 2007/0110541 A1 | 5/2007 | Rawlins et al. | |

(56) References Cited

U.S. PATENT DOCUMENTS

| | | | |
|---|---|---|---|
| 2007/0188606 A1* | 8/2007 | Atkinson | G01S 5/163 |
| | | | 348/95 |
| 2007/0224016 A1 | 9/2007 | Toosky et al. | |
| 2007/0251494 A1 | 11/2007 | Hashizume et al. | |
| 2007/0266756 A1 | 11/2007 | Shuster et al. | |
| 2007/0289351 A1 | 12/2007 | Glenn | |
| 2008/0005887 A1 | 1/2008 | Glenn et al. | |
| 2008/0034831 A1 | 2/2008 | Glenn | |
| 2008/0066518 A1 | 3/2008 | Glenn et al. | |
| 2008/0250603 A1 | 10/2008 | Skinner et al. | |
| 2008/0319557 A1* | 12/2008 | Summers | G05B 19/4015 |
| | | | 700/19 |
| 2009/0192644 A1* | 7/2009 | Meyer | G05B 19/41805 |
| | | | 700/109 |
| 2009/0304315 A1 | 12/2009 | Johnson | |
| 2010/0000280 A1 | 1/2010 | Reid et al. | |
| 2010/0260572 A1 | 10/2010 | Wehrmeister et al. | |
| 2011/0114321 A1 | 5/2011 | Guidry et al. | |
| 2011/0150599 A1 | 6/2011 | Bakken et al. | |
| 2011/0182689 A1 | 7/2011 | Avetisian | |
| 2012/0304577 A1 | 12/2012 | Reid et al. | |
| 2012/0317787 A1 | 12/2012 | Ross et al. | |
| 2013/0071503 A1* | 3/2013 | Maksimov | B23P 9/025 |
| | | | 425/3 |
| 2013/0192331 A1 | 8/2013 | Ross et al. | |
| 2013/0200543 A1 | 8/2013 | Ross et al. | |
| 2013/0239399 A1 | 9/2013 | Reid et al. | |

FOREIGN PATENT DOCUMENTS

| | | |
|---|---|---|
| CN | 1846092 A | 10/2006 |
| DE | 2203217 | 7/1973 |
| DE | 3301849 C1 | 7/1984 |
| DE | 3545554 A1 | 7/1987 |
| DE | 8901317 U1 | 3/1989 |
| EP | 0054592 A1 | 6/1982 |
| EP | 0140516 A1 | 5/1985 |
| EP | 0248122 A2 | 12/1987 |
| EP | 0 425 292 A1 | 5/1991 |
| EP | 0 718 057 A2 | 6/1996 |
| EP | 0 738 550 A2 | 10/1996 |
| EP | 0 581 385 B1 | 5/1997 |
| EP | 0785366 A1 | 7/1997 |
| EP | 0 643 231 B1 | 12/1998 |
| EP | 0891007 A1 | 1/1999 |
| EP | 0 696 686 B1 | 7/1999 |
| EP | 0945919 B1 | 9/1999 |
| EP | 1166951 A1 | 1/2002 |
| EP | 1202458 A1 | 5/2002 |
| EP | 1525952 A1 | 4/2005 |
| EP | 1 061 276 B1 | 9/2005 |
| EP | 1611976 A1 | 1/2006 |
| EP | 1624202 A2 | 2/2006 |
| EP | 1 032 769 B1 | 5/2006 |
| EP | 1 779 964 A1 | 5/2007 |
| EP | 1 803 526 A1 | 7/2007 |
| EP | 1872895 A2 | 1/2008 |
| EP | 1903221 A2 | 3/2008 |
| EP | 1 751 432 B1 | 7/2008 |
| EP | 1 893 875 B1 | 3/2011 |
| EP | 1 280 621 B1 | 10/2011 |
| EP | 2 388 104 A1 | 11/2011 |
| EP | 2 019 739 B1 | 12/2011 |
| EP | 1 644 142 B1 | 10/2012 |
| EP | 2 568 183 A2 | 3/2013 |
| EP | 2 061 626 B1 | 4/2013 |
| EP | 1 651 365 B1 | 6/2013 |
| FR | 2645052 | 10/1990 |
| GB | 593607 | 10/1947 |
| GB | 1395009 | 5/1975 |
| GB | 2239917 A | 7/1991 |
| JP | 57137031 | 8/1982 |
| JP | 60238046 A | 11/1985 |
| JP | 61157846 | 7/1986 |
| JP | 09-072097 | 3/1997 |
| JP | 9-99334 A | 4/1997 |
| JP | 10-274366 | 10/1998 |
| JP | 10-299735 | 11/1998 |
| JP | 2001-177964 | 6/2001 |
| JP | 2004-176254 | 6/2004 |
| JP | 2007-500828 A | 1/2007 |
| JP | 2009-535218 A | 10/2009 |
| JP | 2009-535577 A | 10/2009 |
| JP | 2011-513672 A | 4/2011 |
| KR | 10-2009-0064401 A | 6/2009 |
| SU | 632463 | 11/1978 |
| WO | 1984/00120 A1 | 1/1984 |
| WO | 1987/01418 | 3/1987 |
| WO | 1991/11273 A1 | 8/1991 |
| WO | 99/27262 A1 | 6/1999 |
| WO | 2000/028221 A2 | 5/2000 |
| WO | 2002/059489 A1 | 8/2002 |
| WO | 2006/026413 A1 | 3/2006 |
| WO | 2006/132936 A1 | 12/2006 |
| WO | 2007/082077 A1 | 7/2007 |
| WO | 2007/121932 A1 | 11/2007 |
| WO | 2008/144440 A2 | 11/2008 |
| WO | 2009/052325 A1 | 4/2009 |
| WO | 2009/111745 A2 | 9/2009 |
| WO | 2010/009442 A2 | 1/2010 |
| WO | 2010/118366 A1 | 10/2010 |
| WO | 2011/084624 A2 | 7/2011 |
| WO | 2012/167136 A2 | 12/2012 |
| WO | 2012/174215 A2 | 12/2012 |
| WO | 2013/116111 A1 | 8/2013 |

OTHER PUBLICATIONS

Extended European Search Report dated Oct. 15, 2015, for Application No. 13743773.7—1709, 6 pages.
Extended European Search Report dated Jun. 16, 2017, for European Application No. 17159895.6—1709, 10 pages.

* cited by examiner

SMART INSTALLATION/PROCESSING SYSTEMS, COMPONENTS, AND METHODS OF OPERATING THE SAME

BACKGROUND

Field

This disclosure generally relates to installation/processing systems for installing expandable members into holes in workpieces and/or cold expanding holes in workpieces.

Description of the Related Art

Conventional installation tools are used to install bushings in holes within workpieces. These installation tools often have an expansion mandrel with an enlarged tapered portion used to expand the bushing. To radially expand the bushing, the expansion mandrel is inserted into an opening in the bushing. The bushing and mandrel are simultaneously inserted into a hole in a workpiece. When the bushing is positioned in the hole of the workpiece, the enlarged tapered portion of the mandrel extends outwardly from the backside of the workpiece. These types of installation tools thus require an adequate amount of backside clearance and are unsuitable for installing bushings in non-through holes, blind holes, or other holes having limited backside clearance.

To expand the bushing, the enlarged tapered portion of the mandrel is forcibly pulled axially through the opening of the bushing until an interference fit is formed between the bushing and workpiece. Unfortunately, relatively high frictional forces can be generated as the mandrel is moved through the bushing. These forces may cause the bushing to move relative to the workpiece, thus resulting in improper positioning of the installed bushing. Additionally, as the mandrel is pulled through the bushing, the outer surface of the mandrel can abrade the sidewall of the bushing's opening, thereby reducing the quality of the installed bushing.

Other installation tools use a threaded installation member to install a partially collapsible fastener element. The partially collapsible fastener element is inserted into a through hole in a workpiece until a first flange at a trailing end of the fastener element is in contact with a front face of the workpiece. Unfortunately, a collapsible portion of the fastener element has to extend outwardly from the backside of the workpiece, thus requiring a through hole having sufficient backside clearance.

Once the fastener element is positioned in the workpiece, an externally threaded end of the threaded installation member is inserted into an opening in the fastener element from the front side of the workpiece. The installation member is threadably mated with internal threads of the fastener element such that both the installation member and fastener element extend beyond the backside of the workpiece. A tubular mandrel surrounding the installation member is moved into contact with an entrance of the opening in the fastener element. An actuator (e.g., pusher, puller) device retracts the installation member through the tubular mandrel to cause the collapsible portion (e.g., a reduced thickness wall portion) of the fastener element to collapse and form a second flange on the backside of the workpiece. The workpiece is thus sandwiched between the first and second flanges of the fastener element. Unfortunately, during this process, the actuator device is pulled against the front surface of the workpiece and may deform, mar, or otherwise degrade the front surface of the workpiece.

The tubular mandrel is moved axially into the opening of the fastener element causing radial expansion of a portion of the fastener element. The portion of the fastener element is radially expanded against the sidewall of the opening to form an interference fit. During this expansion process, the mandrel directly contacts and slides against the fastener element and, consequently, can undesirably abrade and damage the surface of the fastener element.

Consequently, conventional installation tools may not adequately meet certain quality and installation needs.

BRIEF SUMMARY

Observation has made apparent that human operators often lack the attention, training or desire to correctly operate processing tools. Such is particularly true when required to complete highly repetitive tasks such as installing large numbers of expandable members (e.g., fasteners) in holes in a workpiece (e.g., fuselage, wings).

Typically, human operators employ manually operated handheld tools to install various types of expandable members in pre-formed holes in the workpieces. Holes may be spaced relatively close together (e.g., an inch part). There may be hundreds, thousands, or even more holes in any given workpiece. Thus, multiple human operators and multiple tools may be employed on any given workpiece.

Applicants have observed that certain manufacturing techniques have essentially not changed over many decades. For example, cold working of areas surrounding holes in workpieces via radial expansion has been performed since the late 1960s. During the ensuing decades, radial expansion has employed fixed parameters.

Also, applicants have observed that often a relatively high degree of variation exists between at least some characteristics or parameters of different materials, even when such materials are nominally supposed to have identical characteristics. For example, characteristics such as yield strength and/or some dimension may vary from piece to piece, even where each piece is from a same lot or shipment from a single manufacturer or supplier. This variation may have an unfavorable effect on processing of holes and/or installation of members therein, such a cold working installation of expandable members.

Holes are typically of various different dimensions and/or sizes. Applicants have observed that holes may, or may not, be correctly dimensioned or sized to within some specified or desired manufacturing tolerance of a nominal dimension or size. Such may be extremely difficult, if not impossible to visually discern without aid of a dimensioning or measurement tool.

Applicants have also observed that in order to account for variations in materials and performance of tools and/or users or operators of those tools, often manufacturing tolerance may be higher or tighter than might otherwise be possible. Such drives up costs.

Conventional approaches make it difficult to achieve a desired level of manufacturing quality in installation or production. Conventional approaches fail to employ real time feedback to conform various tool operating parameters to the real world circumstances, including deviations from nominal specifications. Conventional approaches also make it difficult to account for or document that an installation or production has achieved the desired level of manufacturing quality.

Automation of tracking of processing operations and sensed conditions may provide numerous benefits. For example, such may allow a record to be created of every installation, for example on a hole-by-hole basis, or workpiece-by-workpiece basis. Such can be used to demonstrate that, for example, cold working has been performed, and even that an acceptable level of cold working has been achieved. Such not only documents the process, but provides proof of performance and even allows assessment of quality of performance.

The tracking may allow higher quality assurance and a consequent loosening in acceptable manufacturing tolerances. For example, such may allow tolerance of holes to be loosened from for example 0.001 inch to 0.002 inch. Such may in turn reduce production costs, and parts costs.

Tracking may also allow identification of problems in the manufacturing process, including process protocol, early identification out of compliance materials, and even identification of individual performance or other training issues. Such may also be used to separate variation in user or operator performance from variation in materials and/or tool performance.

Information from the processing may be captured and stored for later validation or review of an installation process, as well as the material properties of the materials employed, such as primary and secondary workpieces.

Also for example, tracking and related information from the processing may be employed in dynamically controlling operation of the processing tool. For instance, the performance of various processing operations may be modified or adjusted based on captured information regarding the processing, including information about the specific characteristics of the particular materials. Detection of out of compliance materials or operations may cause a stop in the processing, allowing correction or preventing further time and resources being applied to a workpiece that cannot be used. Tracking may allow detection of processing operations occurring out of order from a defined sequence and/or providing appropriate alerts in response to same. Detection of specific parameters, for example a response relationship, may allow adjustment to accommodate normal or common variations in materials, possible preventing damage to such materials. Such may be particularly advantageous in the use of composite materials, high strength aluminums or hybrid stack ups of different materials (e.g., composites stacked or mated with metals, for instance Titanium). For instance, with composite materials it is desirable to achieve sufficient expansion to secure an expandable component in a hole, without however crushing the composite material. Real time monitoring of a response of the material to applied force or pressure may permit real time control over a processing tool to adjust the applied force or pressure or to adjust a position or amount of travel of a drive member of the processing tool or associated expansion assembly or component. For example, real time monitoring of a yield strength or point at which a material yields may be used to determine an additional amount of travel to achieve a desired level of cold work radial expansion sufficient to induce a desired level of compressive stress in a workpiece to reduce or even eliminate the occurrence of fatigue cracking. Such may be substantially more accurate than techniques which rely on an essentially fixed amount of radial expansion, and which therefore do not account in variations between workpieces of the same type of material. Notably, variations of approximately 10% have been observed between workpieces of a given type of material.

A dynamically controlled tool is a radical departure from the over 40 years of conventional cold working techniques. A dynamically controlled tool may advantageously reduce upset and/or eliminate axial flow of material. A dynamically controlled tool may advantageously produce more uniform stress around a hole, even proximate ridges caused by a multi-segment selectively expandable portion or member. Such may lead to improved fatigue life. A dynamically controlled tool may advantageously eliminate the use of disposable sleeves, thereby reducing the waste stream and operational costs. A dynamically controlled tool may advantageously speed operation, allowing quicker cold-working of holes and/or optionally installation of expandable members in holes while achieving cold-working of the holes. A dynamically controlled tool may advantageously be more tolerant of material and operational variations from specified or nominal characteristics.

Also for instance, high strength aluminum has a tendency to crack. Use of a dynamically controlled processing tool, particularly one with a multi-segmented expansion assembly which does not apply axial translation forces to the workpieces, may alleviate concerns with using such material.

Further, information regarding usage of a processing tool and/or consumable components employed with the processing tool may be collected. Appropriate alerts may be provided, and replacement parts ordered. For example, replacement parts may be automatically ordered before a maximum usage threshold is exceeded.

Many conventional pullers employ multiple pressure hoses, some to supply pressure to drive a piston, while others essentially supply the signals to activate valves. Applicants have recognized that use of electrical or even optical signals to control actuators may provide vast improvements over the conventional pullers. Such may significantly increase responsiveness, allowing dynamic operation that might not otherwise be realizable via conventional pressure based control approaches. Such also allows the remote storage of information collected or monitored by various sensors associated with the processing tool.

A method of operating a processing tool to process a workpiece having at least a first hole may be summarized as including expanding at least a portion of an expansion assembly by the processing tool; sensing by at least one sensor at least one of a pressure, a position of a drive member, a distance of travel of the drive member, or a reaction force resulting from an applied force applied directly or indirectly by the expanding of the segments to an interior surface of the first hole; determining by at least one processor at least one value indicative of a response of at least a portion of at least the workpiece to the applied force applied directly or indirectly by the expanding of the segments; and controlling the expanding of the segments of the expansion assembly by the at least one processor based at least in part on the determined at least one value.

The portion of the expansion member may, for example, be a set of expansion segments, arrayed circumferentially about a longitudinal axis, with a passageway extending therebetween. The array of expansion segments may be coupled by bands, one either side of a longitudinal center point. The bands may bias the expansion segments toward an unexpanded configuration. Translation of a core element or mandrel may cause such to bear on inner bearing or interface surfaces of the expansion segments to radially expand the array into an expanded configuration. The radial expansion may advantageously be achieved without pivoting of the expansion segments.

The sensing by the at least one sensor may include periodically sampling the at least one sensor over an operational cycle during which the processing tool performs a plurality of operations on the first hole. Periodically sampling the at least one sensor may include sampling an output of the at least one sensor at a frequency of at least 1 KHz. The sensing by the at least one sensor may include sensing by a first sensor at least one of a pressure applied to or by the drive member or the reaction force resulting from the applied force applied directly or indirectly to the interior surface of the first hole, and sensing by at least a second sensor information indicative of the position of the drive member or an amount of travel of the drive member between two positions. Determining at least one value indicative of a response of at least a portion of at least the workpiece to the applied force may include determining an inflection between a first portion of a response relationship and a second portion of the response relationship by the at least one processor. Determining an inflection between a first portion of a response relationship and a second portion of the response relationship may include determining the inflection between a first at least approximately linear portion of the response relationship having a first slope and a second at least approximately linear portion of the response relationship having a second slope, the second slope different from first slope. The response relationship may be a ratio of a value indicative of a position of the drive member to a value indicative of the applied force, at a plurality of different applied forces. The drive member may include a piston and the response relationship may be a ratio of a position of the piston to a piston pressure, at a plurality of increasing piston pressures. Determining an inflection between a first portion of a response relationship and a second portion of the response relationship by the at least one processor, the response relationship may be a function of a value indicative of one of the position of or the distance of travel of the drive member relative to a value indicative of one of the pressure, the reaction force, or the applied force over at least a portion of an operational cycle for the first hole. The method may further compare determining by the at least one processor at least one of a future position of the drive member or an amount of additional travel of the drive member required to achieve a defined level of cold working; and may further expand the at least a portion of the expansion assembly based on the determined future position or amount of additional travel. Determining at least one of a future position of the drive member or an amount of additional travel of the drive member required to achieve a defined level of cold working may include determining the future position or the amount of additional travel based at least in part on the response to the applied force over a period of time preceding a yield of at least one material to which the applied force is applied directly or indirectly. Determining at least one of a future position of the drive member or an amount of additional travel of the drive member required to achieve a defined level of cold working may include determining the future position or the amount of additional travel based at least in part on the response to the applied force over a period of time following a start of a yield of at least one material to which the applied force is applied directly or indirectly. The sensing by the at least one sensor may include sensing the reaction force resulting from contact directly or indirectly with an interior surface of the first hole, and may further include detecting an increase in the reaction force resulting from an initial contact of the at least a portion of the expansion assembly directly or indirectly with an interior surface of the first hole; determining an initial size of the first hole in the workpiece based at least in part on the detection of the increase in reaction force; and determining at least one of an end position or total amount of travel of the drive member based at least in part on the determined initial size of the first hole. The sensing by the at least one sensor may include sensing the reaction force resulting from contact directly or indirectly with an interior surface of the first hole, and may further include detecting an increase in the reaction force resulting from an initial contact of at least a portion of the expansion assembly directly or indirectly with the interior surface of the first hole; determining an initial size of the first hole in the workpiece based at least in part on the detection of the increase in reaction force; and determining whether the initial size of the first hole is within a defined tolerance of an expected size of the first hole. The method may further include detecting a concurrent rapid increase in the reaction force along with no change in the position of the drive member; and in response, retracting the at least a portion of the expansion assembly. The processing tool may be a handheld actuator and the expansion assembly may be a consumable component detachably coupled thereto, and may further include positioning at least a portion of the expansion assembly with respect to the first hole; and activating a processing cycle to cold work the workpiece proximate the first hole.

A method of operating a processing tool to process a workpiece having at least a first hole may be summarized as including expanding the at least a portion of the expansion assembly by the processing tool; detecting an increase in a reaction force resulting from initial contact of the at least a portion of the expansion assembly directly or indirectly with an interior surface of the first hole; determining an initial size of the first hole in the workpiece based at least in part on the detection of the increase in reaction force; and determining whether the initial size of the first hole is correct.

The method may further include retracting the at least a portion of the expansion assembly; and repeating the expanding the at least a portion of the expansion assembly and the detecting an increase in a reaction force at least one additional time for the first hole after retracting; and wherein determining an initial size of the first hole in the workpiece includes averaging a plurality of results achieved over a plurality of the expanding and the detecting an increase for the first hole. Determining whether the initial size of the hole is correct may include reading a value at least proximally associated with the first hole; based at least in part on the read value, determining a nominal initial size specified for the first hole; and comparing the determined initial size of the first hole with the nominal initial size of the first hole. Reading a value at least proximally associated with the first hole may include at least one of reading a machine-readable symbol that encodes an identifier or reading a wireless transponder that encodes the identifier. Reading an identifier at least proximally associated with the first hole may include reading a unique identifier that uniquely identifies the first hole from any other holes in the workpiece. Determining whether the initial size of the hole is correct may include determining a location of the processing tool at a first time; based at least in part on the determined location, determining a nominal initial size specified for the first hole; and comparing the determined initial size of the first hole with the nominal initial size of the first hole. Comparing the determined initial size of the first hole with the nominal initial size of the first hole may include accounting for a defined allowable tolerance from the nominal initial size of the first hole. The method may further include taking a first action if the initial hole size is correct; and taking a second action, different from the first action, if the hole size is not correct. Taking a first action if the initial hole size is correct may include further expanding the at least a portion of the expansion assembly to cold work the workpiece proximate the first hole. Taking a first action if the initial hole size is correct may include further expanding the at least a portion of the expansion assembly to create an interference fit between an expandable member to be secured at least partially in the hole and the interior surface of the first hole. Taking a second action if the initial hole size is not correct may include retracting the at least a portion of the expansion assembly. Taking a second action if the initial hole size is not correct may include causing an alert discernible by a user of the processing tool to be produced. Taking a second action if the initial hole size is not correct may include causing an alert to be electronically transmitted to a device remote from the processing tool. The processing tool may be a handheld actuator and the expansion assembly may be a consumable component detachably coupled thereto, and may further comprise positioning at least a portion of the expansion assembly with respect to the first hole; and activating a processing cycle to cold work the workpiece proximate the first hole.

A method of operating a processing tool to process a workpiece having at least a first hole may be summarized as including expanding at least a portion of the expansion assembly to apply a force at least one of directly or indirectly to a material; computationally comparing by at least one processor a first relationship indicative of a response of the material subjected to the applied force to a second relationship indicative of an expected response of the material to the applied force; determining by at least one processor whether the material is a same type of material as an expected material based at least in part on the comparison; taking a first action by the processing tool if the material is determined to be the same type of material as the expected material; and taking a second action by at least one of the processing tool or the at least one processor, if the material is determined to not be the same type of material as the expected material, the second action different from the first action.

The first value may represent a pressure applied to expand the at least a portion of the expansion assembly and the second value may represent at least one of a position or an amount of travel of a drive member that applies the force, and comparing a first relationship to a second relationship may include comparing a first ratio of the position or the amount of travel to the pressure applied to a second ratio of an expected position or expected amount of travel for an applied pressure the same as the pressure applied. The method may further include sensing by at least a first sensor the applied force applied to the material at a plurality of times; sensing by at least a second sensor a position of a drive member or an amount of travel of the drive member at the plurality of times; determining by the at least one processor a first slope of the sensed positions or amounts of travel of the drive member relative to the sensed applied forces for the material; and determining by the at least one processor a second slope of the expected positions or amounts of travel of the drive member for the expected material relative to the applied forces; and wherein comparing by the at least one processor a first relationship indicative of a response of the material subjected to the applied force to a second relationship indicative of an expected response of the material to the applied force may include comparing the first slope with the second slope. Comparing a first relationship indicative of a response of the material subjected to the applied force to a second relationship may include accounting for a defined allowable tolerance in at least one physical property of the material. The first response relationship may be a function of a value indicative of one of a position of or a amount of travel of a drive member that drives the at least a portion of the expansion assembly relative to a value indicative of one of a pressure, a reaction force, or the applied force over at least a portion of an operational cycle for the first hole. The method may further include reading a value at least proximally associated with the material by a reader; determining by the at least one processor the second relationship indicative of an expected response of the material to the applied force at least in part based on the read value. Reading a value at least proximally associated with the material may include at least one of reading a machine-readable symbol that encodes an identifier or reading a wireless transponder that encodes the identifier. The method may further include determining by at least one processor a location of the processing tool at a first time; and based at least in part on the determined location, determining the second relationship by at least one processor. Taking a first action if the material is determined to be the same type of material as the expected material may include further expanding the at least a portion of the expansion assembly to cold work the workpiece proximate the first hole. Taking a first action if the material is determined to be the same type of material as the expected material may include further expanding the at least a portion of the expansion assembly to create an interference fit between an expandable member to be secured at least partially in the hole and the interior surface of the first hole. Taking a second action if the material is determined to not be the same type of material as the expected material may include retracting the at least a portion of the expansion assembly. Taking a second action if the material is determined to not be the same type of material as the expected material may include causing an alert discernible by a user of the processing tool to be produced. Taking a second action if the material is determined to not be the same type of material as the expected material may include causing an alert to be electronically transmitted to a device remote from the processing tool. The processing tool may be a handheld actuator and the expansion assembly may be a consumable component detachably coupled thereto, and may further include positioning at least a portion of the expansion assembly with respect to the first hole; and activating a processing cycle to cold work the workpiece proximate the first hole.

A method of operating a processing tool to process a workpiece having at least a first hole may be summarized as including repeatedly sensing by at least one sensor at least one operational condition of the processing tool at a plurality of respective times while processing the workpiece; based at least in part on the sensed at least one operational condition of the processing tool, computationally determining by at least one processor whether an operation of the processing tool is consistent with a first defined sequence of operations which specifies an ordered set of operations for the processing tool; taking a first action by the processing tool if operation of the processing tool is consistent with the first defined sequence of operations; and taking a second action by at least one of the processing tool or the at least one processor if operation of the processing tool is not consistent with the defined sequence of operations, the second action different from the first action.

The at least one operational condition of the processing tool may include at least a first and a second operational condition, the first operational condition being a value indicative of an applied force and the second operational condition being a value indicative of at least one of a position or an amount of travel of a drive member of the processing tool, and computationally determining whether an operation of the processing tool is consistent with a first defined sequence of operations includes comparing a first ratio of the position or the amount of travel to the applied pressure to a second ratio of an expected position or an expected amount of travel in response to the applied pressure. The at least one operational condition of the processing tool may include at least a first and a second operational condition, the first operational condition being a value indicative of one of a pressure, an applied force or a reaction force and the second operational condition being a value indicative of at least one of a position of or an amount of travel of a drive member, and computationally determining whether an operation of the processing tool is consistent with a first defined sequence of operations may include comparing a least a portion of a response relationship and an expected response relationship by the at least one processor, the response relationship being a function of a value indicative of one of the position of or the distance of travel of the drive member relative to a value indicative of one of the pressure, the reaction force, or the applied force over at least a portion of an operational cycle for the first hole. The at least one operational condition of the processing tool may include at least a physical location of the processing tool, and computationally determining by at least one processor whether an operation of the processing tool is consistent with a first defined sequence of operations may include determining whether a current location of the processing tool is consistent with an expected location as specified by a first defined sequence of locations. The workpiece may have a plurality of holes and the at least one operational condition of the processing tool may include at least an initial increase in a reaction force indicative of initial contact with an inner surface of the respective hole, and computationally determining by at least one processor whether an operation of the processing tool is consistent with a first defined sequence of operations may include for each of the holes, determining a respective initial size of the hole based at least in part on an amount of travel of a drive member of the processing tool which produced the respective initial increase in reaction force; and determining whether the initial size of the hole is consistent with a size of an expected hole as specified by a first defined sequence of holes. The method may further include reading a value at least proximally associated with the workpiece by a reader; based at least in part on the read value, determining the first defined sequence of operations by at least one processor. Reading a value at least proximally associated with the workpiece may include at least one of reading a machine-readable symbol that encodes an identifier or reading a wireless transponder that encodes the identifier. Taking a first action if operation of the processing tool is consistent with the first defined sequence of operations may include further expanding the at least a portion of the expansion assembly to cold work the workpiece proximate the first hole. Taking a first action if operation of the processing tool is consistent with the first defined sequence of operations may include further expanding the at least a portion of the expansion assembly to create an interference fit between an expandable member to be secured at least partially in the hole and the interior surface of the first hole. Taking a second action if operation of the processing tool is not consistent with the defined sequence of operations may include retracting the at least a portion of the expansion assembly. Taking a second action if operation of the processing tool is not consistent with the defined sequence of operations may include causing an alert discernible by a user of the processing tool to be produced.

Taking a second action if operation of the processing tool is not consistent with the defined sequence of operations may include causing an alert to be electronically transmitted to a device remote from the processing tool. The processing tool may be a handheld actuator and the expansion assembly may be a consumable component detachably coupled thereto, and may further include positioning at least a portion of the expansion assembly with respect to the first hole; and activating a processing cycle to cold work the workpiece proximate the first hole.

A method of operating a processing tool to process a workpiece having at least a first hole may be summarized as including detecting by at least one sensor an orientation of the processing tool at a first time; comparing by at least one processor the detected orientation of the processing tool to an expected orientation of the processing tool at the first time; expanding at least a portion of the expansion assembly by the processing tool if the detected orientation of the processing tool is within a defined tolerance of the expected orientation of the processing tool; and providing an indication of misalignment if the detected orientation of the processing tool is not within a defined tolerance of the expected orientation of the processing tool.

The method may further include retracting the at least a portion of the expansion assembly if the detected orientation of the processing tool is not within a defined tolerance of the expected orientation of the processing tool; and repeating the detecting and the comparing following the retracting. The method may further include reading a value at least proximally associated with the first hole by a reader; and based at least in part on the read value, determining the expected orientation of the processing tool by at least one processor. Reading a value at least proximally associated with the first hole may include at least one of reading a machine-readable symbol that encodes an identifier or reading a wireless transponder that encodes the identifier. Reading a value at least proximally associated with the first hole may include reading a unique identifier that uniquely identifies the first hole from any other holes in the workpiece. The method may further include determining a location of the processing tool at a first time by at least one processor; based at least in part on the determined location, determining the expected orientation of the processing tool. Comparing the detected orientation of the processing tool to an expected orientation of the processing tool may include comparing the detected orientation to the expected orientation with respect to at least two perpendicular axes. Comparing the detected orientation of the processing tool to an expected orientation of the processing tool may include comparing the detected orientation to the expected orientation in a reference frame of the workpiece. Comparing the detected orientation of the processing tool to an expected orientation of the processing tool may include comparing the detected orientation to the expected orientation in a real world reference frame oriented with respect to a gravitational force. The method may further include detecting by the at least one processor an orientation of the processing tool at a second time, following the first time; comparing by the at least one processor the detected orientation of the processing tool at the second time to an expected orientation of the processing tool at the second time; and if the detected orientation of the processing tool is within a defined tolerance of the expected orientation of the processing tool, further expanding the at least a portion of the expansion assembly by the processing tool to create an interference fit between an expandable member to be secured at least partially in the hole and the interior surface of the first hole. The method may further include if the detected orientation of the processing tool at the first time is not within a defined tolerance of the expected orientation of the processing tool at the first time, retracting the at least a portion of the expansion assembly by the processing tool. Providing an indication of misalignment may include causing production of an alert discernible by a user of the processing tool. Providing an indication of misalignment may include causing an electronic transmission of an alert to a device remote from the processing tool. The processing tool may be a handheld actuator and the expansion assembly may be a consumable component detachably coupled thereto, and may further include positioning and aligning at least a portion of the expansion assembly with respect to the first hole; and activating a processing cycle to cold work the workpiece proximate the first hole.

A method of operating a processing tool to process workpieces may be summarized as including tracking at least one parameter indicative of usage of at least one of a processing tool or a consumable component employed with the processing tool; comparing the at least one parameter indicative of usage to a defined usage related threshold; in response to the at least one parameter indicative of usage reaching the defined usage related threshold, taking a first action.

The method of operating a processing tool to process workpieces may further include tracking a total number of uses of at least portion of expansion assembly. Tracking at least one parameter indicative of usage may include tracking a total number of uses of the consumable component. Tracking at least one parameter indicative of usage may include tracking a total number of uses of the consumable component on a hole-by-hole basis. Tracking at least one parameter indicative of usage may include tracking a total number of uses of the processing tool. Comparing the at least one parameter indicative of usage to a defined usage related threshold may include comparing a total number of uses to a maximum permitted number of uses threshold. In response to the at least one parameter indicative of usage reaching the defined usage related threshold, taking a first action may include disabling the processing tool in response to a total number of uses reaching a maximum permitted number of uses threshold. In response to the at least one parameter indicative of usage reaching the defined usage related threshold, taking a first action may include disabling any processing tool at least proximally associated with the consumable component in response to a total number of uses of the consumable component assembly reaching a maximum permitted number of uses threshold. The method may further include overriding the disabling of the processing tool in response to an override authorization command. The method may further include causing information indicative of usage to be stored to a nontransitory medium at least proximally associated with the consumable component. Causing information indicative of usage to be stored to a nontransitory medium at least proximally associated with the consumable component may include storing a total number of uses to the nontransitory medium. Causing information indicative of usage to be stored to a nontransitory medium at least proximally associated with the consumable component may include storing a value to the nontransitory medium that indicates that a maximum permitted uses threshold has been reached. The method may further include causing information indicative of usage to be stored to a nontransitory medium at least proximally associated with a consumable core element of an expansion assembly. The method may further include causing information indicative of usage to be stored to a nontransitory medium at least proximally associated with a consumable expansion element of an expansion assembly. The method may further include in response to the at least one parameter indicative of usage reaching the defined usage related threshold, causing a wireless transponder at least proximally associated with the consumable component to be rendered incapable of permitting use of the processing tool in conjunction with the consumable component. Taking a first action may include causing an alert discernible to a user of the processing tool to be produced. Taking a first action may include causing an alert to be sent to a device remotely located from the processing tool. The method may further include causing an alert prior to the at least one parameter indicative of usage reaching the defined usage related threshold. The method may further include in response to the at least one parameter indicative of usage reaching the defined usage related threshold, automatically electronically ordering a replacement consumable component. The method may further include automatically electronically ordering a replacement consumable component prior to the at least one parameter indicative of usage reaching the defined usage related threshold. The processing tool may be a handheld actuator and the expansion assembly may be a consumable component detachably coupled thereto, and may further include positioning at least a portion of the expansion assembly with respect to the first hole; and activating a processing cycle to cold work the workpiece proximate the first hole.

A method of operating a system to process a number of workpieces, each having at least one hole, with a processing tool may be summarized as including sensing by a number of sensors a number of operational parameters of each of a number of operational cycles of processing respective ones of the holes in the number of workpieces; and causing by at least one processor, storing of information to at least one nontransitory storage medium, the information indicative of characteristics of a number of manufacturing operations based on the sensed operational parameters, where the stored information represents a number of aspects of at least one of the processing or the materials and is stored to be retrievable on at least one of a hole-by-hole basis or a workpiece-by-workpiece basis.

Sensing a number of operational parameters of each of a number of operational cycles of processing respective ones of the holes in the number of workpieces may include sensing at least one of an applied force, a reaction force resulting from the applied force or an applied pressure. Sensing at least one of an applied force, a reaction force resulting from the applied force or an applied pressure may include sensing the applied pressure proximate a piston of the processing tool. Sensing a number of operational parameters of each of a number of operational cycles of processing respective ones of the holes in the number of workpieces may include sensing at least one of a position or an amount of travel of a drive member. Sensing at least one of a position or an amount of travel of a drive member may include sensing at least one of the position or the amount of travel of the drive member of the processing tool or a consumable expansion component physically detachably coupled to the processing tool. The method may further include determining by at least one processor a value indicative of a yield strength of a material based at least in part on the sensed operational parameters; and wherein causing storing of information to at least one nontransitory storage medium, may include causing storage of information indicative of the determined yield strength of the material retrievable on at least one of a hole-by-hole basis or a workpiece-by-workpiece basis. Determining by at least one processor a value indicative of a yield strength of a material based at least in part on the sensed operational parameters may include determining an inflection between a first portion of a response relationship and a second portion of the response relationship by the at least one processor, the response relationship being a function of a value indicative of one of the position of or the distance of travel of the drive member relative to a value indicative of one of the pressure, the reaction force, or the applied force over at least a portion of an operational cycle for the first hole The sensing by the at least one sensor may include sensing the reaction force resulting from contact directly or indirectly with an interior surface of a respective one of the holes, and may further include detecting by at least one processor an increase in the reaction force resulting from an initial contact of the at least a portion of the expansion assembly directly or indirectly with the interior surface of the respective hole; determining an initial size of the respective hole in the workpiece based at least in part on the detection of the increase in reaction force; and wherein causing storing of information to at least one nontransitory storage medium, may include causing storage of information indicative of the determined initial size of the respective hole retrievable on at least one of a hole-by-hole basis or a workpiece-by-workpiece basis. The method may further include reading information from a data carrier at least proximally associated with a respective one of the number of workpieces; and wherein causing storing of information to at least one nontransitory storage medium, may include causing storage of information read from the data carrier to be retrievable on at least one of a hole-by-hole basis or a workpiece-by-workpiece basis. The method may further include reading information from a data carrier at least proximally associated with a respective one of the processing tools or a consumable component detachably coupleable to the processing tools; and wherein causing storing of information to at least one nontransitory storage medium, may include causing storage of information read from the data carrier to be retrievable on at least one of a hole-by-hole basis or a workpiece-by-workpiece basis. The method may further include tracking of a sequence of operations executed by one of the processing tools in processing a respective one of the holes; and wherein causing storing of information to at least one nontransitory storage medium, may include causing storage of information that specifies the tracked sequence of operations executed by one of the processing tools in processing a respective one of the holes to be retrievable on at least one of a hole-by-hole basis or a workpiece-by-workpiece basis. The method may further include determining an amount of travel of a drive member past a point of initial yield of a material; and wherein causing storing of information to at least one nontransitory storage medium, may include causing storage of information that specifies the determined amount of travel of the drive member past the point of initial yield of the material to be retrievable on at least one of a hole-by-hole basis or a workpiece-by-workpiece basis. The method may further include determining a first slope of a first portion of a response relationship, the response relationship being a function of a value indicative of one of a position of or a distance of travel of a drive member relative to a value indicative of one of a pressure, an applied force, or a reaction force to the applied force, over at least a portion of an operational cycle for a respective one of the holes; determining a slope of a second portion of the response relationship; and wherein causing storing of information to at least one nontransitory storage medium, may include causing storage of information that specifies the determined first and the determined second slopes of the response relationship to be retrievable on at least one of a hole-by-hole basis or a workpiece-by-workpiece basis. The method may further include detecting an abnormality in processing a respective one of the holes; and wherein causing storing of information to at least one nontransitory storage medium, may include causing storage of information that specifies the detected abnormality to be retrievable on at least one of a hole-by-hole basis or a workpiece-by-workpiece basis. The method may further include detecting an out of tolerance condition of at least one of the holes, the workpieces, the processing tools or a consumable component detachably physically coupleable to the processing tools; and wherein causing storing of information to at least one nontransitory storage medium, may include causing storage of information that specifies the out of tolerance condition to be retrievable on at least one of a hole-by-hole basis or a workpiece-by-workpiece basis. The method may further include detecting by at least one sensor an orientation of the processing tool at a first time; and wherein causing storing of information to at least one nontransitory storage medium, may include causing storage of information indicative of the detected orientation or a variance of the detected orientation from a defined orientation to be retrievable on a hole-by-hole basis or a processing tool user-by-processing tool user basis. Storing information indicative of characteristics of a manufacturing operation may include storing the information to the at least one nontransitory storage medium which is collocated with a controller that controls operation of a respective one of the number of processing tools. Storing information indicative of characteristics of a manufacturing operation may include storing the information to the at least one nontransitory storage medium which is collocated with a host system communicatively coupled to receive the information from a plurality of the number of processing tools. The processing tool may be a handheld actuator and the expansion assembly may be a consumable component detachably coupled thereto, and may further include positioning at least a portion of the expansion assembly with respect to the first hole; and activating a processing cycle to cold work the workpiece proximate the first hole.

A method of operating a processing system for processing workpieces having holes may be summarized as including detecting by at least one processor a break in operation of the processing tool; and in response to detection of a break in operation, causing by the at least one processor a cleaning cycle of repeated expanding and retracting of at least a portion of an expansion assembly detachable coupled to the processing tool to clean at least one of the processing tool or the expansion assembly of material accumulated during processing operations.

Detecting the break in operation may include monitoring by the at least one processor of a time after a completion of a most recent processing operation performed by the processing tool.

The method of operating a processing system for processing workpieces having holes may further include terminating the repetitions of expanding and retracting of the at least a portion of the expansion assembly after a defined number of cycles thereof during the cleaning cycle.

The method of operating a processing system for processing workpieces having holes may further include detecting a triggering condition by the at least one processor; and in response to detecting the triggering condition, terminating the repetitions of expansion and retraction of the at least a portion of the expansion assembly of the cleaning cycle by the at least one processor.

A workpiece processing system may be summarized as including a processing tool to process a workpiece having at least a first hole; an expansion assembly detachable physically coupled to the processing tool; at least one sensor responsive to at least one of a pressure, a position of a drive member, a distance of travel of the drive member, or a reaction force resulting from an applied force applied directly or indirectly by the expansion assembly to an interior surface of a hole in the workpiece; at least one nontransitory processor-readable medium; and at least one processor communicatively coupled to the at least one nontransitory processor-readable medium and the at least one sensor, the at least one processor configured to determine at least one value indicative of a response of at least a portion of at least the workpiece to the applied force applied directly or indirectly by the expansion assembly and control an expansion of expansion assembly based at least in part on the determined at least one value.

The at least one processor may periodically sample the at least one sensor over an operational cycle during which the processing tool performs a plurality of operations on the hole. The at least one processor may periodically sample the at least one sensor at a frequency of at least approximately 1 KHz. The at least one sensor may include a first sensor that senses at least one of a pressure applied to or by the drive member or the reaction force resulting from the applied force applied directly or indirectly to the interior surface of the first hole, and at least a second sensor that senses information indicative of the position of the drive member or an amount of travel of the drive member between two positions. The at least one processor may determine an inflection between a first portion of a response relationship and a second portion of the response relationship in order to determine at least one value indicative of a response of at least a portion of at least the workpiece to the applied force. The at least one processor may determine the inflection between a first at least approximately linear portion of the response relationship having a first slope and a second at least approximately linear portion of the response relationship having a second slope, the second slope different from first slope. The response relationship may be a ratio of a value indicative of a position of the drive member to a value indicative of the applied force, at a plurality of different applied forces. The processing tool may include a piston as the drive member and the response relationship may be a ratio of a position of the piston to a piston pressure, at a plurality of increasing piston pressures. The at least one processor may determine at least one of a future position of the drive member or an amount of additional travel of the drive member required to achieve a defined level of cold working, and may further expand the expansion assembly based at least in part on the determined future position or amount of additional travel. The at least one processor may determine the future position or the amount of additional travel based at least in part on the response to the applied force over a period of time preceding a yield of at least one material to which the applied force is applied directly or indirectly. The at least one processor may determine the future position or the amount of additional travel based at least in part on the response to the applied force over a period of time following a start of a yield of at least one material to which the applied force is applied directly or indirectly. The at least one sensor may sense the reaction force resulting from contact directly or indirectly with an interior surface of the first hole, and the at least one processor may detect an increase in the reaction force resulting from an initial contact of the segments directly or indirectly with an interior surface of the first hole, may determine an initial size of the first hole in the workpiece based at least in part on the detection of the increase in reaction force, and may determine at least one of an end position or total amount of travel of the drive member based at least in part on the determined initial size of the first hole. The at least one processor may further determine whether the initial size of the first hole is within a defined tolerance of an expected size of the hole. The at least one processor may further detect a concurrent rapid increase in the reaction force along with no change in the position of the drive member, and in response, may retract the expansion assembly. The processing tool may be a handheld actuator and the expansion assembly may be a consumable components detachable coupled thereto.

A workpiece processing system for processing workpieces having holes may be summarized as including a processing tool to process a workpiece having at least a first hole; an expansion assembly detachable physically coupled to the processing tool; at least one sensor responsive to at least one of a pressure, a position of a drive member, a distance of travel of the drive member, or a reaction force resulting from an applied force applied directly or indirectly by the expansion assembly to an interior surface of a hole in the workpiece; at least one nontransitory processor-readable medium; and at least one processor communicatively coupled to at least one nontransitory processor-readable medium and the at least one sensor, the at least one processor configured to: expand the expansion assembly; detect an increase in a reaction force resulting from initial contact of the segments directly or indirectly with an interior surface of the hole; determine an initial size of the hole in the workpiece based at least in part on the detection of the increase in reaction force; and determine whether the initial size of the hole is correct.

The at least one processor may be further configured to: retract the expansion assembly; and repeatedly expand the expansion assembly, detect an increase in a reaction force at least one additional time for the hole after retraction; and determine the initial size of the hole in the workpiece based on an average of a plurality of results achieved over a plurality of the expansion and the detection of an increase for the hole.

The workpiece processing system for processing workpieces having holes may further include a reader to read a value proximally associated with the hole; and the at least one processor may be configured to determine a nominal initial size specified for the hole based at least in part on the read value, and to compare the determined initial size of the first hole with the nominal initial size of the first hole. The reader may be at least one of a machine-readable symbol reader or a wireless transponder reader. The value the reader reads may be a unique identifier that uniquely identifies the hole from any other holes in the workpiece.

The workpiece processing system for processing workpieces having holes may further include a spatial location subsystem that determines a spatial location of the processing tool at a first time, and the at least one processor may determine a nominal initial size specified for the hole based at least in part on the determined location, and may compare the determined initial size of the hole with the nominal initial size of the hole, and may account for a defined allowable tolerance from the nominal initial size of the hole. The at least one processor may be further configured to: take at least a first action if the initial hole size is correct; and take at least a second action, different from the first action, if the hole size is not correct. To take the first action the at least one processor may further expand the expansion assembly to cold work the workpiece proximate the first hole. To take the first action the at least one processor may further expand the expansion assembly to create an interference fit between an expandable member to be secured at least partially in the hole and the interior surface of the hole. To take the second action the at least one processor may retract the expansion assembly. To take the second action the at least one processor may cause an alert to be produced, the alert discernible by a user of the processing tool. To take the second action the at least one processor may cause electronic transmission of an alert to a device remote from the processing tool. The processing tool may be a handheld actuator and the expansion assembly may be a consumable components detachable coupled thereto.

A workpiece processing system for processing workpieces having holes may be summarized as including a processing tool to process a workpiece having at least a first hole; an expansion assembly detachable physically coupled to the processing tool; at least one sensor responsive to at least one of a pressure, a position of a drive member, a distance of travel of the drive member, or a reaction force resulting from an applied force applied directly or indirectly by the expansion assembly to an interior surface of a hole in the workpiece; at least one nontransitory processor-readable medium; and at least one processor communicatively coupled to at least one nontransitory processor-readable medium and the at least one sensor, the at least one processor configured to computationally compare a first relationship indicative of a response of the material subjected to the applied force to a second relationship indicative of an expected response of the material to the applied force, determine whether the material is a same type of material as an expected material based at least in part on the comparison, cause the processing tool to take at least a first action if the material is determined to be the same type of material as the expected material, and cause at least a second action if the material is determined to not be the same type of material as the expected material, the second action different from the first action.

The first value may represent a pressure applied to expand the expansion assembly and the second value may represent at least one of a position or an amount of travel of a drive member that applies the pressure, and the at least one processor may compare a first ratio of the position or the amount of travel to the pressure applied to a second ratio of an expected position or expected amount of travel for an applied pressure the same as the pressure applied. The at least one sensor may include at least a first sensor responsive to the applied force applied to the material at a plurality of times and at least a second sensor responsive to a position of a drive member or an amount of travel of the drive member at the plurality of times, and the at least one processor may determine a first slope of the sensed positions or amounts of travel of the drive member relative to the sensed applied forces for the material, and may determine a second slope of the expected positions or amounts of travel of the drive member for the expected material relative to the applied forces, and the at least one processor may compare the first slope with the second slope. The first response relationship may be a function of a value indicative of one of a position of or a amount of travel of a drive member that drives the segments relative to a value indicative of one of a pressure, a reaction force, or the applied force over at least a portion of an operational cycle for the first hole.

The workpiece processing system for processing workpieces having holes may further include a reader communicatively coupled to the processor and operable to read a value at least proximally associated with the material, and the at least one processor may determine the second relationship indicative of an expected response of the material to the applied force at least in part based on the read value. The reader may be at least one of a machine-readable symbol reader or a wireless transponder reader.

The workpiece processing system for processing workpieces having holes may further include a spatial location subsystem communicatively coupled to the at least one processor, the at least one processor may be configured to determine a spatial location of the processing tool at a first time, and determine the second relationship based at least in part on the determined location. To take a first action the at least one processor may further expand the expansion assembly to cold work the workpiece proximate the hole. To take a first action the at least one processor may further expand the expansion assembly to create an interference fit between an expandable member to be secured at least partially in the hole and the interior surface of the hole. To take a first action the at least one processor may retract the expansion assembly. To take a first action the at least one processor may cause production of an alert discernible by a user of the processing tool. To take a first action the at least one processor may generate electronic transmission of an alert to a device remote from the processing tool. The processing tool may be a handheld actuator and the expansion assembly may be a consumable component detachable coupled thereto.

A workpiece processing system may be summarized as including a processing tool to process a workpiece having at least a first hole; an expansion assembly detachable physically coupled to the processing tool; at least one sensor responsive to at least one operational condition of the processing tool at a plurality of respective times while processing the workpiece; at least one nontransitory processor-readable medium; and at least one processor communicatively coupled to at least one nontransitory processor-readable medium and the at least one sensor, the at least one processor configured to computationally determine whether an operation of the processing tool is consistent with a first defined sequence of operations which specifies an ordered set of operations for the processing tool based at least in part on the sensed at least one operational condition of the processing tool, cause at least a first action by the processing tool if operation of the processing tool is consistent with the first defined sequence of operations, and cause at least a second action if operation of the processing tool is not consistent with the defined sequence of operations, the second action different from the first action.

The at least one operational condition of the processing tool may include at least a first and a second operational condition, the first operational condition being a value indicative of an applied force and the second operational condition being a value indicative of at least one of a position or an amount of travel of a drive member of the processing tool, and the at least one processor may compare a first ratio of the position or the amount of travel to the applied pressure to a second ratio of an expected position or an expected amount of travel in response to the applied pressure. The at least one operational condition of the processing tool may include at least a first and a second operational condition, the first operational condition being a value indicative of one of a pressure, an applied force or a reaction force and the second operational condition being a value indicative of at least one of a position of or an amount of travel of a drive member, and the at least one processor may compare at least a portion of a response relationship and an expected response relationship by the at least one processor, the response relationship being a function of a value indicative of one of the position of or the distance of travel of the drive member relative to a value indicative of one of the pressure, the reaction force, or the applied force over at least a portion of an operational cycle for the first hole. The at least one operational condition of the processing tool may include at least a physical location of the processing tool, and the at least one processor may determine whether a current location of the processing tool is consistent with an expected location as specified by a first defined sequence of locations. The workpiece may have a plurality of holes and the at least one operational condition of the processing tool may include at least an initial increase in a reaction force indicative of initial contact with an inner surface of the respective hole, and the at least one processor, for each of the holes, may determine a respective initial size of the hole based at least in part on an amount of travel of a drive member of the processing tool which produced the respective initial increase in reaction force, and may determine whether the initial size of the hole is consistent with a size of an expected hole as specified by a first defined sequence of holes.

The workpiece processing system may further include a reader communicatively coupled to the at least one processor, operable to read a value at least proximally associated with the workpiece, and the at least one processor may be further configured to: based at least in part on the read value, determine the first defined sequence of operations. The reader may be at least one of a machine-readable symbol reader or a wireless transponder reader. To cause the at least a first action the at least one processor may further expand the expansion assembly to cold work the workpiece proximate the first hole. To cause the at least a first action the at least one processor may further expand the expansion assembly to create an interference fit between an expandable member to be secured at least partially in the hole and the interior surface of the first hole. To cause the at least a second action the at least one processor may retract the expansion assembly. To cause the at least a second action the at least one processor may cause production of an alert discernible by a user of the processing tool. To cause the at least a second action the at least one processor may cause electronic transmission of an alert to a device remote from the processing tool. The processing tool may be a handheld actuator and the expansion assembly may be a consumable components detachable coupled thereto.

A workpiece processing system for processing workpieces having holes may be summarized as including a processing tool to process a workpiece having at least a first hole; an expansion assembly detachable physically coupled to the processing tool; at least one sensor responsive to an orientation of the processing tool at a first time; at least one nontransitory processor-readable medium; and at least one processor communicatively coupled to at least one nontransitory processor-readable medium and the at least one sensor, the at least one processor configured to compare the detected orientation of the processing tool to an expected orientation of the processing tool at the first time, expand an expansion assembly by the processing tool if the detected orientation of the processing tool is within a defined tolerance of the expected orientation of the processing tool, and cause provision of an indication of misalignment if the detected orientation of the processing tool is not within a defined tolerance of the expected orientation of the processing tool.

The at least one processor may be further configured to: cause retraction the expansion assembly if the detected orientation of the processing tool is not within a defined tolerance of the expected orientation of the processing tool, and repeat the detection and the comparison following the retraction.

The workpiece processing system for processing workpieces having holes may further include a reader communicatively coupled to the at least one processor and operable to read a value at least proximally associated with the first hole by a reader; and based at least in part on the read identifier, determine the expected orientation of the processing tool by at least one processor. The reader may be at least one of a machine-readable symbol reader or a wireless transponder reader.

The workpiece processing system for processing workpieces having holes may further include a spatial location subsystem that provides information to determine a spatial location of the processing tool at a first time; and the at least one processor may determine the expected orientation of the processing tool based at least in part on the determined location. The at least one processor may compare the detected orientation to the expected orientation with respect to at least two perpendicular axes. The at least one processor may compare the detected orientation to the expected orientation in a reference frame of the workpiece. If the detected orientation of the processing tool at the first time is not within a defined tolerance of the expected orientation of the processing tool at the first time, the at least one processor may cause retraction of the expansion assembly. If the detected orientation of the processing tool at the first time is not within a defined tolerance of the expected orientation of the processing tool at the first time, the at least one processor may cause production of an alert discernible by a user of the processing tool. If the detected orientation of the processing tool at the first time is not within a defined tolerance of the expected orientation of the processing tool at the first time, the at least one processor may cause electronic transmission of an alert to a device remote from the processing tool. The processing tool may be a handheld actuator and the expansion assembly may be a consumable components detachable coupled thereto.

A workpiece processing system for processing workpieces having holes may be summarized as including a processing tool to process a workpiece having at least a first hole; an expansion assembly detachable physically coupled to the processing tool; at least one sensor responsive to at least one parameter indicative of usage of at least one of a processing tool or a consumable component employed with the processing tool; at least one nontransitory processor-readable medium; and at least one processor communicatively coupled to at least one nontransitory processor-readable medium and the at least one sensor, the at least one processor configured to compare the at least one parameter indicative of usage to a defined usage related threshold, and in response to the at least one parameter indicative of usage reaching the defined usage related threshold, cause at least a first action.

The at least one processor may track a total number of uses of at least portion of expansion assembly. The at least one processor may track a total number of uses of the consumable component. The at least one processor may track a total number of uses of the consumable component on a hole-by-hole basis. The at least one processor may track a total number of uses of the processing tool. The at least one processor may track and compare a total number of uses to a maximum permitted number of uses threshold. The at least one processor may disable the processing tool in response to a total number of uses reaching a maximum permitted number of uses threshold. The at least one processor may disable any processing tool at least proximally associated with the consumable component in response to a total number of uses of the consumable component reaching a maximum permitted number of uses threshold. The at least one processor may cause information indicative of usage to be stored to a nontransitory medium at least proximally associated with the consumable component. The at least one processor may cause a total number of uses to be stored to the nontransitory medium. The at least one processor may cause a value that indicates that a maximum permitted uses threshold has been reached to be stored to the nontransitory medium.

The workpiece processing system for processing workpieces having holes may further include causing information indicative of usage to be stored to a nontransitory medium at least proximally associated with a consumable core element of an expansion assembly. The at least one processor may cause information indicative of usage to be stored to a nontransitory medium at least proximally associated with a consumable expansion element of an expansion assembly. In response to the at least one parameter indicative of usage reaching the defined usage related threshold, the at least one processor may cause a wireless transponder at least proximally associated with the consumable component to be rendered incapable of permitting use of the processing tool in conjunction with the consumable component. Taking a first action may include providing an alert discernible to a user of the processing tool. To cause the at least a first action the at least one processor may cause an alert to be provided to a device remotely located from the processing tool. To cause the at least a first action the at least one processor may cause an alert to be sent prior to the at least one parameter indicative of usage reaching the defined usage related threshold. To cause the at least a first action the at least one processor may cause an electronic order for a replacement consumable component to be automatically placed before the at least one parameter indicative of usage reaches the defined usage related threshold. The processing tool may be a handheld actuator and the expansion assembly may be a consumable components detachable coupled thereto.

A workpiece processing system for processing workpieces having holes may be summarized as including a processing tool to process a workpiece having at least a first hole; an expansion assembly detachable physically coupled to the processing tool; at least one sensor responsive to a number of operational parameters of each of a number of operational cycles of processing respective ones of the holes in the number of workpieces; at least one nontransitory processor-readable medium; and at least one processor communicatively coupled to at least one nontransitory processor-readable medium and the at least one sensor, the at least one processor configured to cause storage of information to at least one nontransitory storage medium, the information indicative of characteristics of a number of manufacturing operations based on the sensed operational parameters, where the stored information represents a number of aspects of at least one of the processing or the materials and is stored to be retrievable on at least one of a hole-by-hole basis or a workpiece-by-workpiece basis.

The at least one sensor may be responsive to at least one of an applied force, a reaction force resulting from the applied force or an applied pressure. The at least one sensor may be positioned to sense pressure at least proximate a piston of the processing tool. The at least one sensor may be responsive to at least one of a position or an amount of travel of a drive member. The at least one sensor may be responsive to at least one of the position or the amount of travel of the drive member of the processing tool or a consumable expansion component physically detachably coupled to the processing tool. The at least one processor may be further configured to determine a value indicative of a yield strength of a material based at least in part on the sensed operational parameters, and to cause storage of information to at least one nontransitory storage medium including causing storage of information indicative of the determined yield strength of the material retrievable on at least one of a hole-by-hole basis or a workpiece-by-workpiece basis. To determine the value indicative of a yield strength of a material based at least in part on the sensed operational parameters the at least one processor may determine an inflection between a first portion of a response relationship and a second portion of the response relationship by the at least one processor, the response relationship being a function of a value indicative of one of the position of or the distance of travel of the drive member relative to a value indicative of one of the pressure, the reaction force, or the applied force over at least a portion of an operational cycle for the first hole. The at least one sensor may be positioned to sense the reaction force resulting from contact directly or indirectly with an interior surface of a respective one of the holes, and the at least one processor may be further configured to: detect an increase in the reaction force resulting from an initial contact of the segments directly or indirectly with the interior surface of the respective hole; determine an initial size of the respective hole in the workpiece based at least in part on the detection of the increase in reaction force; and cause storage of information to at least one nontransitory storage medium, including causing storage of information indicative of the determined initial size of the respective hole retrievable on at least one of a hole-by-hole basis or a workpiece-by-workpiece basis.

The workpiece processing system for processing workpieces having holes may further include a reader operable to read information from a data carrier at least proximally associated with a respective one of the number of workpieces, and the at least one processor may cause storage of information read from the data carrier to be retrievable on at least one of a hole-by-hole basis or a workpiece-by-workpiece basis.

The workpiece processing system for processing workpieces having holes may further include a reader operable to read information from a data carrier at least proximally associated with a respective one of the processing tools or a consumable component detachably coupleable to the processing tools, and the at least one processor may cause storage of information read from the data carrier to be retrievable on at least one of a hole-by-hole basis or a workpiece-by-workpiece basis. The at least one processor may be further configured to: track a sequence of operations executed by one of the processing tools in processing a respective one of the holes; and cause storage of information to at least one nontransitory storage medium that specifies the tracked sequence of operations executed by one of the processing tools in processing a respective one of the holes to be retrievable on at least one of a hole-by-hole basis or a workpiece-by-workpiece basis. The at least one processor may be further configured to: determine an amount of travel of a drive member past a point of initial yield of a material; and cause storage of information to at least one nontransitory storage medium that specifies the determined amount of travel of the drive member past the point of initial yield of the material to be retrievable on at least one of a hole-by-hole basis or a workpiece-by-workpiece basis. The at least one processor may be further configured to: determine a first slope of a first portion of a response relationship, the response relationship being a function of a value indicative of one of a position of or a distance of travel of a drive member relative to a value indicative of one of a pressure, an applied force, or a reaction force to the applied force, over at least a portion of an operational cycle for a respective one of the holes; determine a slope of a second portion of the response relationship; and cause storage of information to at least one nontransitory storage medium that specifies the determined first and the determined second slopes of the response relationship to be retrievable on at least one of a hole-by-hole basis or a workpiece-by-workpiece basis. The at least one processor may be further configured to: detect an abnormality in processing a respective one of the holes; and cause storage of information to at least one nontransitory storage medium that specifies the detected abnormality to be retrievable on at least one of a hole-by-hole basis or a workpiece-by-workpiece basis. The at least one processor may be further configured to: detect an out of tolerance condition of at least one of the holes, the workpieces, the processing tools or a consumable component detachably physically coupleable to the processing tools; and cause storage of information to at least one nontransitory storage medium that specifies at least the occurrence of the out of tolerance condition to be retrievable on at least one of a hole-by-hole basis or a workpiece-by-workpiece basis. The at least one sensor may be responsive to an orientation of the processing tool, and the at least one processor may be further configured to: cause storage of information to at least one nontransitory storage medium indicative of the detected orientation or a variance of the detected orientation from a defined orientation to be retrievable on a hole-by-hole basis or a processing tool user-by-processing tool user basis. The at least one nontransitory storage medium to which the information is stored may be collocated with a controller that controls operation of a respective one of the number of processing tools. The at least one nontransitory storage medium to which the information is stored may be collocated with a host system communicatively coupled to receive the information from a plurality of the number of processing tools. The processing tool may be a handheld actuator and the expansion assembly may be a consumable components detachable coupled thereto.

The workpiece processing system for processing workpieces having holes may further include at least one imager associated with the processing tool, the at least imager operated to capture a plurality of images during the operational cycle of processing respective ones of the holes in the number of workpieces by the processing tool, and the at least one processor may be configured to cause the storage of captured image data to at least one nontransitory storage medium, to be retrievable on at least one of a hole-by-hole basis or a workpiece-by-workpiece basis.

A workpiece processing system for processing workpieces having holes may be summarized as including a processing tool to process a workpiece having at least a first hole; an expansion assembly detachable physically coupled to the processing tool; at least one nontransitory processor-readable medium; and at least one processor communicatively coupled to at least one nontransitory processor-readable medium, the at least one processor configured to detect a break in operation of the processing tool and in response cause a cleaning cycle of repeated expansion and retraction of at least a portion of the expansion assembly to clean at least one of the processing tool or the expansion assembly of material accumulated during processing operations.

The at least one processor may monitor a time after a completion of a most recent processing operation performed by the processing tool to detect the break in operation. The at least one processor may further terminate the repetitions of expansion and retraction of the at least a portion of the expansion assembly after a defined number of repetitions during the cleaning cycle. The at least one processor may be further configured to: detect a triggering condition which triggers a workpiece processing cycle; in response to detection of the triggering condition, terminate the repetitions of expansion and retraction of the at least a portion of the expansion assembly of the cleaning cycle. The processing tool may include a housing which houses the at least one processor.

Various means for performing the function and steps for performing the acts described herein may be employed. Typically, such means will include one or more controllers, non-transitory computer- or processor-readable storage media, and/or computer- or processor-executable instructions that implement one or more algorithms. The controllers may include one or more microcontrollers, microprocessors, application specific integrated circuits, programmable gate arrays, and/or programmed logic controllers. The non-transitory computer- or processor-readable storage media may include one or more memory structures, for instance random access memory, read-only memory, FLASH memory, etc. The algorithms may be any of the algorithms set out herein, or other suitable algorithms that will be apparent after review of this disclosure. The relationship of the various means to the algorithms should be readily clear from the various functions performed by the algorithms.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

Figure 1:
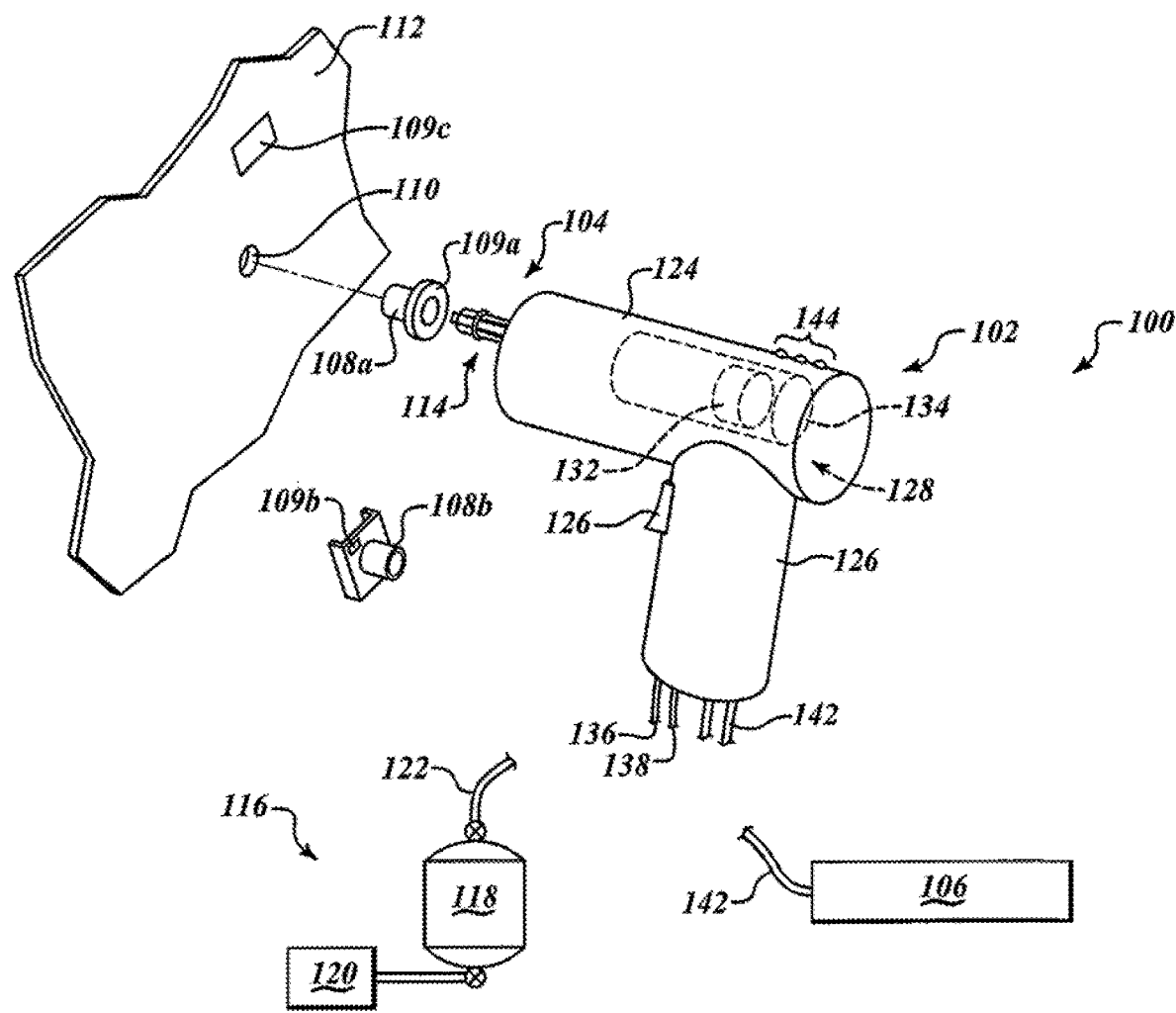
FIG. 1 is an environmental view of a processing system positioned with respect to a portion of a primary workpiece to install an expandable member such as bushing, nut plate or grommet in a hole in the primary workpiece, the processing system including a processing tool, an expansion assembly, a processor-based subsystem, and optionally a pressurization system, according to one illustrated embodiment.

In the following description, certain specific details are set forth in order to provide a thorough understanding of various embodiments of the invention. However, one skilled in the art will understand that the invention may be practiced without these details.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope of meaning of the claimed invention. The following description relates to installation/processing systems used to install expandable members (e.g., tubular bushings, rivetless nut plates, grommets, fittings, sleeves, etc.) in openings, such as non-through holes in workpieces. The systems can also be used to process workpieces, such as cold working holes in workpieces, with or without installation of an expandable member therein. For purposes of this discussion and for clarity, a processing system for installing an expandable member will be described, and then a description of its components will follow. The term "processing system" is a broad term and includes, without limitation, a system that can be used to expand an expandable member, material surrounding a hole in a workpiece, or other suitable expandable structures. In some embodiments, processing systems are installation systems that install expandable members in workpieces. The processing systems can also be in the form of cold expansion systems used to cold expand holes in workpieces, either with or with installing an expandable member. The terms "proximal" and "distal" are used to describe the illustrated embodiments and are used consistently with a description of non-limiting exemplary applications. The terms "proximal" and "distal" are used in reference to the user's body when the user operates a processing system, unless the context clearly indicates otherwise. It will be appreciated, however, that the illustrated embodiments can be located or oriented in a variety of desired positions.

The term processing system should not be confused with the term "processor-based system" which is used herein to denominate systems that include a processor such as a microprocessor, microcontroller, digital signal processors (DSPs), application specific integrated circuit (ASIC), programmed logic controller (PCL), programmable gate array (PGA) for instance a field programmable gate array (FPGA) or other controllers. Notably, in many implementations a processing system may be a processor-based system.

As noted above, the processing system can be used in procedures or processes involving workpieces. As used herein, the term "primary workpiece" or sometimes just "workpiece" is broadly construed to include, without limitation, a parent structure having at least one hole or opening suitable for processing (e.g., receiving an expandable member, undergoing cold expansion, etc.). The hole can be, for example, a through hole, non-through hole, blind hole, counter bore, or other types of holes that may or may not have backside access. In some embodiments, the primary workpiece is a bulkhead, fuselage, engine or other structural member of an aircraft, even if there is limited or no backside access. In some embodiments, the primary workpiece itself may be suitable for expansion (e.g., cold expansion) and may or may not be suitable for receiving an expandable member.

Overview of Processing System

FIG. 1 shows a processing system 100 including a processing tool 102, an expansion assembly 104 physically coupled to the processing tool 102, and a processor-based controller 106 communicatively coupled to the processing tool 102, according to one illustrated embodiment. Generally, the illustrated processing system 100 may be used for one-sided or two-sided installation of an expandable member such as a bushing 108*a* or rivetless nut plate 108*b* (generically expandable member 108) in hole 110 in a primary workpiece 112. A selectively expandable portion 114 of the expansion assembly 104 can be controllably expanded in order to expand and install the expandable member 108. After installation, the expandable portion 114 can be controllably contracted to separate the expansion assembly 104 from the installed expandable member 108 (shown in FIG. 1 prior to installation). The expandable member 108 is sometimes referred to herein as a secondary workpiece, since processing may be performed in the expandable member in installing the expandable member at least partially in the hole 110 of the primary workpiece 112.

As noted above, the processing system 100 (FIG. 1) can be used in procedures involving workpieces. As used herein, the term "primary workpiece" or sometimes just "workpiece" is broadly construed to include, without limitation, a parent structure having at least one hole or opening suitable for processing (e.g., receiving an expandable member, undergoing cold expansion, etc.). The hole can be, for example, a through hole, non-through hole, blind hole, counter bore, or other types of holes that may or may not have backside access. In some embodiments, the primary workpiece is a bulkhead, fuselage, engine or other structural member of an aircraft, even if there is limited or no backside access. In some embodiments, the primary workpiece itself may be suitable for expansion (e.g., cold expansion) and may or may not be suitable for receiving an expandable member.

The processing tool 102 can be driven electrically, hydraulically, pneumatically, or by any other suitable drive structures, mechanisms or engines. For example, the processing tool 102 may be fluidly communicatively coupled to a pressurization system 116 which includes a source of pressurized fluid, for instance one or more hydraulic reservoirs 118 (only one illustrated) and/or pumps 120 (only one illustrated) via a distribution system such as a hydraulic distribution system 122 including one or more fluid carrying conduits, valves, and/or manifolds. The pressurization system may be of any conventional design, thus is not described in detail in the interest of brevity. Notably, other sources of power or drive capable of producing the required or desired forces may be employed.

The illustrated processing tool 102 includes a main body 124 that is coupled to a grip 126. The user can manually grasp the grip 126 to controllably hold and accurately position the processing tool 102 with respect to the primary workpiece 112. The grip 126 is illustrated as a pistol grip, however, other types of grips can be utilized. Where in the form of a handheld device, the processing tool 102 may include a trigger 127, for example a rocker switch, momentary contact switch or other switch to activate the processing tool 102.

The illustrated processing tool 102 may include a second user operable button, key, switch or trigger 129, referred to herein as mode switch 129. The mode switch 129 may be operable for selectively changing a mode of operation of the processing tool 102. For example, an operator or end user may sequentially cycle or toggle through two or more modes of operation by selectively actuating the mode switch 129. Modes may, for example, include lube priming mode, operational cycle mode, error state mode.

The main body 124 houses a drive system 128 (shown in broken line in FIG. 1) that can drive a mandrel or core element 130 (FIG. 2A), 130 (FIG. 2B) (generically 130) of the expansion assembly 104 with respect to the expandable portion 114 of the expansion assembly 104. The drive system 128 can have a push/pull piston arrangement and may comprise a double acting piston 132 and hydraulic cylinder 134. Other cylinder arrangements are also possible.

A pair of fluid conduits or lines 136, 138 can provide pressurized fluid (e.g., pressurized gas, liquid, or combinations thereof) to the drive system 115 and/or relieve pressurized fluid from the drive system 128. For example, if the drive system 115 comprises a hydraulic piston arrangement, the fluid lines 136, 138 can provide pressurized hydraulic fluid.

Figure 2A:
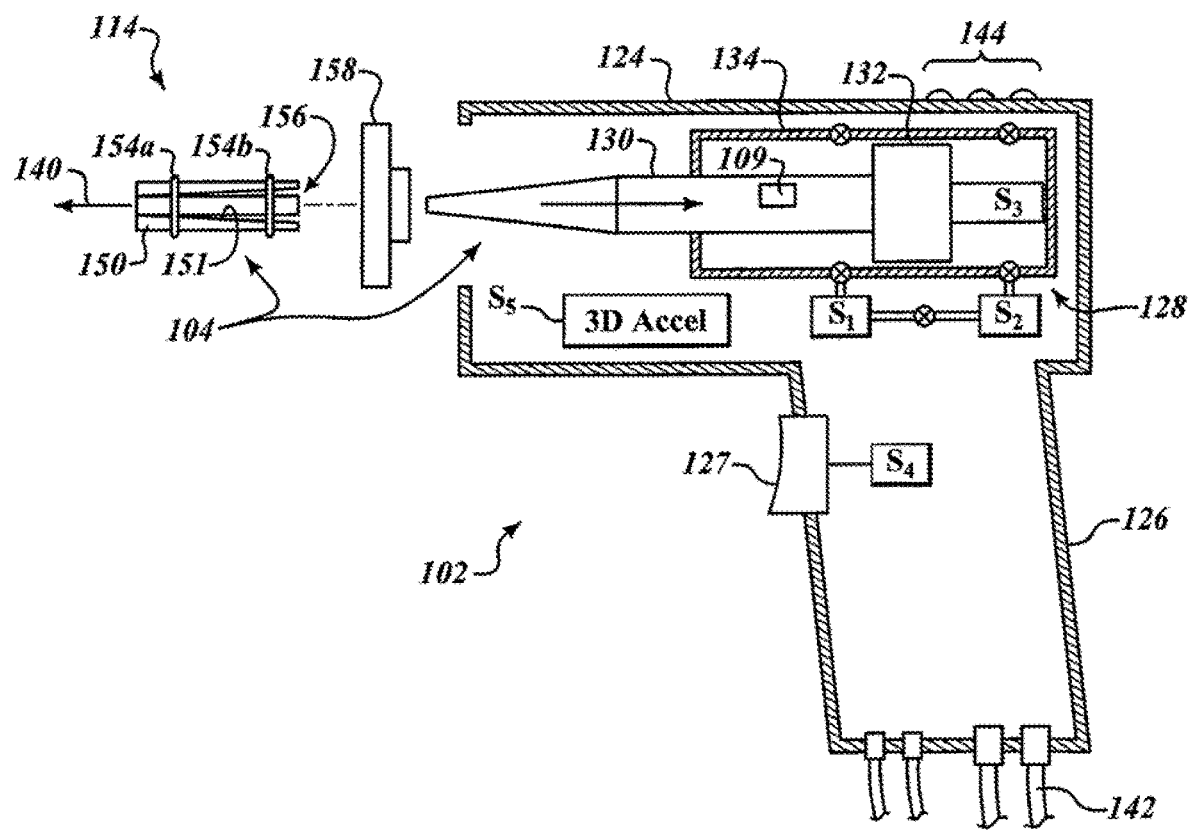
FIG. 2A is a partial sectional view of the processing tool and expansion assembly of FIG. 1 according to one implementation, particularly illustrating a piston of the processing tool, a core element of the expansion assembly, and a number of sensors of the processing tool that sense various operational conditions or characteristics of the processing tool and/or expansion assembly.
Figure 2B:
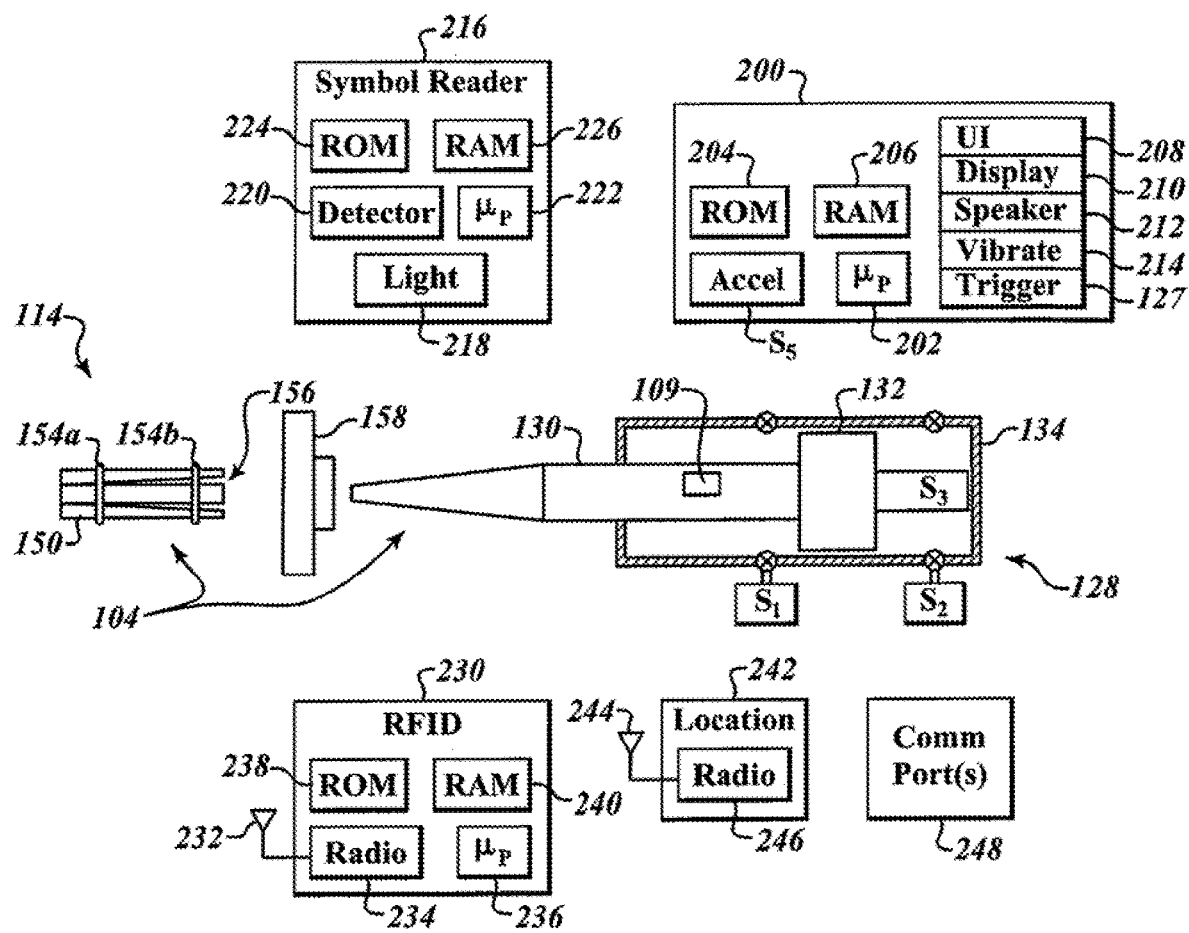
FIG. 2B is a partial sectional view of the processing tool and expansion assembly of FIG. 1 according to another implementation, particularly illustrating a piston of the processing tool, a core element of the expansion assembly, a number of sensors of the processing tool that sense various operational conditions or characteristics of the processing tool and/or expansion assembly, and a number of optional subsystems of the processing tool including a control subsystem, a machine-readable symbol reader subsystem, a radio frequency identification (RFID) interrogation subsystem, a spatial location subsystem, and communications subsystem.

The drive system 128 of FIGS. 2A and 2B can be activated to drive the core element 130 along a predetermined path. The predetermined path can be a generally linear path (e.g., a line of action) extending in a proximal and a distal direction. For example, the illustrated drive system 128 reciprocates or translates the core element 130 distally and proximally along a predetermined path represented by double headed arrow 140 (FIG. 2A).

A set of wires or a wire bundle 142 can provide wired communications between the processing tool 102 and the processor-based controller 106. Communications may be implemented via a controller-area network (CAN) bus using defined CAN bus protocols. Alternatively, wireless communications may be employed via one or more wireless transmitters, receivers, transceivers, or radios. As described in more detail herein, the communications may include the transmission of data or information sensed, measured or otherwise determined by one or more sensors of the processor tool 102 to the processor-based controller 106, which may be stored and/or analyzed. Also as described in more detail herein, the communications may include the transmission of instructions or commands, with or without data to the processor tool 102 from the processor-based controller 106, to control operation of the processor tool 102. In some less preferred embodiments, signaling (e.g., triggering) may be achieved via changes in pressure of a fluid, for instance pneumatically or hydraulically.

Optionally, the processing tool 100 may include one or more visual indicators 144 that provide a visual indication of an operating condition or state of the processing tool 102. For example, one or more of the visual indications may indicate when a drive member or actuator has reached a full forward position, which may be a position calibrated using an optional adjustment collar 158. Visual indicators 144 may, for example, take the form of one or more light emitting diodes (LEDs), for example emitting respective colors (e.g., Yellow, Green, Red) to indicated different conditions (e.g., installing or inserting, paused or stopped, error, retracting or withdrawal). For instance, steady green may indicate that the tool is ready for performing a processing cycle (e.g., lubed). Yellow may indicate that a processing cycle is being performed. Yellow with a flashing green may indicate that the processing cycle has been successfully completed. Steady or flashing red may indicated that an error has occurred. LEDs may additionally or alternatively be flashed in various patterns to indicate various error codes. Additionally or alternatively, error messages may be displayed on a display, for example an LCD, for instance carried by the power unit to which the tool is coupled. LEDs are relatively robust, and hence may be desirable for use in tools which are subjected to harsh environments and working conditions including shocks and drops. Alternatively, visual indicators may take other forms, for instance one or more liquid crystal displays, although such tend to be less rugged than LEDs. Alternatively, where pressure is employed to supply control signals to a processing tool, an indicator may take a mechanical form, for example a popup indicator that has a signal member which pops up in response to full travel of the drive member being achieved.

The various elements or components (e.g., sensors, LEDs) may be powered and/or communicatively coupled via one or more buses or other structures. For example, such may be communicatively coupled to the wires or wire bundle 142.

Such may be electrically coupled to on on-board power source (e.g., secondary chemical battery, fuel cell, ultra-capacitor array).

As further illustrated in FIG. 1, one or more components or elements may include a unique identifier, which may be read by the processing system 100.

For example, an expandable member such as bushing 108a may have inscribed on, include, carry or bear a machine-readable symbol 109a such as a one dimensional machine-readable symbol (i.e., barcode symbol) or two-dimensional machine-readable symbol (e.g., area or matrix code symbol) which encodes a unique identifier and is readable by a machine-readable symbol reader or subsystem. The machine-readable symbol 109a may, for example, be printed on a label and adhered to the bushing 108a on an appropriate surface thereof.

Also for example, an expandable member such as rivetless nut plate 108b may include, carry or bear a wireless transponder 109b such as a passive radio frequency identification (RFID) transponder or tag which encodes a unique identifier and/or other information that is readable by a reader such as an interrogator and/or writeable thereby. The wireless transponder 109b may, for example, be formed as a printed circuit trace antenna and integrated circuit component on a tag and adhered to the rivetless nut plate 108b on an appropriate surface thereof.

As another example, a primary workpiece 112 may include, carry or bear a combination machine-readable symbol and RFID transponder or tag 109c which encode a unique identifier and/or other information that is readable by a reader or interrogator and/or writeable thereby. The tag 109c may be adhered to the primary workpiece 112 on an appropriate surface thereof.

Also for example, the core element 130 and/or expandable portion 114 may include, carry or bear a wireless transponder such as a passive radio frequency identification (RFID) transponder or tag 109d (FIGS. 2A, 2B) which encodes a unique identifier and/or other information that is readable by an interrogator and/or writeable thereby. The wireless transponder 109d may, for example, be formed as a tag and adhered to the core element 130 and/or expandable portion 114 on an appropriate surface thereof. Alternatively, or additionally, the core element 130 and/or expandable portion 114 may include, carry or bear a machine-readable symbol.

In each of the above examples, use of a wireless transponder may provide advantages over machine-readable symbols, for example allowing storage of information, data or conditions after the transponder or tag is applied to the component. Such may also provide for non-line-of-sight reading. Various examples of operation advantageously employing wireless transponders and/or machine-readable symbols are described herein.

The processor-based controller 106 and the pressurization system 116 may be collocated, for example as power unit to which the tool 102 is coupled via hoses and cables. The power unit may be mounted to a frame (not shown), preferably a rugged tubular frame to provide protection to the various elements, particularly protection from the harsh environment and handling expected in typical manufacturing environments. The frame (not shown) may include a housing or shroud (not shown), again providing protection in a harsh environment. The frame (not shown) may include wheels (not shown). The frame (not shown) may include a handle (not shown), for example a telescoping handle, allowing the frame to be easily wheeled from location to location.

In use, pressing and holding the trigger 127 may cause the processing tool to perform a complete cycle of an operation, for instance a cold working radial expansion of a hole, with or without a fastener inserted in the hole. For example, when the processing tool is in a defined operational mode (e.g., operational cycle mode), pressing and holding the trigger 127 may cause the processing tool to 1) extend a core element (e.g., mandrel) 130, expanding a selectively expandable portion 114 to radially expand a hole, 2) dwelling briefly in the expanded state, and 3) retract the core element 130, allowing the selectively expandable portion 114 to return to an expanded configuration. Completion of the full cycle may be indicated to the operator or user, for example via a visual indication (e.g., illumination of green LED) and/or an aural alert. Releasing the trigger 127 prior to completion of the full cycle may cause the core element 130 to retract early. Failure to complete the full cycle may be indicated to the operator or user, for example via a visual indication (e.g., illumination of red LED) and/or an aural alert. The operator or user advantageously only needs to pay attention to the indicators (e.g., LEDs) to determine whether a processing operation has been successfully completed and can move on to the next processing operation (e.g., next hole).

FIG. 2A shows the processing tool 102 and expansion assembly 104 of FIG. 1, according to one illustrated embodiment. Many of the structures and elements are similar or even identical to those of the implementation illustrated in FIG. 1, and are thus denominated using the same reference numbers as in FIG. 1 or the same reference numbers with a lower case letter "a" appended thereto.

As illustrated in FIG. 2A, the expansion assembly 104 may comprises a core element 130 and an expandable portion 114. The expandable portion 114 is physically coupled to a distal portion 122 of the processing tool 104, typically extending therefrom. The core element 130 is positioned to be driven by the drive system 128, and to physically interact with the expandable portion to expand and the retract the expandable portion 114 in responsive to the core element 130 being driven by the drive system 128.

As used herein, the terms "core element" and "mandrel" are broad terms that include, but are not limited to, an elongated member configured to expand an expandable portion 114. The core element 130 can have a one-piece or multi-piece construction. In some embodiments, the core element has one or more expandable portions (e.g., enlarged and/or tapered portions) which can interact with the expandable portion 114 so as to cause expansion of at least a portion of the expandable portion 114.

As illustrated, the expandable portion 114 may be formed of a plurality of expansion segments 150, with a passageway 156 defined therebetween to engagingly receive the core element 130. The expansion segments 150 may each form a portion of a cylinder or annulus, for example each forming approximately a quarter section of a cylinder. When viewed from either a proximate or distal end, or longitudinally, the arrangement or array of expansion segments 150 may have an approximately circular or oval outer perimeter. The inner perimeter may be polygonal. In operation, the outer perimeter of the expansion segments 150 engage the expandable member 108, or the primary workpiece 112 if no expandable member is to be used. There may be small gaps 152 between adjacent edges of neighboring expansion segments 150 prior to expansion, which gaps 152 increase as the expansion segments 150 are radially expanded outwardly in response to translation of the core element 130 outwardly with respect to the processing tool 102. Alternatively, the adjacent edges may be in contact with one another prior to radial expansion, essentially eliminating any gaps 152.

In the implementation illustrated in FIG. 2A, an inner surface of the expansion segments 150 may be beveled or angled along at least a portion of a length of the expansion segment 150 (e.g., from proximate end to distal end thereof). The bevel or angle may, for example, complement a bevel or angle of the outer surfaces (i.e., expandable portions) of the core element 130. Such may cause the inner surface of the expansion segments 150 to interact with the outer surface(s) of the core element 130 to cause the expansion segments 150 to radially expand outwardly without pivoting of the expansion segments 150. Such may also cause the expansion segments 150 to radially withdraw or retract inwardly without pivoting or the expansion segments 150. Thus, each expansion segment 150 may move perpendicularly with respect to a centerline, longitudinal axis or center or a body or revolution of the expandable portion 114.

The expansion segments 150 may be expandably coupled to one another, for example via one or more bands 154a, 154b (collectively 154). As illustrated, two bands 154a, 154b may couple the expansion segments 150 together at two points along a length of the expandable portion 104. The bands 154a, 154b are radially expandable under the forces expected to be applied to the expansion segments 150. The bands 154 bias the expansion segments 150 into an first, unexpanded configuration. The bands 154 may take the form of steel bands, for example formed of a spring steel. Alternatively, the bands 154 may take the form of elastic bands, formed of one or more elastomers or similar substances having elastomeric properties. The bands 154 are positioned on either side of a center of a length of the array of expansion segments 150, for example proximate either end thereof. This may advantageously allow the outer surfaces of the expansion segments 150 to expandable equally along the entire length of the expandable portion (i.e., move radially without pivoting). This may advantageously eliminate or at least reduce any pivoting that would occur, or example pivoting that would occur when the expansion segments 150 are defined in a unitary structure.

The core element 130 can be moved distally along the path 140 from an initial position (toward the left in FIG. 2A) to an extended position (toward the left in FIG. 2A) to expand the expandable portion 114 from a first configuration to a second configuration. For example, the core element 130 can drive the expandable portion 114 from a radially retracted, withdrawn or collapsed configuration to a radially expanded configuration.

The partially or fully extended core element 130 can also be retracted along the path 140. When the extended core element 130 moves proximally along the path 140 towards its initial position, the expandable portion 114 retracts, withdraw or collapses inwardly. The bands 154 may bias or urge the segments 150 of the expandable portion 114 toward the radially retracted, withdrawn or collapsed configuration. Once the core element 130 is pulled out of the expandable portion 114, the expansion segments 150 may return to their fully retracted, withdrawn or collapsed configuration. In this manner, the expandable portion 114 can be repeatedly moved between the expanded and the retracted, withdrawn or collapsed configurations.

Optionally, a sleeve (not shown) may positioned in the passageway 156, which may form a protective liner between the core element 130 and at least a portion of the expansion segments 150 of the expandable portion 114. Optionally, a lubricant may be provided between the core element 130 and/or the expansion segments 150 of the expandable portion 114. Optionally, a surface of either or both of the core element 130 and/or the expansion segments 150 of the expandable portion 114 may be coated or treated to be lubricious for example treated with a tungsten based coating such as the commercially available under the trademark ULTRALUBE®.

Optionally, the processing tool 102 may include an optional collar 158. The collar 158 may have a central passage sized to receive the expandable portion 114 or the core element portion 130. The collar 158 may be detachably mounted to the processing tool 102 via threads, bayonet mount or other coupler mechanism. The collar 158 may retain the expandable portion 114 to the end of the processing tool 102, allowing selective replacement of same. The collar 158 may retain the core element portion 130 in the processing tool 102, allowing selective replacement of same. The collar may optionally be configured to allow selective adjustment an amount of travel of the core element 130, for example allowing adjustment or "tuning" of the processing tool for specific tasks. Such is discussed in more detail in U.S. provisional patent application Ser. No. 61/592,419, entitled "INSTALLATION/PROCESSING SYSTEMS, METHODS, AND COMPONENTS" and filed on the same day as this patent application, the contents of which are incorporated by reference herein in their entirety.

The processing tool 102 advantageously includes a number of sensors or transducers to sense, measure or detect various operational conditions or parameters.

For example, the processing tool 102 may include a number of pressure sensors $S_1$, $S_2$ (only two shown) coupled to sense pressure supplied to the drive system 128. Various types of pressures sensors may be employed. The pressure sensors $S_1$, $S_2$ may advantageously be positioned at or proximate the processing tool, to avoid losses associated with the conduits, lines and other structures between the hydraulic reservoir 118 (FIG. 1) and the cylinder 134. This may produce more accurate determination of pressure, which may be particularly advantageous as explained in detail herein with reference to various method of operation. Pressure sensors may, for instance, be used to determine when full forward travel of the core element 130 has occurred and/or when full rearward travel of the core element 130 has occurred. For example, a threshold pressure may be programmed corresponding to the pressure that should be experienced when a hole is radially expanded and/or when the core element 130 hits a stop in returning to the retracted or fully withdrawn position.

Also for example, the processing tool 102 may include a number of position sensors $S_3$ (only one shown) coupled to sense a position of a moveable element, for example a position of the piston 132. Various types of position sensors may be employed, for example linear variable displacement transducers (LVDTs). The position sensor(s) $S_3$, $S_2$ may advantageously be positioned at a face of the piston, for example between rearwardly facing face of the piston 132 and an opposing wall of the cylinder 134. This may produce accurate determinations of position, travel or stroke, which may be particularly advantageous as explained in detail herein with reference to various method of operation.

As another example, the processing tool 102 may include a number of actuation sensors $S_4$ (only one shown) coupled to sense or detect activation by an end user, for example a pull of trigger 127 or other switch activation. Various types of activation sensors may be employed, for example contact sensors. Accurate determinations of actuation may be particularly advantageous as explained in detail herein with reference to various method of operation.

As yet another example, the processing tool 102 may include a number of accelerometers $S_5$ (only one shown) to sense or detect orientation and/or acceleration or movement of the processing tool. Various types of accelerometers may be employed, for example 3-axis accelerometers. Accurate determinations of orientation or movement may be particularly advantageous as explained in detail herein with reference to various method of operation.

FIG. 2B shows the processing tool 102 and expansion assembly 104 of FIG. 1, according to one illustrated embodiment. Many of the structures and elements are similar or even identical to those of the implementation illustrated in FIG. 1, and are thus denominated using the same reference numbers as in FIG. 1 or the same reference numbers with a lower case letter "b" appended thereto. Discussion of similar or identical structures and elements is not repeated in the interest of brevity.

The implementation of FIG. 2B adds a number of subsystems as compared to the implementation of FIG. 2A. Various implementations may include one or more of these subsystems, or may omit such as does the implementation of FIG. 2A.

The processing tool 102 may include a control subsystem 200 to read machine-readable symbols 109a, 109c (FIG. 1). The control subsystem 200 may take any of a large variety of forms. Without limiting the alternatives, the control subsystem 200 may include one or more controllers 202, for example one or more microprocessors, DSPs, ASICS, PGAs, PLCs, etc. to programmed or otherwise control operation of the processing tool 102. The controller 202 may be communicatively coupled to one or more nontransitory processor readable media, for instance via one or more buses (not shown). For example, the controller 202 may be coupled to nonvolatile memory which stores instructions and/or data, for instance read only memory (ROM) or Flash memory 204. Additionally, or alternatively, the controller may be coupled to volatile memory which stores instructions and/or data, for instance random access memory (RAM) 206. Alternatively, the processing tool 102 may omit the controller 200 and memory 204, 206, relying on an external system to control operation thereof.

The control subsystem 200 may include a user interface (UI) 208. The UI 208 may, for example include one or more displays, such as an LCD display 210. The UI 208 may include one or more speakers 212, operable to provide audible alerts and possible prompts or instructions to the end user. The UI 208 may include one or more vibrators 214 (e.g., piezoelectric vibration elements) to provide tactile alerts or feedback to the end user. The U 1208 may include the trigger 127, and/or some other switches, keys, or use actuatable buttons or user selectable icons.

The processing tool 102 may include a machine-readable symbol reading subsystem 216 to read machine-readable symbols 109a, 109c (FIG. 1). The machine-readable symbol reading subsystem 216 may take any of a large variety of forms, for example laser based or scanning machine-readable symbol readers or flood illumination or imaging based machine-readable symbol readers. Machine-readable symbol reader scanning units are commercially available in a variety of form factors, including those suitable for inclusion in handheld devices. Without limiting the alternatives, the machine-readable symbol subsystem 216 may include one or more illumination sources 218, or may rely on ambient lighting. Suitable illumination sources 218 may include a laser and scanning mirror (e.g., rotating polygonal mirror). Suitable illumination sources 218 may include one or more LEDs. The machine-readable symbol subsystem 216 may include one or more detectors 220. Suitable detectors 220 may, for example, include linear or two-dimensional arrays of charge coupled devices (CCDs), photodiodes, Vidicons, and/or CMOS imager capture devices. The machine-readable symbol subsystem 216 may include one or more controllers 222, for example one or more microprocessors, DSPs, ASICS, PGAs, PLCs, etc. to programmed or otherwise configured to decode information read from the machine-readable symbols. The controller 222 may be communicatively coupled to one or more nontransitory processor readable media. For example, the controller 222 may be coupled to nonvolatile memory which stores instructions and/or data, for instance read only memory (ROM) or Flash memory 224. Additionally, or alternatively, the controller 222 may be coupled to volatile memory which stores instructions and/or data, for instance random access memory (RAM) 226. Alternatively, the processing tool 102 may omit the controller 222 and memory 224, 226, relying on an external system to decode such information.

In some implementations, the detector(s) 220 may also serve to capture images of the processing, for example images of the primary workpiece 112, hole 110 and/or expandable member 108 during various portions of a processing cycle. One of the processors 202, 222 may control the detector(s) 220 or sample the same, at various defined times, points or events of the processing cycle. The resulting images or image data may be stored to a nontransitory storage medium, for example for later validation of the processing operation. Alternatively or additionally, the resulting images or image data may be computationally analyzed to assess various aspects of the processing and/or materials. Some implementations may include a dedicated imager capture device, in addition to, or in place of the detector(s) 220.

The processing tool 102 may include a wireless transponder reader or interrogation subsystem 230 to read wireless data carriers, for instance radio frequency identification (RFID) transponders 109b, 109c, 109d (FIG. 1). The wireless transponder reader or interrogation subsystem 230 may take any of a large variety of forms, for example operating at various unlicensed or even licensed frequency bands and using any variety of communications protocols (e.g., TDMA, FDMA, CDMA). RFID interrogation units are commercially available in a variety of form factors, including those suitable for inclusion in handheld devices. Without limiting the alternatives, the wireless transponder reader or interrogation subsystem 230 may include one or more antennas 232. The wireless transponder reader or interrogation subsystem 230 may include one or more radios 234 (e.g., transmitter, receiver, transceiver). The wireless transponder reader or interrogation subsystem 230 may include one or more controllers 236, for example one or more microprocessors, DSPs, ASICS, PGAs, PLCs, etc. to programmed or otherwise configured to decode information encoded in the received wireless signals and/or to write information to the wireless transponders and/or perform singulation to isolate wireless transponders. The controller 236 may be communicatively coupled to one or more nontransitory processor readable media. For example, the controller 236 may be coupled to nonvolatile memory which stores instructions and/or data, for instance read only memory (ROM) or Flash memory 238. Additionally, or alternatively, the controller may be coupled to volatile memory which stores instructions and/or data, for instance random access memory (RAM) 240. Alternatively, the processing tool 102 may omit the controller 236 and memory 238, 240, relying on an external system to decode such information.

The processing tool 102 may include a wireless transponder reader or spatial location subsystem 242 to determine a spatial location of the processing tool 102 or facilitate determination that spatial location. The spatial location subsystem 242 may take any of a large variety of forms, for example operating employing time-of-flight determination, triangulation and/or global positioning system (GPS) location determination. Various spatial location determination units (e.g., GPS) are commercially available in a variety of form factors, including those suitable for inclusion in handheld devices. Without limiting the alternatives, the spatial location subsystem 242 may include one or more antennas 244. The spatial location subsystem 242 may include one or more radios 246 (e.g., transmitter, receiver, transceiver). The spatial location subsystem 242 may include one or more controllers (not shown), for example one or more microprocessors, DSPs, ASICS, PGAs, PLCs, etc. to programmed or otherwise configured to decode information encoded in the received wireless signals and/or to write information to the wireless transponders and/or perform singulation to isolate wireless transponders. The controller may be communicatively coupled to one or more nontransitory processor readable media (not shown), for example nonvolatile or volatile memory. Alternatively, the processing tool 102 may rely on an external system to determine spatial location, for example using triangulation based on signals received at various external antennas (FIG. 4) from the radio 246.

The processing tool 102 may include one or more communications ports 248. The communications port(s) 248 may provide communications with devices external to the processing tool 102. The communications ports 248 may include wired as well as wireless ports. For example, the communications ports 248 may include Ethernet ports, Universal Serial Bus (USB) ports, Firewire ports, Thunderbolt ports, etc., and/or ports compliant with various IEEE 802.11 protocols.

The particular expansion assembly 104 illustrated and described in FIGS. 2A and 2B are discussed in more detail in U.S. provisional patent application Ser. No. 61/592,419, entitled "INSTALLATION/PROCESSING SYSTEMS, METHODS, AND COMPONENTS AND" and filed on the same day as this patent application, the contents of which are incorporated by reference herein in their entirety. While FIGS. 2A and 2B illustrate a particular expansion assembly, other structures may be employed. For example, the structures described in U.S. Pat. No. 8,069,699, which is incorporated herein by reference in its entirety.

Figure 3:
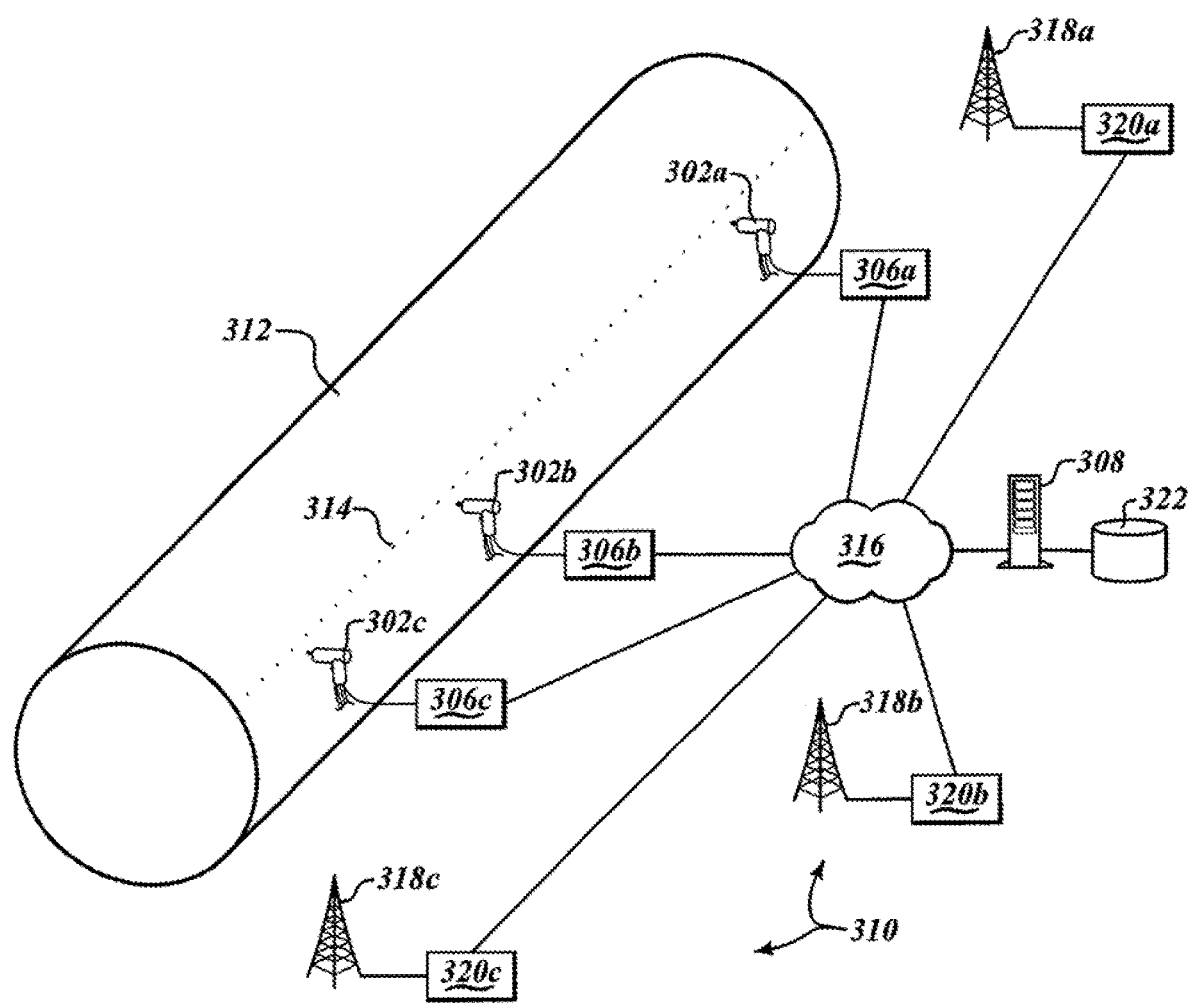
FIG. 3 is an isometric environmental view of a number of the processing systems of FIG. 1 in use on a portion of a primary workpiece, each communicatively coupled with a host computer system such as a server computer system, and illustrating a spatial location network to facilitate spatially locating respective ones of the processing tools in the environment.

FIG. 3 shows a processing system 300 including a plurality of processing tools 302a-302c (only three shown, collectively 302), processor-based controllers 306a-306c (only three shown, collectively 306), one or more host computer systems 308 (only one shown), and a spatial location system 310 positioned relative to a primary workpiece 312, according to one illustrated embodiment.

The primary workpiece 312 may take a variety of forms, and may for example be large enough that two or more end users will work on the workpiece concurrently or simultaneously. An example of such is a portion of an aircraft, for instance a fuselage or wing. The primary workpiece 312 may include a plurality of holes 314 (only one called out in FIG. 3) into which expandable members 108 FIG. 1) may be installed, for instance via radial expansion that achieves cold working stress relief in the workpiece 312 proximate each hole 314. Alternatively, the holes 314 may be cold worked without the installation of an expandable member.

The processing tools 102 and processor-based controller 106 may take the form of those described in reference to FIGS. 1, 2A and 2B. These may be communicatively coupled to the host computer system(s) 308, for example via a wired and/or wireless network 316, for example a local area network or wide area network. Any conventional networking infrastructure or protocol may be employed.

The spatial location system 310 may determine or facilitate determination of specific locations of the processing tools 302, for example during use. Such may be used to determine a spatial location of the processing tool 302 each time the processing tool 302 is operated, for example each time a trigger is pulled. Such may be particularly advantageous where the processing tools 302 are handheld, thus can be used in a relative uncontrolled manner as compared for example to CNC machining. This information may combined with other information to uniquely characterize the installation in, or other processing of, each hole 314 in the workpiece 312. The spatial location system 310 may include a number of antennas 318a-318c (only three shown, collectively 318) and radios 320a-320c (only three shown, collectively 320). The number and positioning of the antennas 318 may be sufficient to allow triangulation. In some implementations a single radio 320 may be shared between two or more antennas 318. The host computer system 308 may be configured to use information from the radios 320 to determine a spatial location of each of the processing tools 302, for example using triangulation or time of flight techniques. Alternatively, or additionally, the processing tools 302 or processor-based controller 306 may determine spatial location based on receipt of signals from the antennas 318.

The host computer system 308 may take the form of a server computer system and may include one or more nontransitory storage media 322. The nontransitory storage media 322 may take any of a large variety of forms, for instance hard disk, optical media, tape, etc. The host computer system 308 may track and/or store information to the nontransitory storage media 322. For example, host computer system 308 stores information which characterizes each use of a processing tool 302. The host computer system 308. The information may be combined with location information, allowing various operational conditions (e.g., force, pressure, travel, yield, deformation, angles) to be recorded for each hole 314. Such may provide documentary evidence of each installation or processing operation (e.g., cold worked radial expansion).

Figure 4:
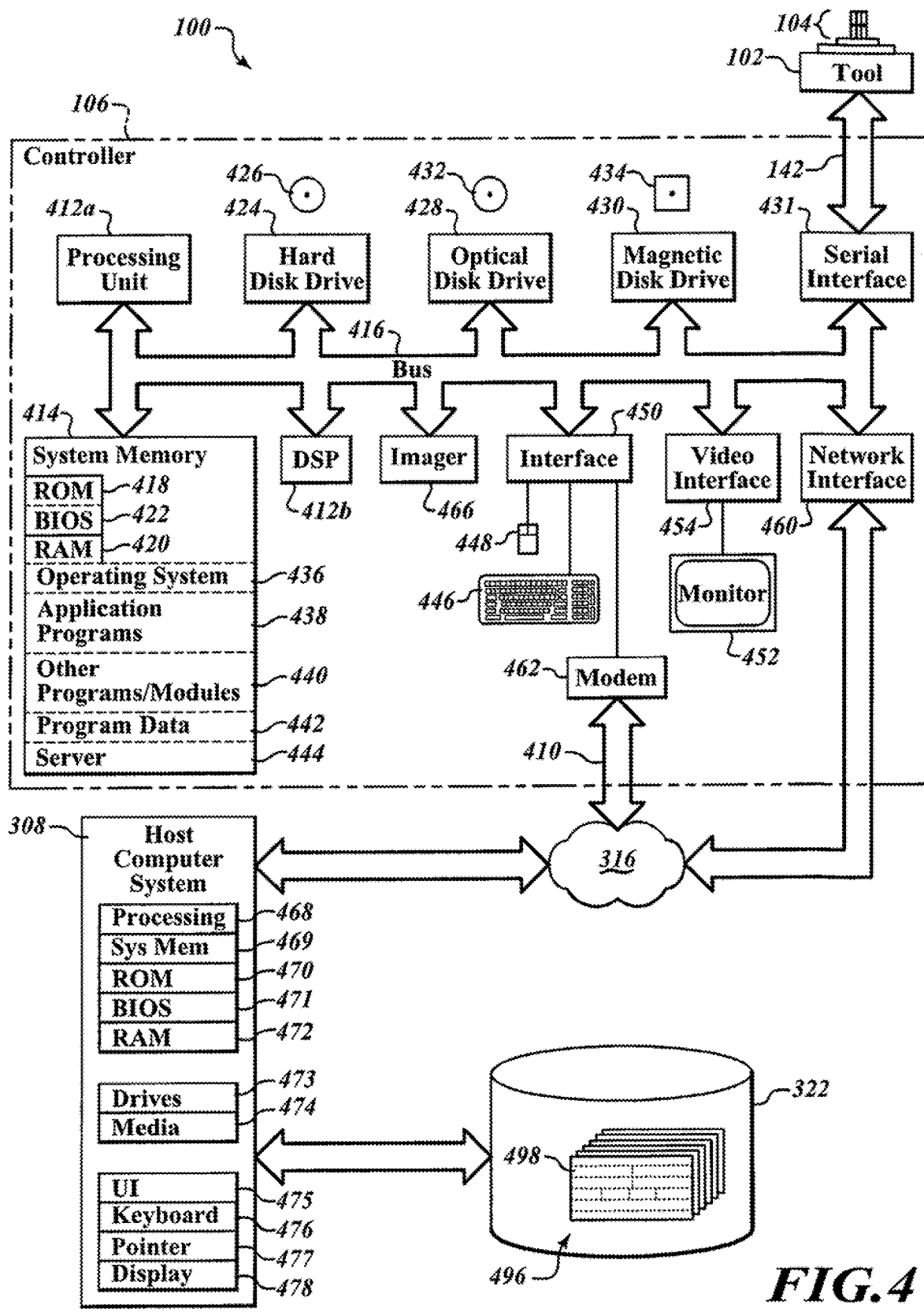
FIG. 4 is a schematic diagram of a processing system including a processing tool and processor-based controller, communicatively coupled to a host computer system via a network, according to one illustrated embodiment, communicatively coupled to at least one of the processing tools.

FIG. 4 shows a portion of a processing system 100 comprising a processor-based controller 106 communicatively coupled to a processing tool 102, and a host computer system 308 communicatively coupled to the processor-based control system 106, according to one illustrated embodiment. FIG. 4 provides a more detailed representation of some of the elements of FIGS. 1 and 3.

The processor-based controller 106 will at times be referred to in the singular herein, but this is not intended to limit the embodiments to a single device or system since in typical embodiments, there may be more than one processor-based controller 106 involved. While illustrated in FIG. 2A as separate from or external with respect to the processing tool 102, the processor-based controller 106 may be part of the processing tool 102, for example as illustrated in FIG. 2B. Unless described otherwise, the construction and operation of the various blocks shown in FIG. 4 are of conventional design. As a result, such blocks need not be described in further detail herein, as they will be understood by those skilled in the relevant art.

The processor-based controller 106 may include one or more processing units 412a, 412b (collectively 412), a system memory 414 and a system bus 416 that couples various system components including the system memory 414 to the processing units 412. The processing units 412 may be any logic processing unit, such as one or more central processing units (CPUs) 412a, DSPs 412b, application-specific integrated circuits (ASICs), field programmable gate arrays (FPGAs), etc. The system bus 416 can employ any known bus structures or architectures, including a memory bus with memory controller, a peripheral bus, and a local bus. The system memory 414 includes read-only memory ("ROM") 418 and random access memory ("RAM") 420. A basic input/output system ("BIOS") 422, which can form part of the ROM 418, contains basic routines that help transfer information between elements within the processor-based controller 106, such as during start-up.

The processor-based controller 106 may include a hard disk drive 424 for reading from and writing to a hard disk 426, an optical disk drive 428 for reading from and writing to removable optical disks 432, and/or a magnetic disk drive 430 for reading from and writing to magnetic disks 434. The optical disk 432 can be a CD/DVD-ROM, while the magnetic disk 434 can be a magnetic floppy disk or diskette. The hard disk drive 424, optical disk drive 428 and magnetic disk drive 430 may communicate with the processing unit 412 via the system bus 416. The hard disk drive 424, optical disk drive 428 and magnetic disk drive 430 may include interfaces or controllers (not shown) coupled between such drives and the system bus 416, as is known by those skilled in the relevant art. The drives 424, 428 and 430, and their associated computer-readable storage media 426, 432, 434, may provide nonvolatile and non-transitory storage of computer readable instructions, data structures, program engines and other data for the processor-based controller 106. Although the depicted processor-based controller 106 is illustrated employing a hard disk 424, optical disk 428 and magnetic disk 430, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, smart cards, etc. The hard disk 426 may, for example, store instructions and/or data to collect information or data from the processing tool 102 and/or control the processing tool 102. The instructions may cause the processor-based controller 106 to control the processing tool 102 according to a defined algorithm, which may, or may not, take into account information or data sensed by sensors (e.g., sensors $S_1$-$S_5$ of FIGS. 2A and 2B) of the processing tool 102.

Such may form a real-time or dynamic feedback system, adjusting operation of the processing tool 102 based on sensed operational conditions, including conditions that are related to the workpiece or a component (e.g., expandable member) to be installed in a hole in the workpiece. Such may also detect abnormalities in operation (e.g., sequence out of order, unexpected condition, angle or orientation of processing tool, incorrect material, excessive cycles or wear, over temperature, over or under pressure conditions). Such may automatically correct for certain abnormalities, provide an alert or even prompt a user with a suggested corrective action. For example, on occurrence of certain abnormal conditions, the instructions may cause the processing tool to retract the core element 130 (FIG. 2A, 2B) before achieving a defined or desired radial expansion, allowing realignment of the processing tool 102. Additional details regarding such operation, as well as other operations are discussed herein with respect to the various methods of operation.

Program engines can be stored in the system memory 414, such as an operating system 436, one or more application programs 438, other programs or engines 440 and program data 442.

Application programs 438 may include instructions that cause the processor(s) 412 to automatically collect, store and/or update information regarding a particular operation (e.g., installation, cold work radial expansion). Such may, for example be on a hole by hole basis, workpiece-by-workpiece basis, and/or user-by-user basis. Application programs 438 may include instructions that cause the processor(s) 412 to analyze data or information representative of operating conditions, and/or control operation of the processing tool 102 based on the analysis. Analysis of data may include, for example one or more of determining initial contact with a material, determining initial hole size, determining yield point of material, determining an amount of radial expansion past a yield point of material, determining an end point, determining whether the material has characteristics consistent with expected material, determining orientation of processing tool at various times or steps of an operation cycle, among other operational characteristics. Analysis, alerts, corrective actions, suggestive prompts, and related data or information may be stored for future reference, for example stored via nontransitory storage media 322 (FIG. 3). Collected data representing the operation of the processing tool 102, the characteristics of a workpiece 112 (FIG. 1), and/or characteristics of an expandable member 108 (FIG. 1) fixed or fixable in a hole 110 in the primary workpiece 112, may be stored to the nontransitory storage media 426, 432, 434, for example in one or more data structures, for instance in data structures of a database (e.g., relational database).

Application programs 438 may also include instructions to determine a spatial location of the processing tool 102 based on information received from the spatial location system (FIG. 3) and/or processing tool 102 or processor-based controller 106. For example, the instructions may include a triangulation algorithm or other algorithm for accessing location based on signals (e.g., signal strength, signal timing) received at a number of spaced apart antennas or received from a number of spaced apart antennas. Any form of location determination may be employed. Program engines may also include instructions to record abnormalities and/or send or transmit alerts or messages on occurrence of certain events, such as abnormalities in operation or divergence from expected materials or characteristics (e.g., hole size, yield point). Alerts may be visual, aural, and may include electronic communications including text messages, emails, automated voicemail or phone messages.

Application programs 438 may also include instructions to monitor usage of the processing tool and/or a consumable component (e.g., expansion assembly 104, core element 130, expansion segments 150 or expansion segment bundle 114). Such may, for example, monitor a total number of uses or cycles (e.g., complete operating cycles) to which each component has been subjected. Such may additionally or alternatively monitor a level of wear of the components. Such may additionally or alternatively monitor a time in service of components. The application program 438 may provide alerts once a threshold condition (e.g. maximum permitted cycles, maximum wear or minimum surface). The application program 438 may provide alerts in anticipation of reaching a threshold, for example at 80% and/or 90% of threshold, allowing ordering of replacement part(s), or even automatically generating an electronic order for replacement part(s). Alerts may be provided to a user of the processing tool, as well as to remotely located individuals such as managers or procurement personnel.

Application programs 438 may also include instructions to limit usage of the processing tool 102 and/or a consumable component (e.g., expansion assembly 104, core element 130, expansion segments 150 or expansion segment bundle 114). Such may, for example, prevent continued usage of a processing tool once certain thresholds of processing tool usage have been reached. Such may, for example, prevent continued usage of a consumable component (e.g., expansion assembly 104, core element 130, expansion segments 150 or expansion segment bundle 114) once certain thresholds of consumable component usage have been reached. For example, operation of a processing tool 102 may be disabled while a particular consumable component is coupled thereto. Such may be implemented, for example by use of identifiers physically or at least proximally associated with the consumable components. For example, identifiers may be read from a machine-readable symbol 109a (FIG. 1) or wireless transponders 109b (FIG. 1) associated with the consumable component. Such allow tracking of usage of the consumable component, even when such usage occurs with two or even more processing tools 102. Usage, or other lifetime limiting information may be stored in a database at the processor-based controller 106 or host computer system 308. Additionally, or alternatively, usage, or other lifetime limiting information may be stored in a nontransitory storage medium physically associated with the processing tool 102 and/or consumable component. For instance, the information may be stored to an RFID tag 109d (FIGS. 2A, 2B) carried by the consumable component. The information may be updated from time-to-time to reflect usage, for example being written to after each complete cycle of processing a hole in a workpiece. Pairing the information with the consumable component prevents continued usage of the consumable component even when switched to a different processing tool 102. The processing tool 102 or processor-based controller 106 may be programmed such that they are rendered inoperable unless physically paired with a consumable component with a valid RFID tag 109b (FIG. 1) and with a flag, count or other piece of data stored therein which indicates that usage limits for that particular consumable component have not exceeded.

Other program engines 440 may include instructions for handling security such as password or other access protection and communications encryption. The system memory 414 may also include communications programs, for example, a server 444 for permitting the processor-based controller 106 to provide services and exchange data with other computer systems or devices via the Internet, corporate intranets, extranets, or other networks (e.g., LANs, WANs) as described below, as well as other server applications on server computing systems such as those discussed further herein. The server 444 in the depicted embodiment may be markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers are commercially available such as those from Microsoft, Oracle, IBM and Apple.

While shown in FIG. 4 as being stored in the system memory 414, the operating system 436, application programs 438, other programs/engines 440, program data 442 and server 444 can be stored on the hard disk 426 of the hard disk drive 424, the optical disk 432 of the optical disk drive 428 and/or the magnetic disk 434 of the magnetic disk drive 430.

An operator can enter commands and information into the processor-based controller 106 through input devices such as a touch screen or keyboard 446 and/or a pointing device such as a mouse 448, and/or via a graphical user interface. Other input devices can include a microphone, joystick, game pad, tablet, scanner, etc. These and other input devices are connected to one or more of the processing units 412 through an interface 450 such as a serial port interface that couples to the system bus 416, although other interfaces such as a parallel port, a game port or a wireless interface or a universal serial bus ("USB") can be used. A monitor 452 or other display device is coupled to the system bus 416 via a video interface 454, such as a video adapter. The processor-based controller 106 can include other output devices, such as speakers, printers, etc.

The processor-based controller 106 may be communicatively coupled to the processor tool 102, for example via a dedicated communications channel such as a set or wires or wire bundle 142, employing serial or parallel communications. Alternatively, the processor-based controller 106 may be communicatively coupled to the processor tool 102 via a shared, network communications channel. The processor-based controller 106 can operate in a networked environment using logical connections to one or more remote computers and/or devices as described above with reference to FIG. 3. For example, the processor-based controller 106 can operate in a networked environment 316 (FIG. 3) using logical connections to one or more host computer systems 308. Communications may be via a wired and/or wireless network architecture, for instance, wired and wireless enterprise-wide computer networks, intranets, extranets, and the Internet. Other embodiments may include other types of communication networks 316 including telecommunications networks, cellular networks, paging networks, and other mobile networks.

The host computer system 308 may take the form of a conventional mainframe computer, mini-computer, workstation computer, personal computer (desktop or laptop), or handheld computer. The host computer system 308 may include a processing unit 468, a system memory 469 and a system bus (not shown) that couples various system components including the system memory 469 to the processing unit 468. The host computer system 308 will at times be referred to in the singular herein, but this is not intended to limit the embodiments to a single host computer system 308 since in typical embodiments, there may be more than one host computer system 308 or other device involved. Non-limiting examples of commercially available computer systems include, but are not limited to, an 80x86, Pentium, or i7 series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 468 may be any logic processing unit, such as one or more CPUs, DSPs, ASICs, FPGAs, etc. Unless described otherwise, the construction and operation of the various blocks shown in FIG. 4 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 469 includes read-only memory ("ROM") 470 and random access memory ("RAM") 472. A basic input/output system ("BIOS") 471, which can form part of the ROM 470, contains basic routines that help transfer information between elements within the host computer system 308, such as during start-up.

The host computer system 308 may also include one or more media drives 473 (e.g., a hard disk drive, magnetic disk drive, and/or optical disk drive) for reading from and writing to computer-readable storage media 474 (e.g., hard disk, optical disks, and/or magnetic disks). The computer-readable storage media 474 may, for example, take the form of removable media. For example, hard disks may take the form of a Winchester drives, optical disks can take the form of CD-ROMs, while magnetic disks can take the form of magnetic floppy disks or diskettes. The media drive(s) 473 communicate with the processing unit 468 via one or more system buses. The media drives 473 may include interfaces or controllers (not shown) coupled between such drives and the system bus, as is known by those skilled in the relevant art. The media drives 473, and their associated computer-readable storage media 474, provide nonvolatile storage of computer readable instructions, data structures, program engines and other data. Although described as employing computer-readable storage media 474 such as hard disks, optical disks and magnetic disks, those skilled in the relevant art will appreciate that host computer system 308 may employ other types of computer-readable storage media that can store data accessible by a computer, such as magnetic cassettes, flash memory cards, digital video disks ("DVD"), Bernoulli cartridges, RAMs, ROMs, smart cards, etc. Data or information, for example, data collected from operation of processing tool(s) 102 related to processing tool operational conditions and analysis of same, can be stored in the computer-readable storage media 474. The data related to operational conditions may include data that is indicative of properties of primary workpieces 112 (FIG. 1) or elements (e.g., expandable members 108) fixable or fixed in holes 110 of the primary workpieces, to the extent such is discernible directly by the sensors $S_1$-$S_5$ (FIGS. 2A, 2B) or indirectly by analysis of conditions or parameters sensed by the sensors $S_1$-$S_5$ and/or other sensors (e.g., temperature sensors for instance thermocouples). Additionally, or alternatively, data or information, for example, data used for controlling operation of processing tool(s) 102, can be stored in the computer-readable storage media 474.

Program engines, such as an operating system, one or more application programs, other programs or engines and program data, can be stored in the system memory 469. Program engines may include instructions to store and/or retrieve information regarding operation of the processing tool(s) 102, and particularly information related to each processing operation perform by the processing tool 102. For example, a program engine may store and/or retrieve collected data representing the operation of the processing tool 102, the characteristics of a primary workpiece 112 (FIG. 1), and/or characteristics of an expandable member 108 (FIG. 1) fixed or fixable in a hole 110 in the primary workpiece 112, to the nontransitory storage media 322. Such may, for example, be stored in and/or retrieved from one or more data structures 498, for example data structures of a relational database 496.

Program engines may include instructions for handling security such as password or other access protection and communications encryption. The system memory 469 may also include communications programs, for example, a Web client or browser that permits the host computer system 308 to access and exchange data with sources such as Web sites of the Internet, corporate intranets, extranets, or other networks as described below, as well as other server applications on server computing systems such as those discussed further below. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 469, the operating system, application programs, other programs/engines, program data and/or browser can be stored on the computer-readable storage media 474 of the media drive(s) 473. An operator can enter commands and information into the sending client computer system 114a via a user interface 475 through input devices such as a touch screen or keyboard 476 and/or a pointing device 477 such as a mouse. Other input devices can include a microphone, joystick, game pad, tablet, scanner, etc. These and other input devices are connected to the processing unit 469 through an interface such as a serial port interface that couples to the system bus, although other interfaces such as a parallel port, a game port or a wireless interface or a universal serial bus ("USB") can be used. A display or monitor 478 may be coupled to the system bus via a video interface, such as a video adapter. The host computer system 308 can include other output devices, such as speakers, printers, etc.

FIGS. 5A-5H show response relationships 500a-500h, respectively, for a number of example processes. Each of the illustrated response relationships 550a-500h varies from one another in one or more aspects. These variations are indicated by reference numbers which include an alphabetic character appended thereto, which alphabetic character matches the alphabetic character appended to the Figure number, but in lower case. In FIGS. 550b-500h only these variations are called out, in order to improve drawing legibility. These response relationships are not intended to necessarily reflect any actual processing or any actual materials, but rather are provided to illustrate the various concepts employed herein.

Figure 5A:
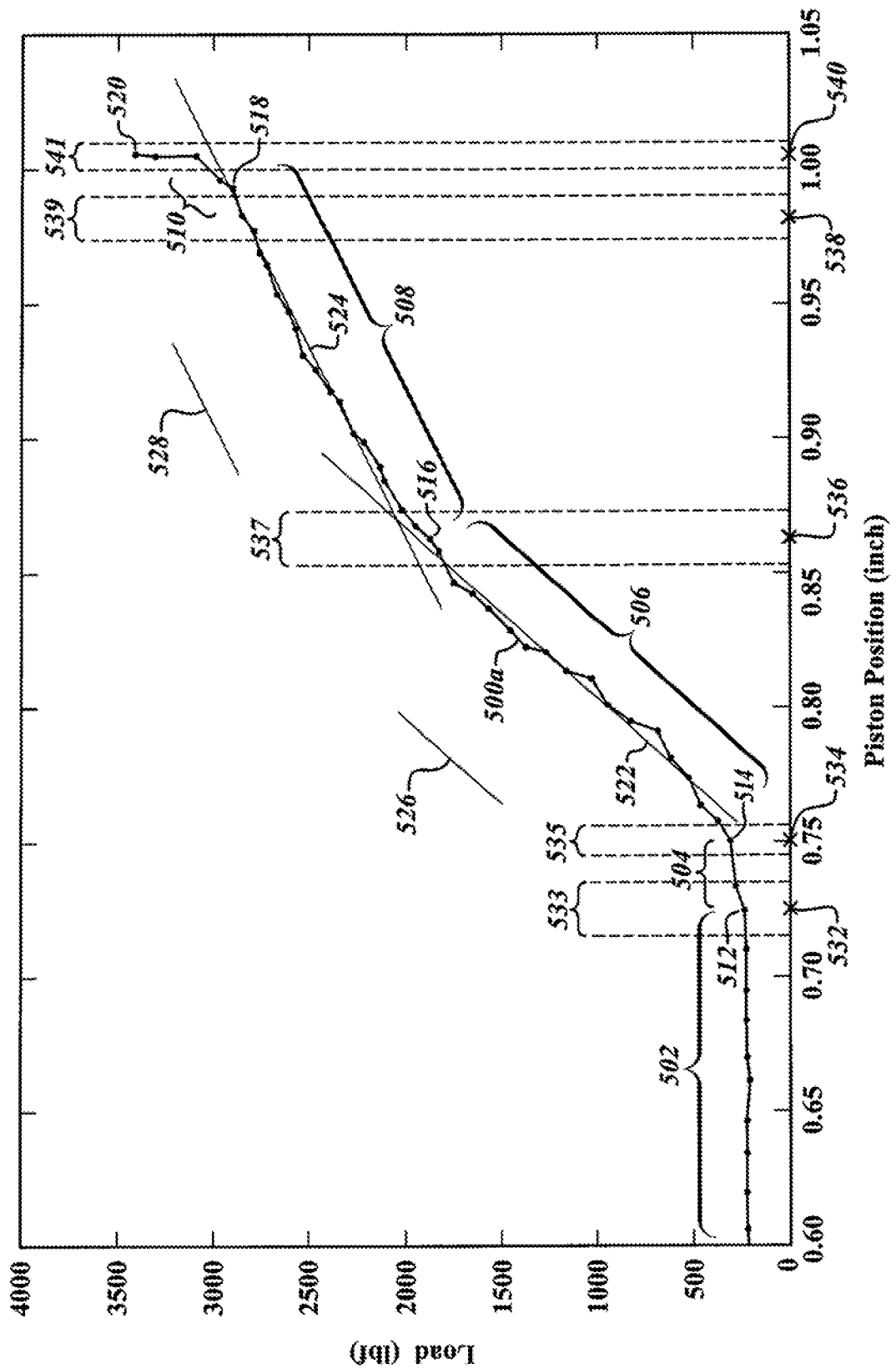
FIG. 5A is a plot or graph of pressure versus position of a drive member of a processing tool, accordingly to one illustrated embodiment, showing a sensed or measured response relationship that is within tolerance of an expected response relationship.

FIG. 5A shows a response relationship 500a for a processing on a primary workpiece 112 (FIG. 1), according to one illustrated embodiment. The processing may take a variety of forms, for example radial expansion of a hole 110 (FIG. 1) in the primary workpiece 112 to achieve cold working stress relief in the material surrounding the hole 110. Such may be performed directly on a hole 110, or may additionally secure an expandable member 108 (e.g., bushing, flanged bushing, rivetless nut plate, grommet) in the hole 110 via a high interference fit.

The response relationship 500a may be a function of two, or more variables. As illustrated, the response relationship 500a is a function of a first variable, for instance an applied force, a reaction force to the applied force, or a pressure, and a second variable, for instance a position, or distance or amount of travel. For example, where a processing tool employs a piston and cylinder driven by hydraulics, the first variable may take the form of a measure of pressure applied to the piston. Such may advantageously be measured proximate the piston (e.g., at inlet valve to cylinder) via any variety of pressure sensors or transducers. Alternatively, a force sensor may detect an amount of force applied by the piston or some other drive element (e.g., core element, segments of expansion assembly). The second variable may, for example be a position of the piston at any given time, or an amount or distance the piston has traveled. Alternatively, the second variable may be a position of some other drive element (e.g., core element, segments of expansion assembly). Such may be measured via a variety of position sensors, for instance a LVDT, or an encoder for instance an optical encoder or magnetic encoder such as a Reed switch. Other variables may be employed, for example temperature, strain, and/or stress.

Sensors or other transducers may be sampled from time-to-time, for example periodically to determine values for the variables. It has been found that sampling rates of between 1 KHz and 10 KHz provide suitable results. Higher sampling rates will typically produce suitable results but may not be justified in light of the computational effort. Lower sampling rates may be possible, however may not prove as responsive.

For convenience of illustration, the response relationship may be plotted or graphed on a plot or graph, for example as illustrated in FIG. 5A. The plot or graph may, for instance have pressure, force or reaction force along a vertical axis and position or distance traveled along a horizontal axis. While illustrated as a plot or graph, the response relationship may be represented in other forms, particularly other forms suitable for computational analysis by processors (e.g., microprocessors, DSPs, AISCs, PGAs, PLUs) using either analytical or numerical analysis techniques. For instance, the response relationship may be represented as a set of pairs of values or vectors, or as parameters or equations (e.g., polynomial equations, B-spline equations, or nonrational B-spline equations).

Starting from the left of FIG. 5A, the response relationship 500a will typically include a first portion 502, a second portion 504, a third portion 506, a fourth portion 508, and a fifth portion 510. A first inflection point 512 may occur between the first and the second portions 502, 504, a second inflection point 514 between the second and third portions 504, 506, a third inflection point 516 between the third and fourth portions 506, 508, and a fourth inflection point 518 between the fourth and fifth portions 508, 510 The response relationship 500 terminates at a limit of travel, stroke or termination point 520.

The first portion 502 is a period in which the expansion assembly expands but has yet to contact an inner surface of a hole or expandable element to be fixed or secured in the hole. Such is characterized by a changing position without much, if any, change in pressure, force or reaction force. Where plotted or graphed on a plot or graph such as that in FIG. 5A, the first portion 502 may appear as a relatively flat horizontal portion.

The second portion 504 is a period in which the expansion assembly initially contacts the inner surface of the hole or expandable element to be fixed or secured in the hole. Such is characterized by a rapid or sharp change in pressure, force or reaction force versus a small change in position. Where plotted or graphed on a plot or graph such as that in FIG. 5A, the second portion 504 may appear as a relatively sharp rise or even a distinct step, for example at or proximate the first point of inflection 512.

The third portion 506 is a period in which the expansion assembly gradually and/or steadily expands the hole and/or expandable element to be fixed or secured in the hole, starting at or proximate the second inflection point 514. The radial expansion induces compressive stresses in the primary workpiece, mostly in the elastic range of the material. Such is characterized by a relatively linear relationship between change in position and change in pressure, force or reaction force. Where plotted or graphed on a plot or graph such as that in FIG. 5A, the third portion 506 may appear as a smooth rise, which may be a relatively linear rise having a first slope indicated by line 522.

The third point of inflection 516 occurs at or proximate the point of material yield or change in compliance of the material. This is the point at which the contact pressure applied via the expansion assembly had exceeded the yield strength of the material of the structure (e.g., primary workpiece), hence the change in compliance of the material occurs.

The fourth portion 508 is a period in which the expansion assembly continues to gradually and/or steadily expands the hole and/or expandable element to be fixed or secured in the hole. The radial expansion induces compressive stresses in the workpiece, mostly in the plastic range, permanently expanding the hole and beneficially inducing residual stresses. Such is characterized by a relatively linear relationship between change in position and change in pressure, force or reaction force. Where plotted or graphed on a plot or graph such as that in FIG. 5A, the fourth portion 508 may appear as a smooth rise, which may be a relatively linear rise having a second slope indicated by line 524. The second slope 524 is different from the first slope 522, for example shallower than the first slope 522.

The fifth portion 510 is a period in which the expansion assembly reaches maximum travel or piston reaches a limit of travel (i.e., stroke) denominated as end position 520. Such is characterized by rapid increase in pressure, force or reaction force with no change in position. Where plotted or graphed on a plot or graph such as that in FIG. 5A, the fifth portion 510 may appear as a relatively sharp rise (e.g., vertical) or even a distinct step, for example at the fourth point of inflection 518.

Importantly, the response relationship 500a provides information which may be advantageously used to characterize the processing operation and/or materials (e.g., primary workpiece, expandable member to be secured in primary workpiece). The response relationship 500a or information discerned from the response relationship 500a may be stored, allowing later inspection or validation of the processing operation, for example on a hole-by-hole basis, or allowing later inspection or validation of materials, for example on a workpiece-by-work piece basis. Such may also allow assessment on a user or operator, storing information searchable on a user-by-user basis. Such allows identification of operations or steps requiring further training of individuals or groups of users, or identification of individuals who are unsuited for performing the tasks required.

Additionally, or alternatively, the response relationship 500a may allow dynamic control of the processing operation, and may achieve results that are not otherwise achievable via conventional processing. For example, one or more points (e.g., inflection points 512, 514, 516, 518, end point 520) or other aspects (e.g., slopes 522, 524) of the response relationship 500a may be compared with counterpart points or other aspects an expected response relationship. Such may take into account various defined thresholds and/or tolerances, to assess performance of the processing operations and/or the materials. A number of examples are set out below, although other points or other aspects may be employed. In these examples, similar, or even identical, structures, points, values or locations, are identified with the same reference numbers as in FIG. 5A or with reference numbers with a corresponding alphabetic character appended thereto to denominate some difference (e.g., different value(s) for similar point in response relationships).

The respective slope 522, 524 of the third and/or fourth portions 506, 508 of the reaction relationship 500*a* may be compared to an expected slope of those portions, illustrated as lines 526, 528 as defined by an expected reaction relationship. A ratio of the slopes 522, 524 of the third and the fourth portions 506, 508 of the reaction relationship 500*a* may be compared to an expected ratio of the slopes 526, 528 of those portions as defined by an expected reaction relationship.

A first inflection point 512 may be compared to an expected first inflection point 532 or a range 533 of the expected first inflection point 532. A second inflection point 514 may be compared to an expected second inflection point 534 or range 535 of the expected second inflection point 534. A third inflection point 516 may be compared to an expected third inflection point 536 or range 537 of the expected third inflection point 536. A fourth inflection point 518 may be compared to an expected fourth inflection point 538 or range 539 of the expected fourth inflection point 538. A limit of travel, stroke or end point 520 may be compared to an expected limit or travel or end point 540 or range 541 thereof.

Figure 5B:
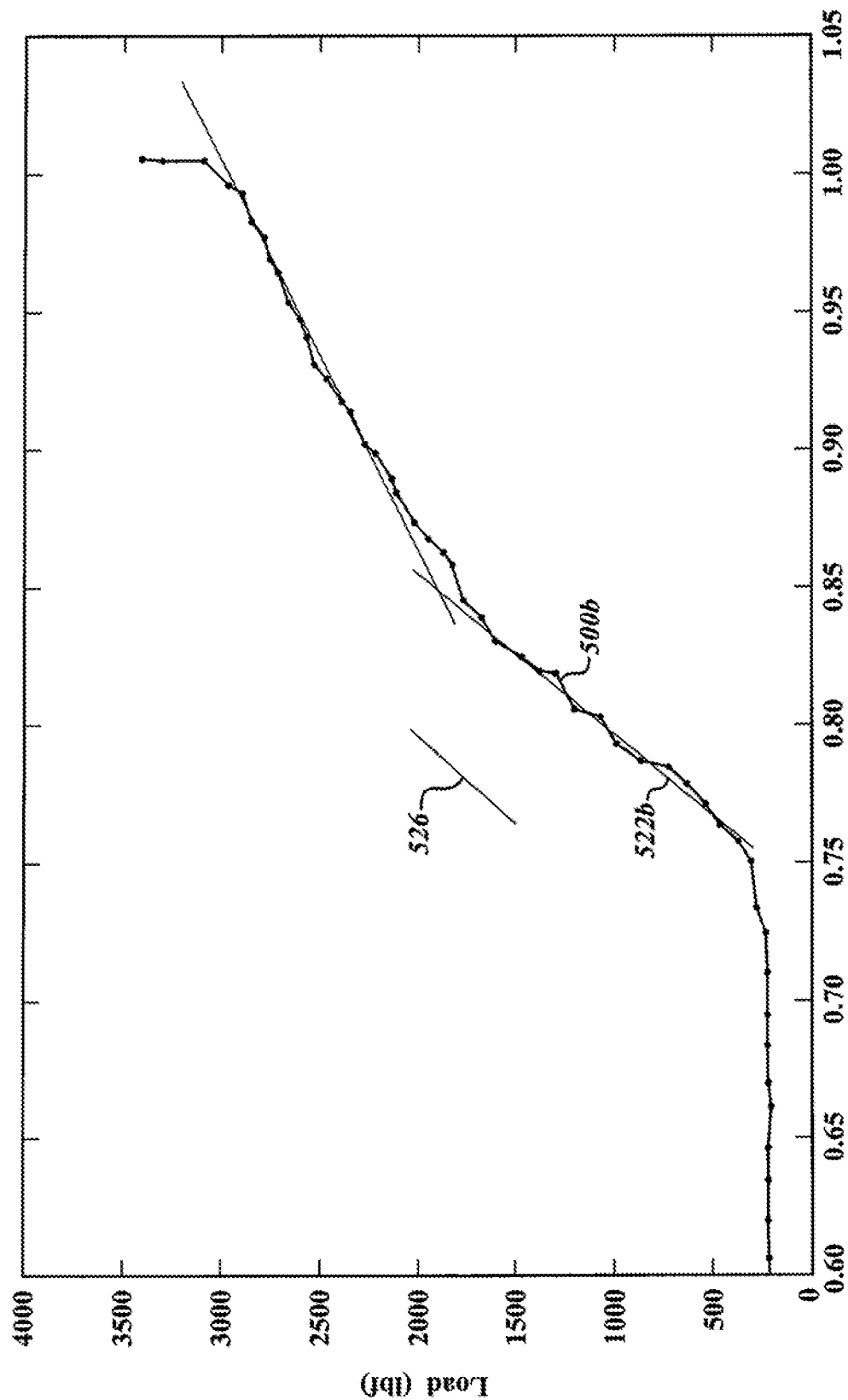
FIG. 5B is a plot or graph of pressure versus position of a drive member of a processing tool, accordingly to one illustrated embodiment, showing a sensed or measured response relationship having a first portion corresponding to elastic deformation with a slope that is outside a tolerance level of a slope of a corresponding first portion of an expected response relationship.

As illustrated in FIG. 5B, a slope 522*b* of the third portion (i.e., elastic deformation portion) 506 of the response relationship 500*b*, determined from the measured or sensed variables may vary from that expected 526. Note that lines 522*b* and 526 are not parallel. Such may indicate an abnormality or problem, particularly where the difference is outside some defined threshold or tolerance. For instance, such variation or departure from expected may indicate that a characteristic of a material (e.g., yield strength) is outside of an expected range, or even that the material being processed is not the same type of material as expected.

Figure 5C:
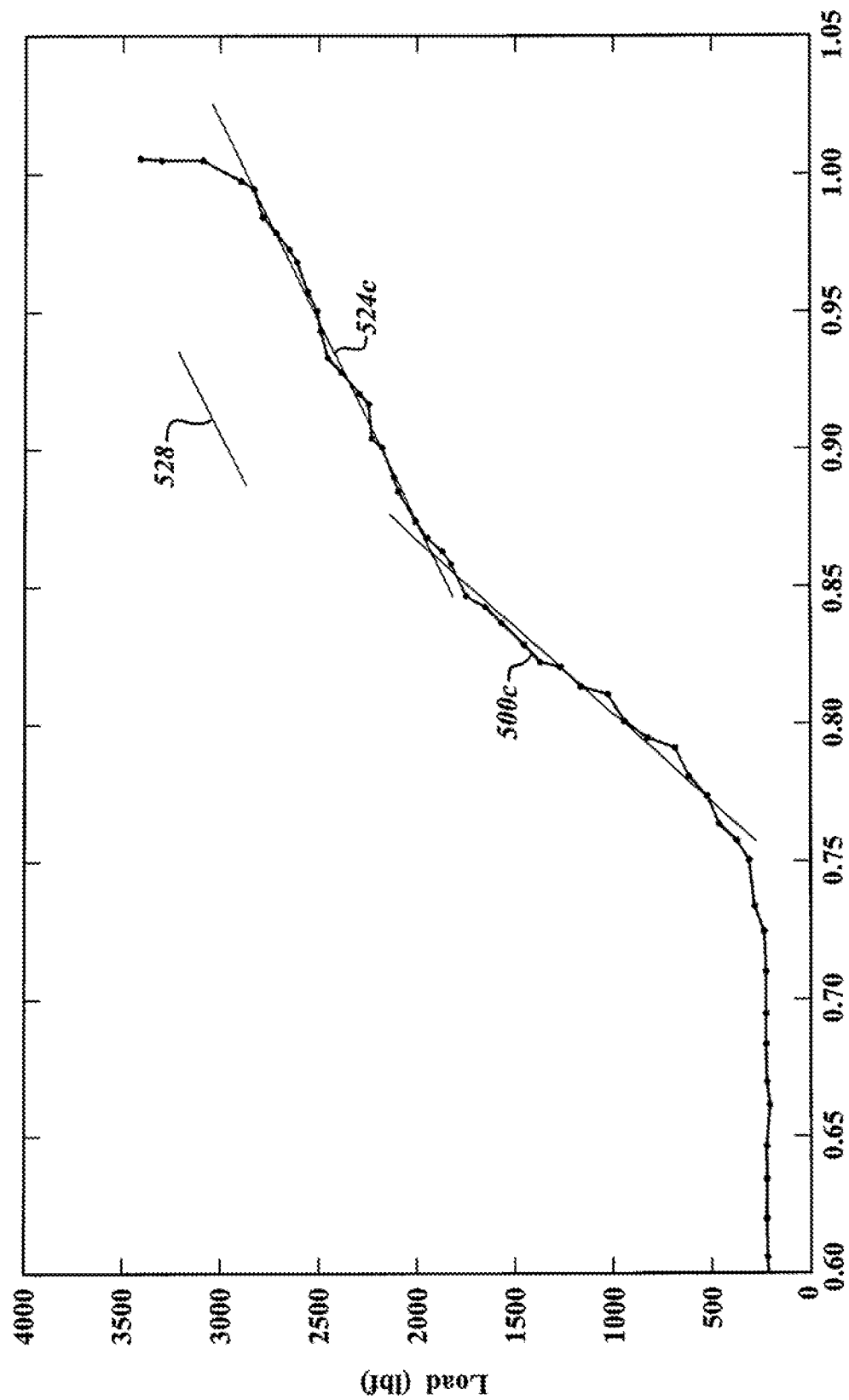
FIG. 5C is a plot or graph of pressure versus position of a drive member of a processing tool, accordingly to one illustrated embodiment, showing a sensed or measured response relationship having a second portion corresponding to plastic deformation with a slope that is outside a tolerance level of a slope of a corresponding second portion of an expected response relationship.

As illustrated in FIG. 5C, a slope 524*c* of the fourth portion 508 (i.e., plastic deformation portion) of the response relationship 550*c*, determined from the measured or sensed variables may vary from that expected 528. Note that lines 524*c* and 528 are not parallel. Such may indicate an abnormality or problem, particularly where the difference is outside some defined threshold or tolerance. For instance, such variation or departure from expected may indicate that a characteristic of a material (e.g., yield strength) is outside of an expected range, or even that the material being processed is not the same type of material as expected.

Alternatively, or additionally, the ratio of the measured or sensed slopes 522, 524 may vary from a ratio of expected slopes 526, 528.

Figure 5D:
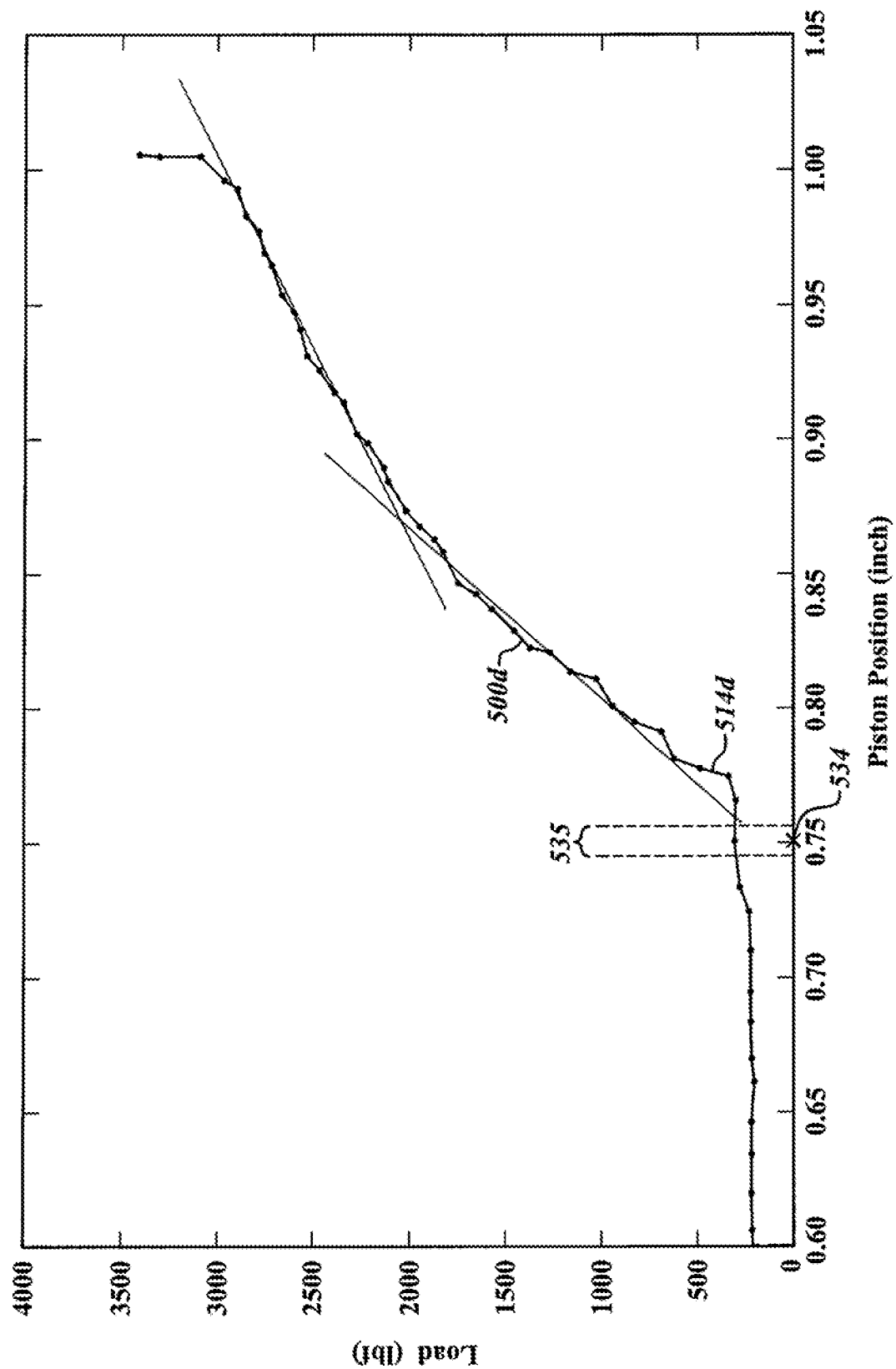
FIG. 5D is a plot or graph of pressure versus position of a drive member of a processing tool, accordingly to one illustrated embodiment, showing a sensed or measured response relationship having a point of inflection where gradual elastic deformation beings, occurs outside a tolerance level of a corresponding point of inflection of an expected response relationship.

As illustrated in FIG. 5D, an inflection point 514*d* between the second and the third portions 504, 506 of the response relationship 500*d* determined from the measured or sensed variables may vary from that expected 534. Such may indicate an abnormality or problem, particularly where the difference is outside some defined threshold or tolerance 535. For instance, such variation or departure from expected may indicate that a characteristic of a material (e.g., yield strength, thickness of workpiece, hole size or diameter) is outside of an expected range, or even that the material being processed is not the same type of material as expected.

Figure 5E:
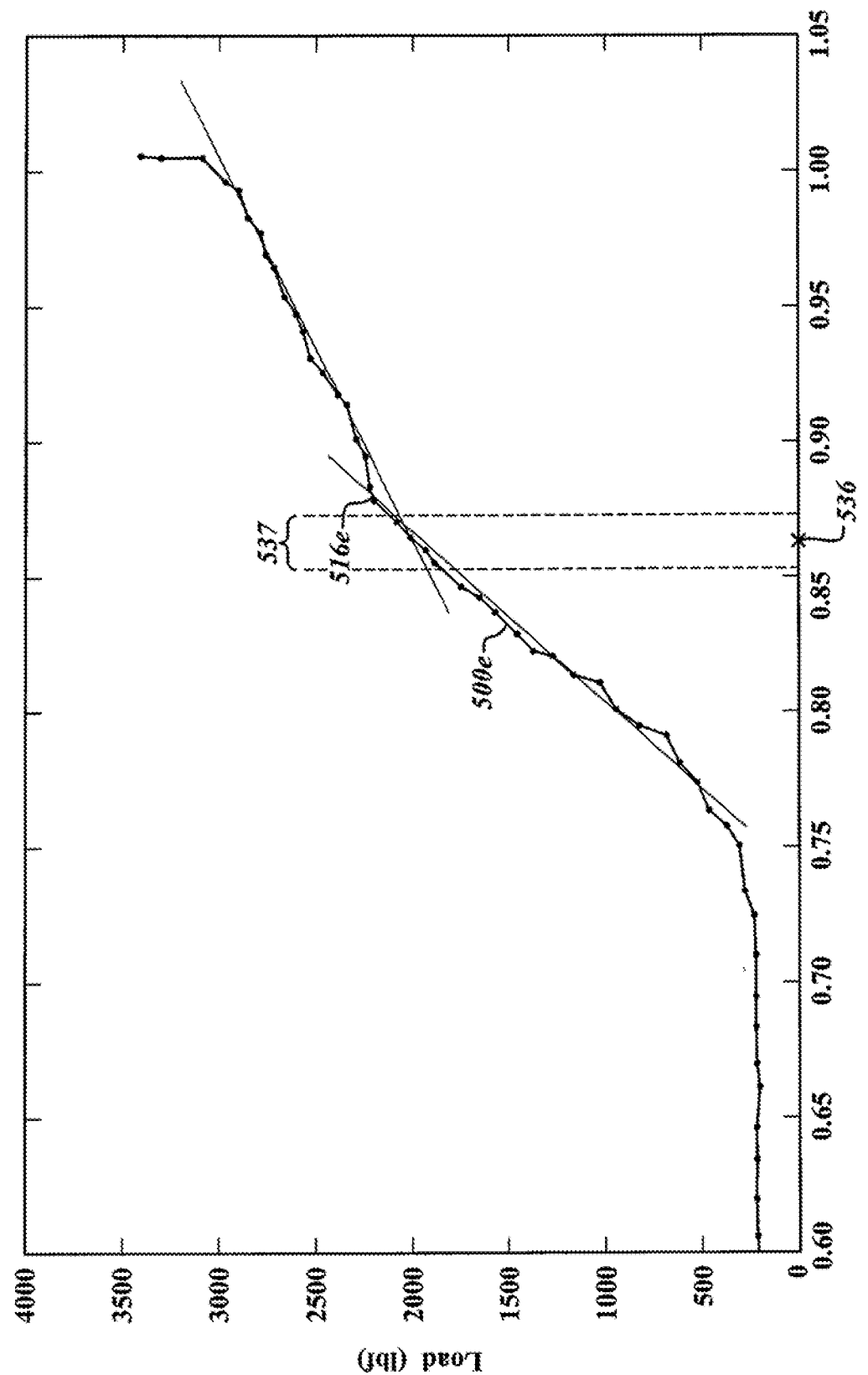
FIG. 5E is a plot or graph of pressure versus position of a drive member of a processing tool, accordingly to one illustrated embodiment, showing a sensed or measured response relationship having a point of inflection where gradual plastic deformation beings, occurs outside a tolerance level of a corresponding point of inflection of an expected response relationship.

As illustrated in FIG. 5E, an inflection point 516*e* between the third and fourth portions 506, 508 of the response relationship 500*e* determined from the measured or sensed variables may vary from that expected 536. Such may indicate an abnormality or problem, particularly where the difference is outside some defined threshold or tolerance 537. For instance, such variation or departure from expected may indicate that a characteristic of a material (e.g., yield strength, thickness of workpiece, hole size or diameter) is outside of an expected range, or even that the material being processed is not the same type of material as expected.

Figure 5F:
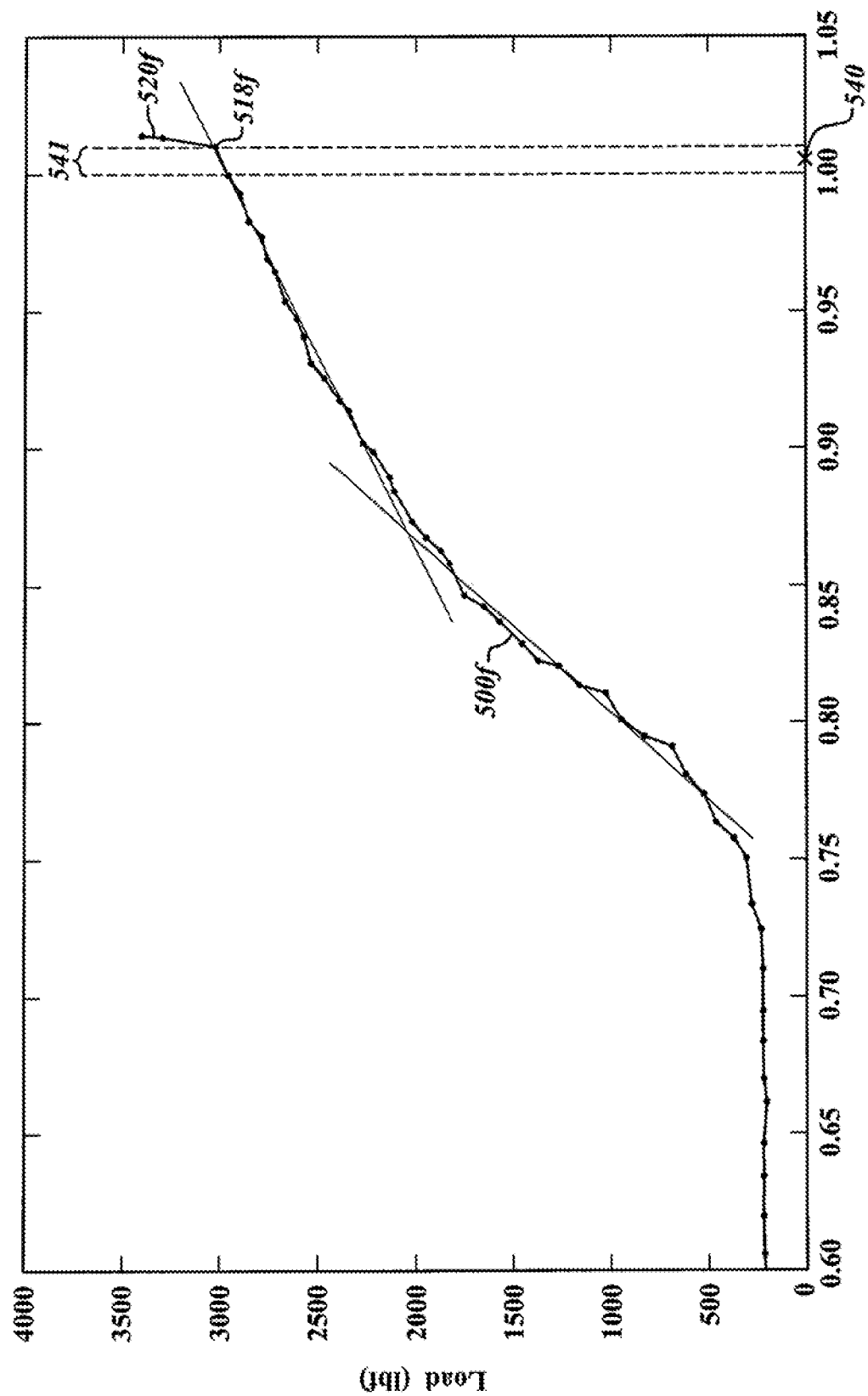
FIG. 5F is a plot or graph of pressure versus position of a drive member of a processing tool, accordingly to one illustrated embodiment, showing a sensed or measured response relationship having a point of inflection where gradual elastic deformation ceases as the limit of travel is approached, occurs outside a tolerance level of a corresponding point of inflection of an expected response relationship.

As illustrated in FIG. 5F, an inflection point 518*f* between the fourth and fifth portions 508, 510 of the response relationship 500*f* determined from the measured or sensed variables may vary from that expected 538. Likewise, a limit of travel, stroke or end point 520*f* may vary from that expected 540. Such may indicate an abnormality or problem, particularly where the difference is outside some defined threshold or tolerance 539, 541, respectively. For instance, such variation or departure from expected may indicate that a characteristic of a material (e.g., yield strength, thickness of workpiece, hole size or diameter) is outside of an expected range, or even that the material being processed is not the same type of material as expected.

Figure 5G:
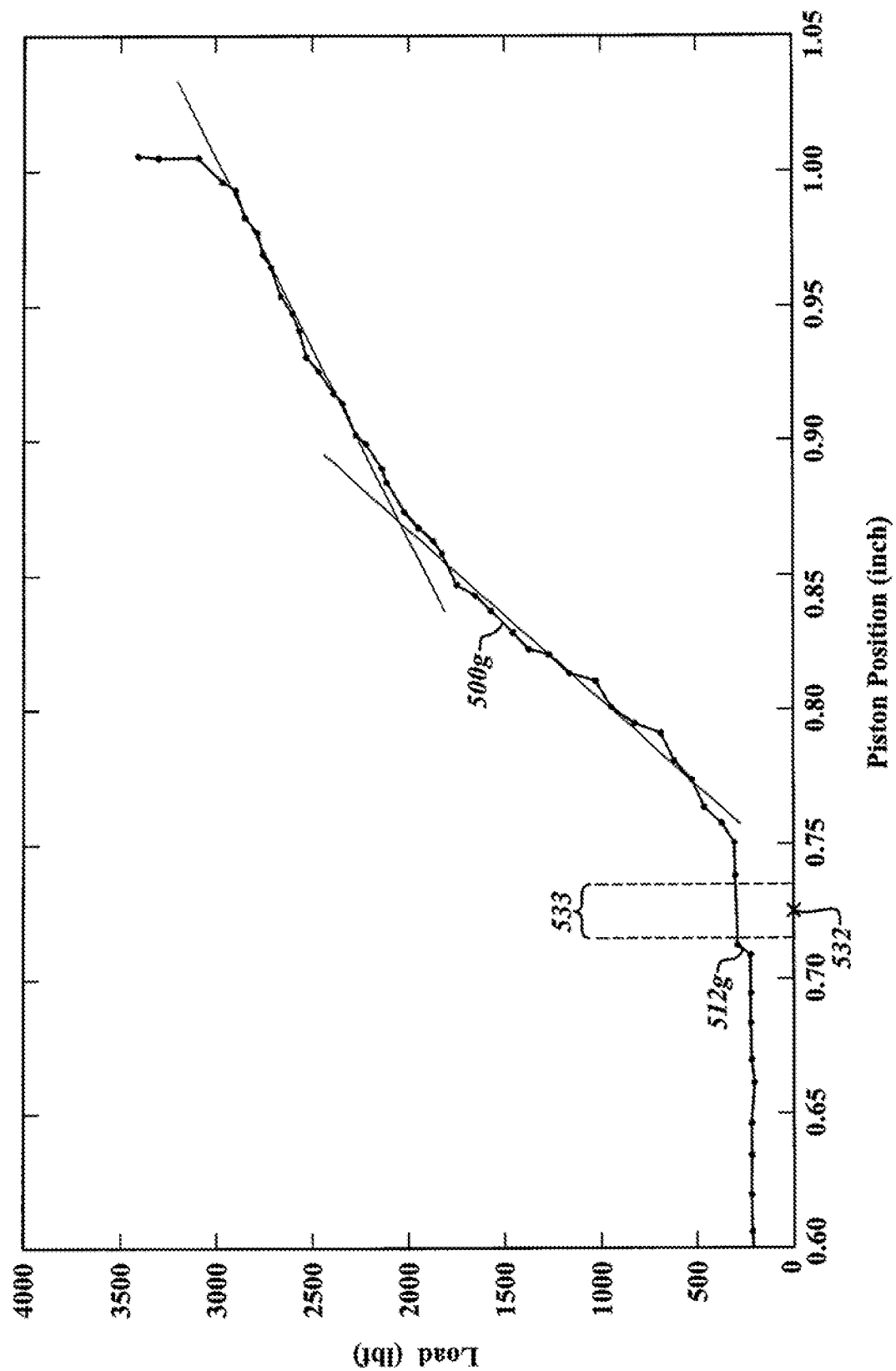
FIG. 5G is a plot or graph of pressure versus position of a drive member of a processing tool, accordingly to one illustrated embodiment, showing a sensed or measured response relationship having a point of inflection at initial contact with the primary workpiece or expandable member, occurs early and outside a tolerance level of a corresponding point of inflection of an expected response relationship, indicating an initially undersized hole.

As illustrated in FIG. 5G, an inflection point 512*g* (i.e., initial contact inflection point) between the first and the second portions 502, 504 of the response relationship 500*h* determined from the measured or sensed variables may vary from that expected 522, for example occurring early. Such may indicate that the initial hole size is smaller than a nominal initial hole size. Such may be particularly a problem where the difference is outside some defined threshold or tolerance 523. For instance, such variation or departure from expected may indicate that a characteristic of a material (e.g., initial hole size or diameter) is outside of an expected range.

Figure 5H:
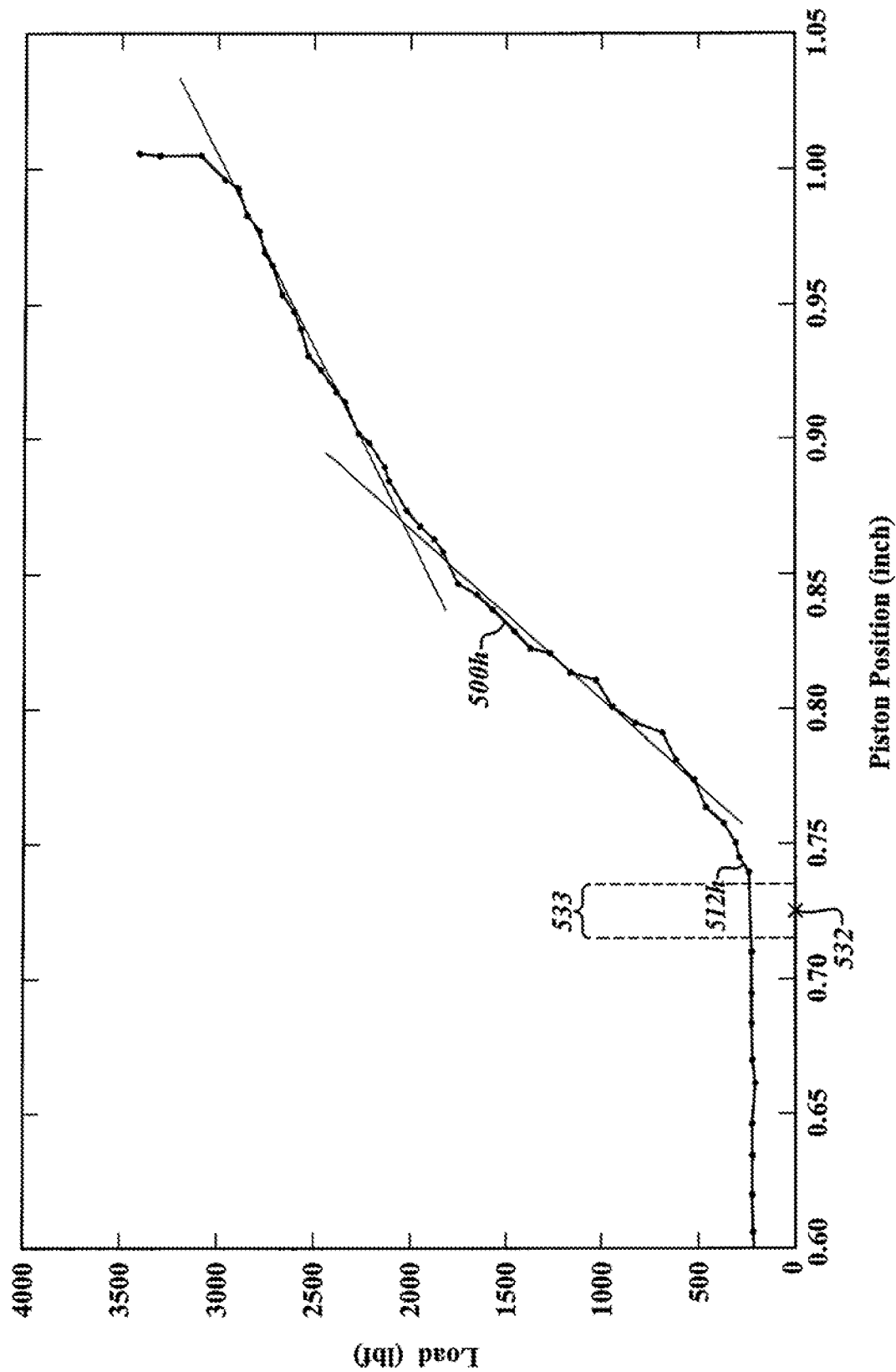
FIG. 5H is a plot or graph of pressure versus position of a drive member of a processing tool, accordingly to one illustrated embodiment, showing a sensed or measured response relationship having a point of inflection at initial contact with the primary workpiece or expandable member, occurs late and outside a tolerance level of a corresponding point of inflection of an expected response relationship, indicating an initially undersized hole.

As illustrated in FIG. 5H, an inflection point 512*h* (i.e., initial contact inflection point) between the first and the second portions 502, 504 of the response relationship 500*h* determined from the measured or sensed variables may vary from that expected 522, for example occurring late. Such may indicate that the initial hole size is larger than a nominal initial hole size. Such may be particularly a problem where the difference is outside some defined threshold or tolerance 523. For instance, such variation or departure from expected may indicate that a characteristic of a material (e.g., initial hole size or diameter) is outside of an expected range.

Figure 6:
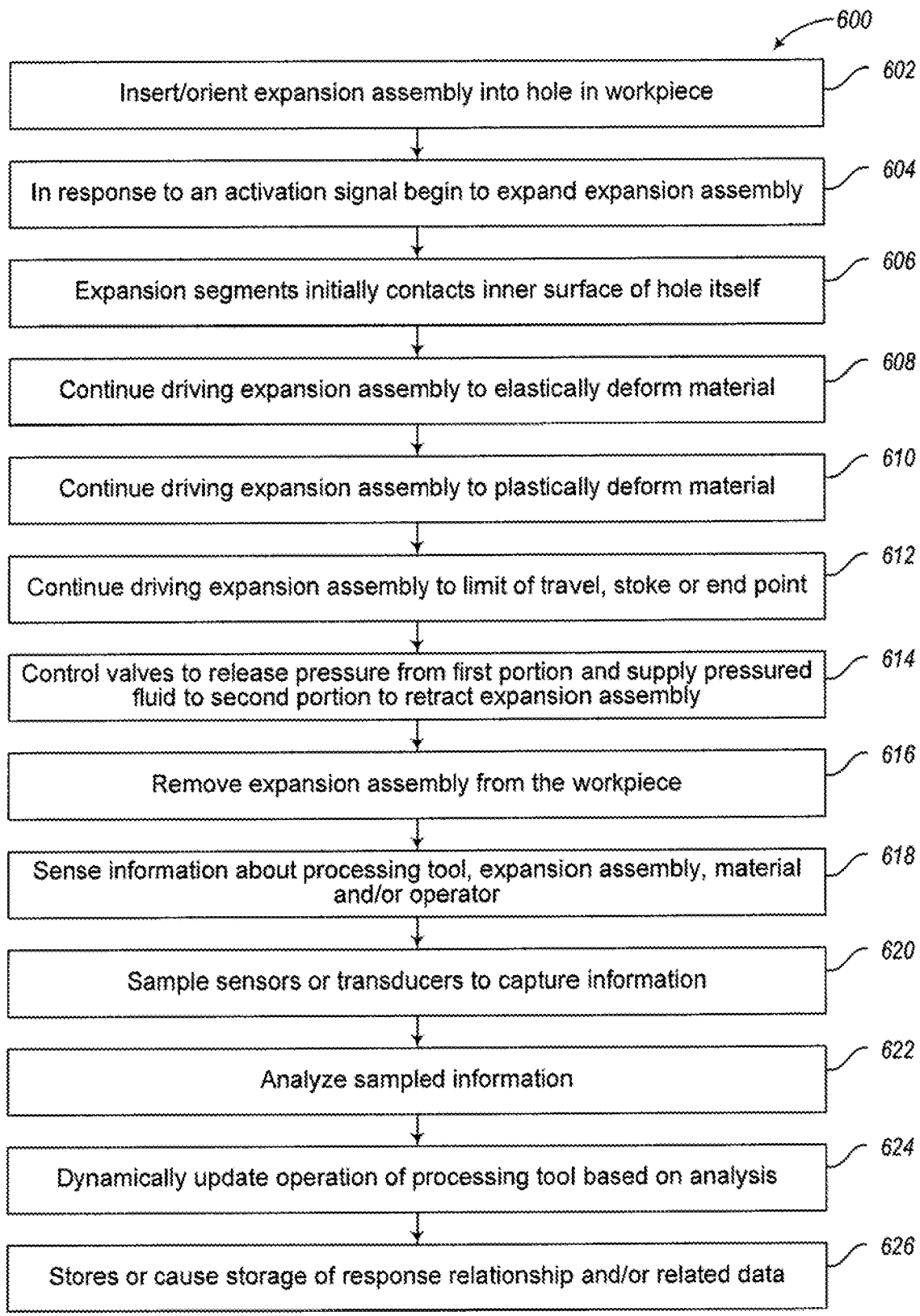
FIG. 6 is a flow diagram of a high level method of operating a processing system, accordingly to one illustrated embodiment.

FIG. 6 shows a high level method 600 of operating a processing system, according to one illustrated embodiment.

At 602, an expansion assembly detachably physically coupled to a processing tool is inserted into a hole in a workpiece. Such may be inserted with an expansion member which is to be secured at least partially in the hole in the workpiece by radial expansion cold working. Such may include orienting the expansion assembly and/or processing tool with respect to the hole, the workpiece and/or global coordinates (e.g., gravitational vector.)

At 604, in response to an activation signal (e.g., trigger pull, signal processor-based controller), the processing tool beings to expand the expansion assembly. For example, the processing tool or processor-based controller opens one or more valves to supply pressurized fluid to a first portion of a cylinder to drive a piston. The processing tool or processor-based controller may also open one or more valves to release pressure from to a second portion of the cylinder to allow the piston to move into the second portion of the cylinder. The piston in turn may drive a core element or mandrel which physically engages expansion surfaces of a plurality of expansion segments of an expansion assembly, driving the expansion segments radially outward. Such expansion is represented as the first portion of the response relationship 500a. As noted above, such may advantageously be performed without pivoting, but rather the segments may move radially perpendicularly outward from a central or longitudinal axis of the expansion assembly.

At 606, the expansion segments may make initial contact with an expansion member to be secured in a hole of a workpiece via an interference fit, or with an inner surface of the hole itself. Such initial contact is typically a function of initial hole size of the hole and is represented as the first inflection point, and the second portion of the response relationship 500a.

At 608, the piston continues to drive the expansion assembly to radially expand the expansion segments, elastically deforming the material (e.g., portion of workpiece surround hole). Such deformation is typically smooth or linear, with a slope that is characteristic of the particular material. Such is represented as the third portion of the response relationship 500a.

At 610, the piston continues to drive the expansion assembly to radially expand the expansion segments, plastically deforming the material (e.g., portion of workpiece surround hole). Such deformation is typically smooth or linear, with a slope that is also characteristic of the particular material. The inflection point between the portions is likewise characteristic of the particular material. Such is represented as the fourth portion of the response relationship 500a.

At 612, the piston continues to drive the expansion assembly, however the radial expansion is limited by the resistance of the material to further deformation. Such limit is also characteristic of the particular material. Such is represented as the fifth portion of the response relationship 500a, terminating at the limit of travel or stoke end point.

At 614, the processing tool or processor-based controller, opens a valve to release pressure from the first portion of the cylinder. The processing tool or processor-based controller also opens one or more valves to supply pressure fluid to the second portion of the cylinder, to drive the piston to the first portion. Such drives the drive member in the opposite direction then at 602, causing the expansion segments of the expansion assembly to retract.

At 616, the expansion assembly is removed from the workpiece.

At 618, one or more sensors or transducers sense information about the processing tool, the expansion assembly, the material and/or operator. Such may be performed substantially continuously, during performance of 604-614. Alternatively, such may be performed at or during defined portions of the method 600.

At 620, at least one processor samples the one or more sensors or transducers, to capture information about the processing tool, the expansion assembly, the material and/or operator. Such may be performed substantially continuously, during performance of 604-614. Alternatively, such may be performed at or during defined portions of the method 600.

At 622, at least one processor analyzes the information sampled from the one or more sensors or transducers. Analysis may take a variety of forms. For example, analysis may compare certain values (e.g., slopes, ratio of slopes, inflection points, points of initial contact, end points) to expected values. Such may be performed substantially continuously, during performance of 604-614. Alternatively, such may be performed at or during defined portions of the method 600.

At 624, at least one processor dynamically updates operation of the processing tool based on the analysis. For example, the at least one processor may determine a new end point based on the analysis, for example compensating for a variation in material property (e.g., thickness, initial hole size, yield strength). It has been noted that some pieces of material may have very large variations in certain material characteristics, form piece to piece, even when from single manufacturer, and from the same batch or shipment. Also for example, the at least one processor may determine to disengage from the material, retracting the expansion segments of the expansion assembly, to eventually reengage the material or alternatively to completely stop, abandon or abort the process on the particular workpiece. As a further example, the at least one processor may determine to produce an alert, and cause the production of such alert. As yet a further example, the at least one processor may determined to adjust pressure or applied force to vary a speed of the expansion as compared to a previously defined speed. Such may be performed substantially continuously, during performance of 604-614. Alternatively, such may be performed at or during defined portions of the method 600.

At 626, the at least one processor stores or causes the storage of the response relationship, data defining the response relationship or information discerned therefrom. For example, the at least one processor may store information in one or more nontransitory storage media collocated with the processor, or may cause the storage of such in one or more nontransitory storage media coupled to store information from a plurality of processing tools. Such may be performed substantially continuously, during performance of 604-614. Alternatively, such may be performed at or during defined portions of the method 600.

Figure 7:
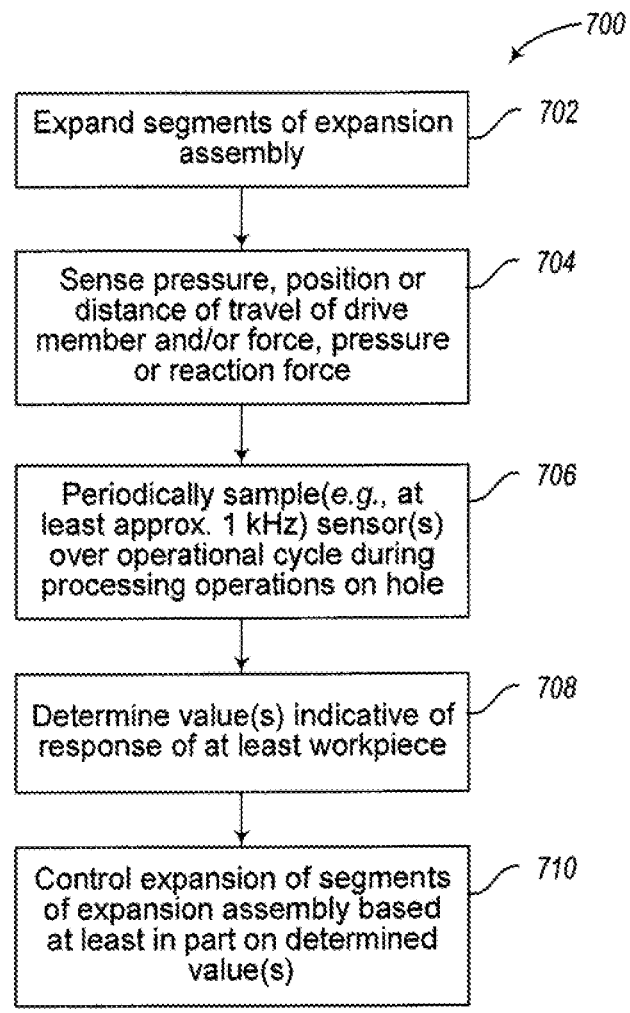
FIG. 7 is a flow diagram of a method of dynamically operating a processing tool of a processing system, accordingly to one illustrated embodiment.

FIG. 7 shows a method 700 of dynamically operating a processing tool of a processing system, accordingly to one illustrated embodiment.

At 702, the processing tool or processor-based controller expands a plurality of expansion segments of an expansion assembly.

At 704, one or more sensor sense at least one of pressure, position of a drive member of the processing tool or consumable expansion assembly, a distance of travel of the drive member, and/or a reaction force resulting from an applied force applied directly or indirectly by the expanding of the expansion segments to an interior surface of a hole in a workpiece. Such may, for example, be applied directly to the interior surface of the hole, to cold work the portion of the workpiece surrounding the hole, for instance to induce residual stress to reduce fatigue cracking. Such may, for example, be applied directly to a secondary workpiece (e.g., bushing, flanged bushing, rivetless nut plate, grommet) to produce an interference fit between a portion of the secondary workpiece and an interior surface of a hole in a primary workpiece. Such may secure the secondary workpiece to the primary workpiece, and may also cold work the portion of the primary workpiece surrounding the hole, for instance to induce residual stress to reduce fatigue cracking.

At, 706, at least one processor periodically samples the sensor(s) over an operational cycle during which the processing tool performs a plurality of operations on the first hole. The processor samples the sensor(s) at a suitable frequency to allow dynamic operation. Frequencies from approximately 1 KHz to approximately 10 KHz have been found to be suitable sampling frequencies, balancing responsiveness with computational overhead.

At 708, the at least one processor determines at least one value indicative of a response of at least a portion of at least the primary workpiece to the applied force applied directly or indirectly by expanding of the expansion segments. A variety of suitable values are described herein, for example response relationship, slopes, ratio of slopes, position or size of initial contact, point or size at termination, end point or travel limit, various points of inflection, to name a few.

At 710, the at least one processor controlling expands the expansion segments of the expansion assembly based at least in part on the determined value(s). The processor may use any one or more of the values to dynamically adjust expansion. For example, the processor(s) may adjust or accommodation variations in initial size of the hole, variations in thickness of the primary workpiece or variations in other physical characteristics of the primary workpiece such as point of yield or yield strength. The processor(s) may control a size of expansion, rate of expansion, or even cause retraction of the expansion segments, and/or abandonment of a processing operation, for instance in response to an abnormality or out-of-tolerance condition.

Figure 8:
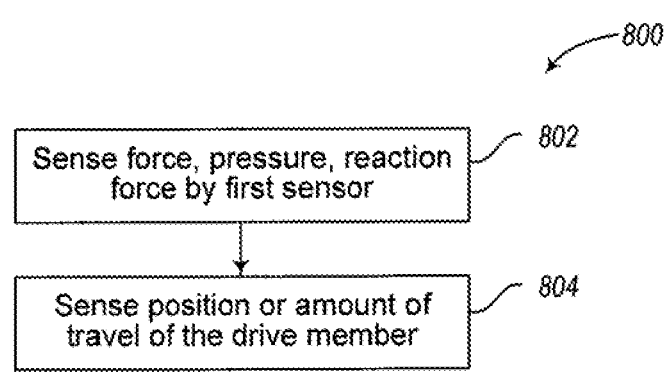
FIG. 8 is a flow diagram of a method of operating a processing system to sense parameters or conditions, accordingly to one illustrated embodiment, which may be useful in performing the method of FIG. 7.

FIG. 8 shows a method 800 of dynamically operating a processing tool of a processing system to sense parameters or conditions, accordingly to one illustrated embodiment. The method 800 may be useful in executing the method 700, for example in performing sensing 704.

At 802, at least a first number of sensors sense at least one of: a force or pressure applied to, or by, a drive member, or a reaction force resulting from the applied force. The reaction force may result from force or pressure applied indirectly to the interior surface of the hole, via the drive member, the expansion segments, and, optionally an expansion member being installed in the hole. Sensors may, for example, include pressure sensors and/or force sensors. Pressure sensors should be located as close to the drive member as possible, to minimize the affect of line loses, producing a more accurate reading or measurement.

At 804, at least a second number of sensors sense information indicative of a position of the drive member or an amount of travel of the drive member between two positions. Sensors may include any type of position sensor, for instance LVDTs or position encoders.

Figure 9:
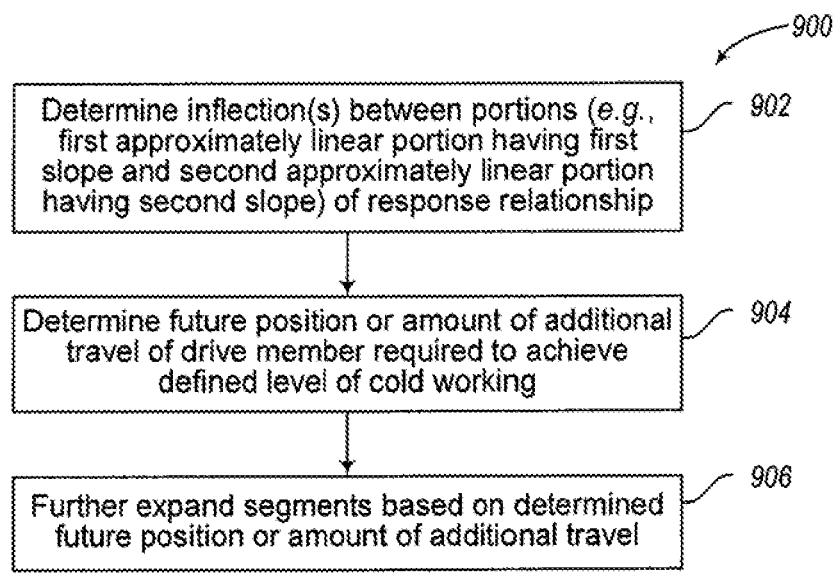
FIG. 9 is a flow diagram of a method of operating a processing system to determine values, accordingly to one illustrated embodiment, which may be useful in performing the method of FIG. 7.

FIG. 9 shows a method 900 of dynamically operating a processing tool of a processing system to determine values, accordingly to one illustrated embodiment. The method 900 may be useful in executing the method 700, for example in performing the determining of values 708.

At 902, at least one processor determines an inflection between a first portion of a response relationship and a second portion of the response relationship. For example, the processor(s) may determine an inflection between a first at least approximately linear portion of the response relationship having a first slope and a second at least approximately linear portion of the response relationship having a second slope, the second slope different from first slope. Alternatively or additionally, the processor(s) may determine a ratio of a value indicative of a position of the drive member to a value indicative of the applied force, at a plurality of different applied forces. For example, where the drive member includes a piston, the response relationship may be a ratio of a position of the piston to a piston pressure, measured or sensed at a plurality of increasing piston pressures. Thus, the response relationship may be a function of a value indicative of one of the position of or the distance of travel of the drive member relative to a value indicative of one of the pressure, the reaction force, or the applied force over at least a portion of an operational cycle for the first hole.

At 904, the processor(s) may determine at least one of a future position of the drive member or an amount of additional travel of the drive member required to achieve a defined level of cold working based at least in part on the determined values.

At 906, the processor(s) cause driving of the drive member to further expand the expansion segments based on the determined future position or amount of additional travel.

Figure 10:
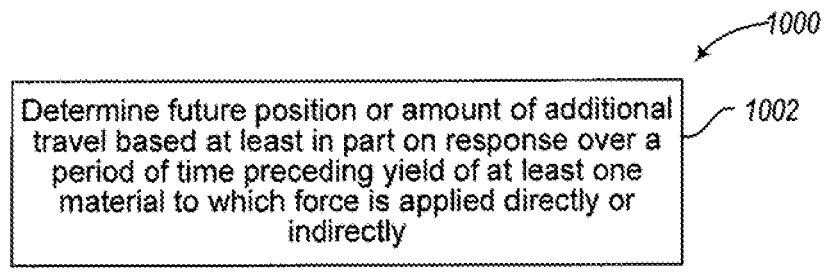
FIG. 10 is a flow diagram of a method of operating a processing system including determining a future position or additional travel, accordingly to one illustrated embodiment which may be useful in performing the method of FIG. 9.

FIG. 10 shows a method 1000 of dynamically operating a processing tool of a processing system, accordingly to one illustrated embodiment. The method 1000 may be useful in executing the method 900, for example in performing the determining of future position or amount of additional travel 904.

At 1002, the processor(s) determine a future position or amount of additional travel of the drive member based at least in part on a response to the applied force over a period of time preceding a yield of at least one material to which the applied force is applied directly or indirectly. To achieve cold working to reduce fatigue cracking, the primary variable may be the amount of elastic deformation, caused by radial expansion which occurs preceding initial yield of the material (e.g., primary workpiece).

Figure 11:
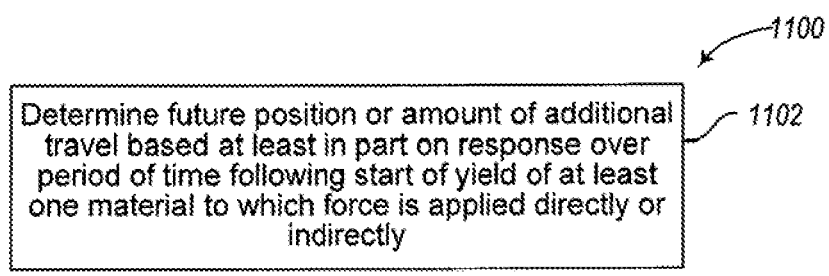
FIG. 11 is a flow diagram of a method of operating a processing system including determining a future position or additional travel, accordingly to one illustrated embodiment, which may be useful in performing the method of FIG. 9.

FIG. 11 shows a method 1100 of dynamically operating a processing tool of a processing system, accordingly to one illustrated embodiment. The method 1100 may be useful in executing the method 900, for example in performing the determining of future position or amount of additional travel 904.

At 1102, the processor(s) determine a future position or amount of additional travel of the drive member based at least in part on a response to the applied force over a period of time following a start of a yield of at least one material to which the applied force is applied directly or indirectly. To achieve cold working to reduce fatigue cracking, the primary variable may be the amount of plastic deformation, caused by radial expansion which occurs following initial yield of the material (e.g., primary workpiece). For example, the processor(s) determine at least one of an end position or total amount of travel of the drive member based at least in part on the determined initial size of the hole. For instance, the processor(s) may use the position of a drive member, along with a relationship that relates position of the drive member with radial dimension of the expandable portion of the expansion assembly. The relationship may be stored in a nontransitory medium, for example as an analytic equation or as a lookup table.

Figure 12:
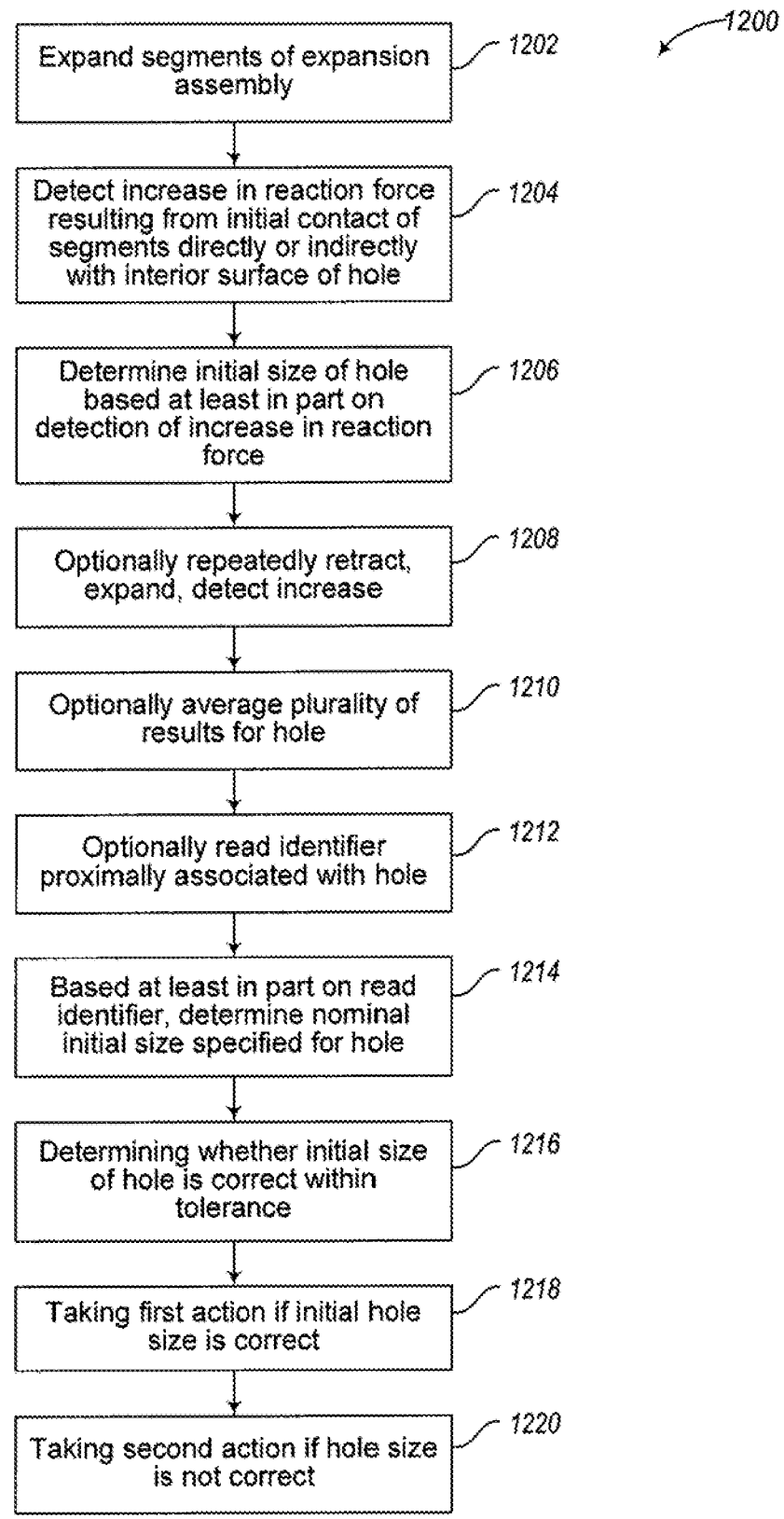
FIG. 12 is a flow diagram of a method of operating a processing system including detection of initial hole size, accordingly to one illustrated embodiment, which may be useful in performing the method of FIG. 7.

FIG. 12 shows a method 1200 of dynamically operating a processing tool of a processing system including detection of an initial size of a hole on which processing is to be performed, accordingly to one illustrated embodiment. The method 1200 may be useful in executing the method 700.

At 1202, at least one processor causes radial expansion of expansion segments of an expansion assembly, which is at least partially located in a hole in a workpiece. An expandable portion of the expansion assembly may be positioned into the hole with, or without, an secondary workpiece or expandable member to be secured in the hole via the processing.

At 1204, the processor(s) the detects an increase in a reaction force resulting from an initial contact of expansion segments of an expansion assembly directly or indirectly with an interior surface of a hole in a workpiece. For example, the processor(s) may detect a concurrent rapid increase in the reaction force along with no or little change in a position of a drive member.

At 1206, the processor(s) determine an initial size of the hole in the workpiece based at least in part on the detection of the increase in reaction force. For example, the processors may use the position of a drive member, along with a relationship that relates position of the drive member with radial dimension of the expandable portion of the expansion assembly. The relationship may be stored in a nontransitory medium, for example as an analytic equation or as a lookup table.

Optionally at 1208, the processor(s) repeatedly cause radial retraction and radial expansion of the expandable portion of the expansion assembly, repeatedly detecting an increase in reaction force. Such implements multiple sampling of the hole. Optionally at 1210, the processor(s) averages a plurality of results for the initial size of the hole. Averaging may produce more reliable results, but lengthens the processing time.

At 1212, a reader of the processing system reads an identifier that identifies the hole. The identifier may identify a hole, either based on hole type or may uniquely identify the hole. The identifier may be inscribed or printed directly on a primary workpiece, for example proximate a respective hole. Where the holes of a workpiece are uniform, the identifier does not need to be in physical proximity of the respective hole. The identifier may be carried by a data carried, which is itself coupled, attached, or fastened to the workpiece. For example, the identifier may be carried by or encoded in a label or tag secured or attached to the primary workpiece via an adhesive (e.g., pressure sensitive adhesive). The label or tag may take the form of a machine-readable symbol or wireless transponder.

At 1214, the processor(s) determine a nominal initial size specified for the hole based at least in part on the read identifier. The processor(s) may determine initial hole size based on the identifier, for example via a look up table or value encoded in the identifier. Alternatively, the initial hole may be read directly from the data carrier.

At 1216, the processor(s) compares the determined initial size of the hole with the nominal initial size of the hole. The comparison of the determined initial size of the hole with the nominal initial size should account for a defined allowable tolerance from the nominal initial size of the hole. The detecting of the increase in reaction force is preferably performed prior to any insertion or placement of a secondary workpiece or expandable member in the hole. Where a secondary workpiece or expandable member has been positioned at least partially in the hole, the processor(s) must account for such in determining the initial size of the hole. For example, a thickness of a relevant portion of the secondary workpiece may be known, and thus can be subtracted from the sensed or measured sized.

At 1218, the processor(s) take at least a first action if the initial hole size is determined to be correct. At 1220, the processor(s) take at least a second action if the hole size is determined to not be correct. The second action is different than the first action.

Figure 13:
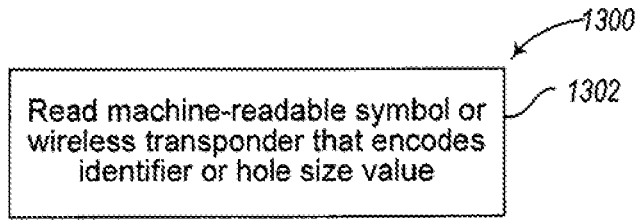
FIG. 13 is a flow diagram of a method of operating a processing system including reading information, accordingly to one illustrated embodiment, which may be useful in performing the method of FIG. 12.

FIG. 13 shows a method 1300 of dynamically operating a processing tool of a processing system including reading information (e.g., identifier) from a data carrier, accordingly to one illustrated embodiment. The method 1200 may be useful in executing the reading 1212 of the method 1200.

At 1302, a reader may, for example, read information encoded a machine-readable (e.g., barcode symbol, 2D symbol) or a wireless transponder (e.g., RFID transponder or tag). The information may include an identifier that categorically identifies the hole (e.g., type, size) and/or that uniquely identifies the hole from all other holes in a production environment. Alternatively or additionally, the information may directly specify the nominal initial size of the hole.

Figure 14:
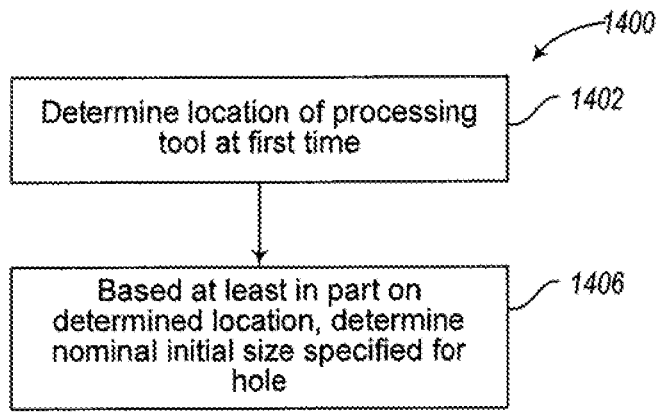
FIG. 14 is a flow diagram of a method of operating a processing system including determining a nominal initial hole size, accordingly to one illustrated embodiment, which may be useful in performing the method of FIG. 12.

FIG. 14 shows a method 1400 of dynamically operating a processing tool of a processing system including determining a nominal initial size of a hole, accordingly to one illustrated embodiment. The method 1400 may be useful in executing the method 1200, for example as an alternative to the determining nominal initial hole size based on a read identifier 1244.

At 1402, one or more components of a processing system determines a current location of a processing tool. For example, a location or coordinate system may determine location. The location or coordinate system may employ triangulation or flight of time techniques. The location or coordinate system may employ wireless radio (i.e., radio or microwave frequencies) transmitters, receivers, or transceiver and signals. Alternatively, or additionally, the location or coordinate system may employ optical (e.g., infrared) transmitters, receivers, or transceiver and signals. The location or coordinate system may include a Global Positioning System (GPS) receiver or some other more accurate receiver.

At 1404, at least one processor of the processing system determines a nominal initial size for the hole based at least in part on the determined location. For example, the processor(s) may determine a position of a hole which is being or about to be processed based on the position of the processing tool. Each hole in a primary workpiece may be assigned or logically associated with a respective nominal initial size (e.g., diameter). Such may be stored in nontransitory storage medium, for example in a database or lookup table. The location may be in global or World coordinates (e.g., longitude, latitude) or may be in some other reference frame or coordinate system, such as that of the primary workpiece, a room in which the processing is performed, or even in a tool space reference frame. Locations may be specified in some global coordinate frame, or may be specified relative to one another (e.g., 1 inch laterally aft of a previous hole or position).

Figure 15:
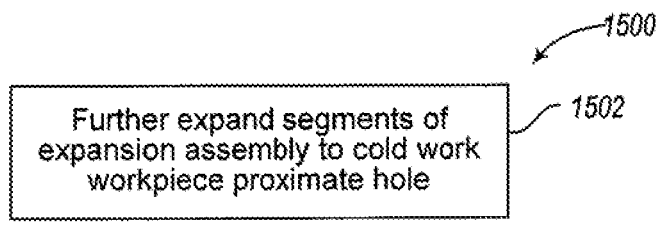
FIG. 15 is a flow diagram of a method of operating a processing system including taking at least a first action, accordingly to one illustrated embodiment, which may be useful in performing the method of FIG. 12.

FIG. 15 shows a method 1500 of dynamically operating a processing tool of a processing system including taking at least a first action, accordingly to one illustrated embodiment. The method 1700 may be useful in executing the method 1200, for example the taking the second action 1218.

At 1502, where the initial size of the hole is determined to be within a defined threshold or tolerance of a nominal or expected size, the at least one processor drives the drive member to further expand the expansion portion of the expansion assembly. Such may cause cold working of the portion of the primary workpiece surrounding the hole.

Figure 16:
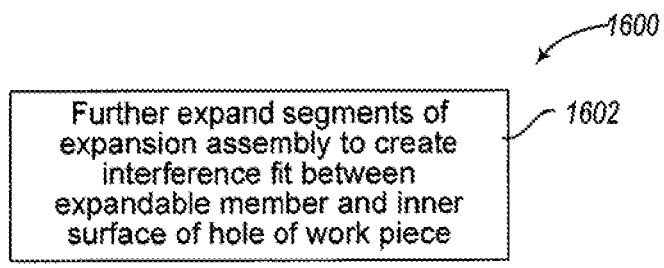
FIG. 16 is a flow diagram of a method of operating a processing system including taking at least a first action, accordingly to one illustrated embodiment, which may be useful in performing the method of FIG. 12.

FIG. 16 shows a method 1600 of dynamically operating a processing tool of a processing system including taking at least a first action, accordingly to one illustrated embodiment. The method 1600 may be useful in executing the method 1200, for example the taking the second action 1218.

At 1602, where the initial size of the hole is determined to be within a defined threshold or tolerance of a nominal or expected size, the at least one processor drives the drive member to further expand the expansion portion of the expansion assembly to create of a high interference fit between a secondary workpiece (e.g., bushing, flanged bushing, rivetless nut plate, grommet) and an interior surface of the hole. Such may additionally advantageously cause cold working of the portion of the primary workpiece surrounding the hole.

Figure 17:
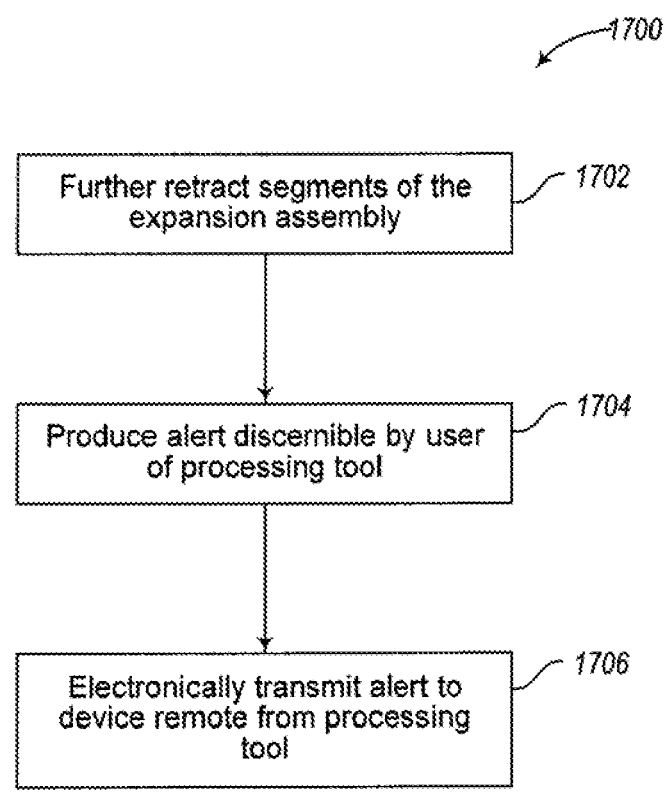
FIG. 17 is a flow diagram of a method of operating a processing system including taking at least a second action, accordingly to one illustrated embodiment, which may be useful in performing the method of FIG. 12.

FIG. 17 shows a method 1700 of dynamically operating a processing tool of a processing system including taking at least a second action, accordingly to one illustrated embodiment. The method 1700 may be useful in executing the method 1200, for example the taking the second action 1220.

At 1702, as a second action the processor(s) may drive the drive member to retract the expansion segments of the expansion assembly.

At 1704, additionally or alternatively, as a second action the processor(s) may produce an alert discernible by a user. For example, the processor(s) may drive one or more lights, speakers, or vibrators to produce an optical alert, aural alert, or tactile alert, respectively.

At 1706, additionally or alternatively as a second action the processor(s) may electronically transmit an alert to a device located remotely from the processing tool(s). For example, the processor(s) may send an electronic message (e.g., email message, text message, voicemail message) to a host computer system, an end user computer system, a telephone or Smartphone. The message may optionally identify the specific processing tool, location, operator, or even the condition that gave rise to the alert.

Figure 18:
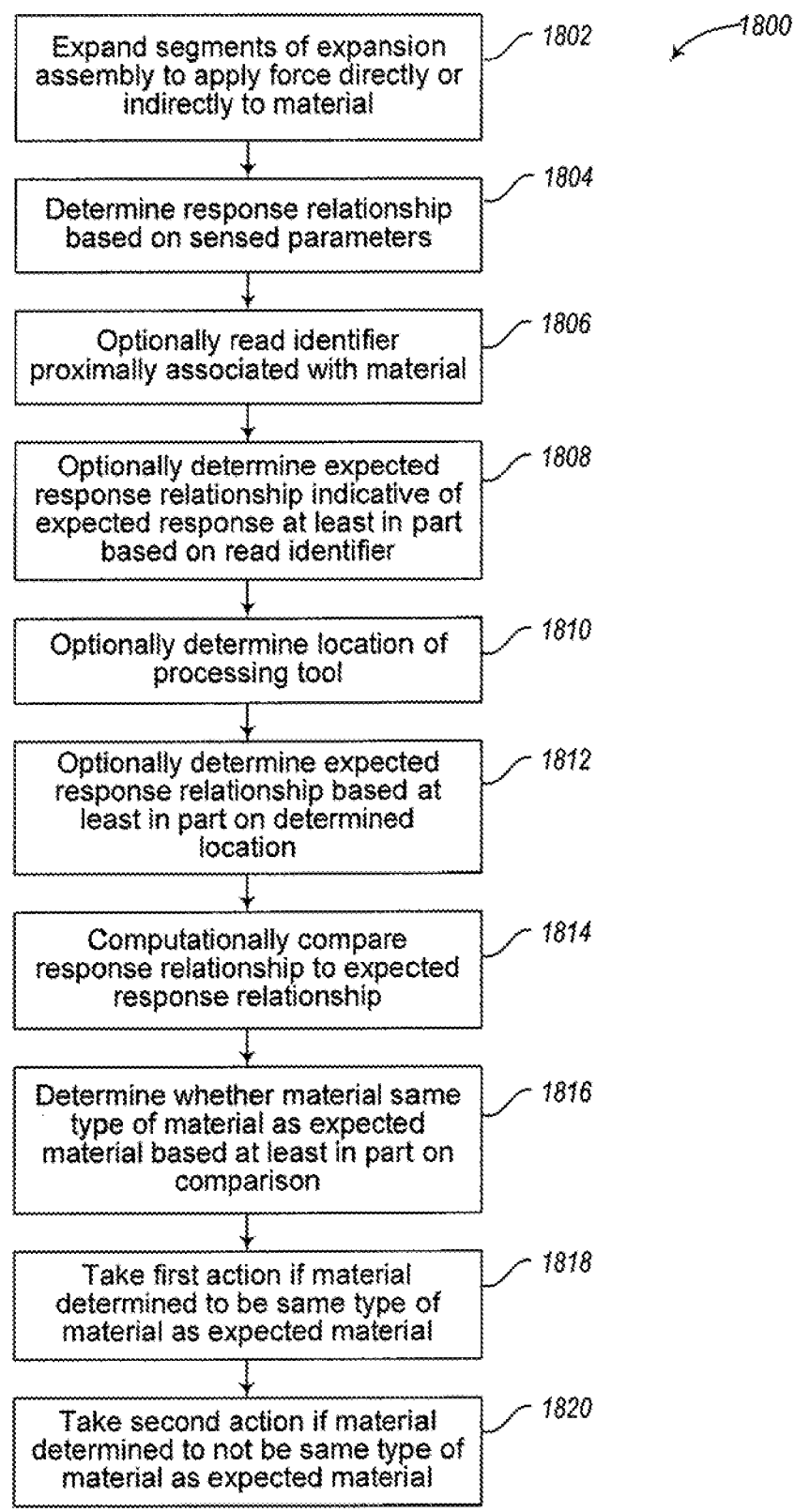
FIG. 18 is a flow diagram of a method of operating a processing system including determining if a material type is correct, accordingly to one illustrated embodiment, which may be useful in performing the method of FIG. 7.

FIG. 18 shows a method 1800 of dynamically operating a processing tool of a processing system including determining if a material on which processing is to be performed has expected material characteristics or properties, accordingly to one illustrated embodiment. The method 1800 may be useful in executing the method 700.

At 1802, at least one processor causes expansion of a number of expansion segments of an expansion assembly to apply a force at least one of directly or indirectly to a material. The processor(s) may supply commands to control actuators that operate one or more valves to control a flow of fluid (e.g., hydraulic fluid) into and out of a cylinder in which a piston is moveably received.

At 1804, the processor(s) determine a response relationship based on the parameters sensed by the sensor(s). The processor(s) may rely on parameters indicative of an applied force or pressure applied to the material sensed by at least a first sensor at a plurality of times. The processor(s) may rely on parameters indicative a position of a drive member or an amount of travel of the drive member sensed by at least a second sensor at the plurality of times.

The response relationship may be function of a first and a second value. The first value may, for example, represent a pressure applied to expand the expansion segments. The second value may, for example, represent at least one of a position or an amount of travel of a drive member (e.g., piston, core element or mandrel, expandable segments) that applies the applied force or pressure. Thus, the first response relationship may be a function of a value indicative of one of a position of or a amount of travel of a drive member that drives the expansion segments of the expansion assembly relative to a value indicative of one of a pressure, a reaction force, or the applied force over at least a portion of an operational cycle for the respective hole.

The processor(s) may, for example, determine a slope of the sensed positions or amounts of travel of the drive member relative to the sensed applied forces for the material. The processor(s) may determine a slope of the expected positions or amounts of travel of the drive member for the expected material relative to the applied forces.

Optionally at 1806, a reader of the processing system reads a value (e.g., an identifier) proximally associated with the material. Optionally at 1808, at least one processor determines the second relationship indicative of an expected response of the material to the applied force based at least in part on the read identifier.

Optionally at 1810, a component of the processing system determines a current location of a processing tool. Optionally at 1812, at least one processor determines the second relationship based at least in part on the determined location.

Alternatively, one or more components of a processing system determines a current location of a processing tool. For example, a location or coordinate system may determine location. The location or coordinate system may employ triangulation or flight of time techniques. The location or coordinate system may employ wireless radio (i.e., radio or microwave frequencies) transmitters, receivers, or transceiver and signals. Alternatively, or additionally, the location or coordinate system may employ optical (e.g., infrared) transmitters, receivers, or transceiver and signals. The location or coordinate system may include a Global Positioning System (GPS) receiver or some other more accurate receiver. At least one processor of the processing system then determines an expected response relationship based at least in part on the determined location. For example, the processor(s) may determine a position of a hole or primary workpiece which is being or about to be processed based on the position of the processing tool. Each hole or primary workpiece may be assigned or logically associated with a respective material or response relationship. Such may be stored in nontransitory storage medium, for example in a database or lookup table. The location may be in global or World coordinates (e.g., longitude, latitude) or may be in some other reference frame or coordinate system, such as that of the primary workpiece, a room in which the processing is performed, or even in a tool space reference frame.

At 1814, the processor(s) computationally compares a first relationship indicative of a response of the material subjected to the applied force to a second relationship indicative of an expected response of the material to the applied force. For example, the processor(s) may compare a first relationship to a second relationship. For instance, the processor(s) may compare a first ratio of the position or the amount of travel to the pressure applied to a second ratio of an expected position or expected amount of travel for an applied pressure the same as the pressure applied. The processor(s) may, for example, compare the determined slope of the sensed parameters with the determined expected slope. The processor(s) may account for a defined allowable tolerance in at least one physical property of the material.

At 1816, the processor(s) determine whether the material is a same type of material as an expected material based at least in part on the comparison.

At 1818, if the material is determined to be the same type of material as the expected material, the processor(s) take or cause at least a first action by the processing tool. The first action may include the processor(s) further causing expansion of the expansion segments of the expansion assembly to cold work the primary workpiece proximate the hole. The first action may additionally or alternatively include the processor(s) further causing expansion of the expansion segments of the expansion assembly to create an interference fit between a secondary workpiece and an inner surface of a hole in the primary workpiece.

At 1820, if the material is determined to not be the same type of material as the expected material, the processor(s) take or cause at least a second action by at least one of the processing tool. The second action is different from the first action. The second action may, for example, include the processor(s) driving the drive member to retract the expansion segments of the expansion assembly. The second action may additionally or alternatively include the processor(s) producing an alert discernible by a user. For example, the processor(s) may drive one or more lights, speakers, or vibrators to produce an optical alert, aural alert, or tactile alert, respectively. The second action may additionally or alternatively include the processor(s) causing electronically transmission of an alert to a device located remotely from the processing tool(s). For example, the processor(s) may send an electronic message (e.g., email message, text message, voicemail message) to a host computer system, an end user computer system, a telephone or Smartphone. The message may optionally identify the specific processing tool, location, operator, or even the condition that gave rise to the alert.

Figure 19:
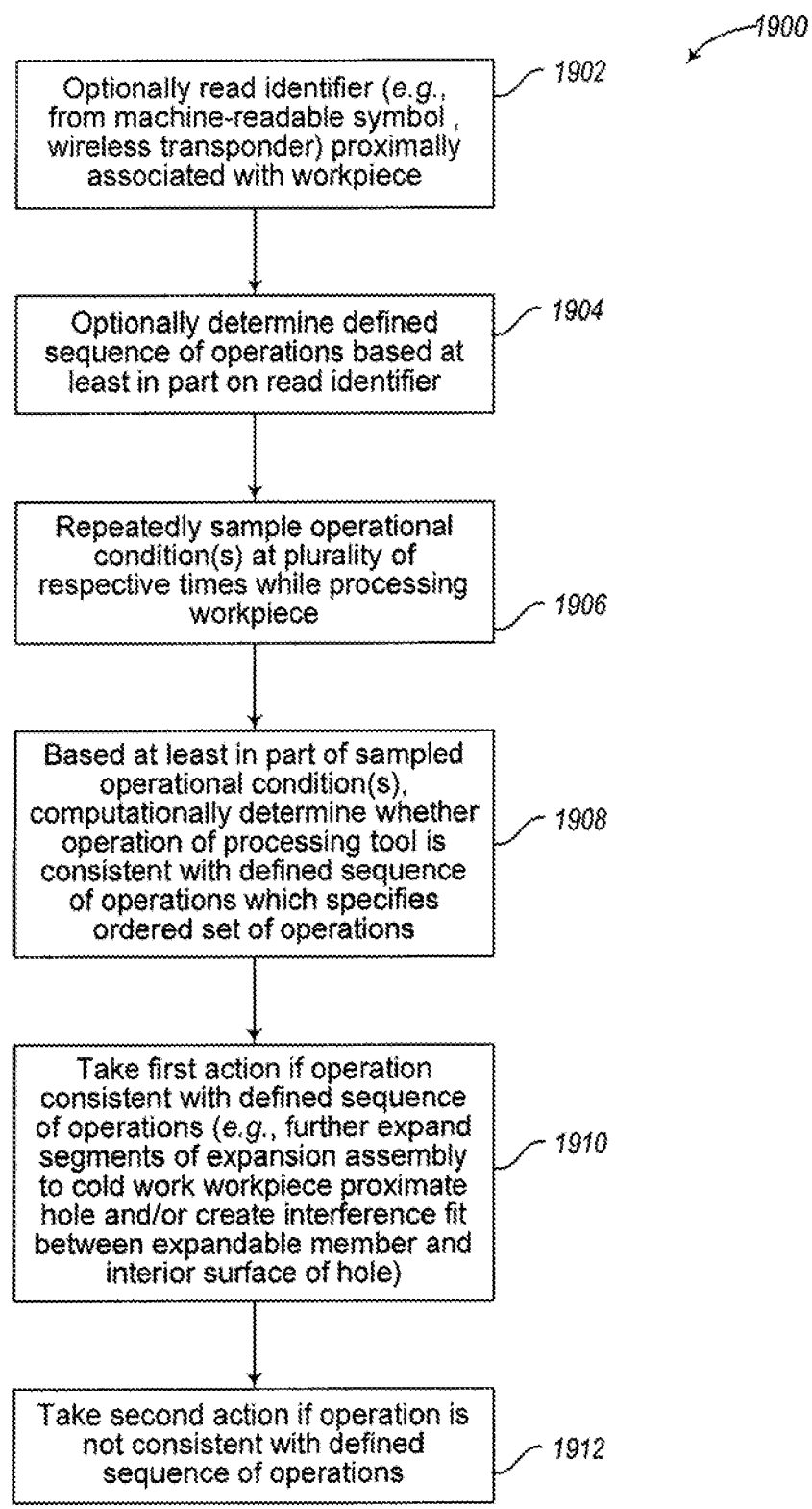
FIG. 19 is a flow diagram of a method of operating a processing system determining if material characteristics are as expected, accordingly to one illustrated embodiment, which may be useful in performing the method of FIG. 18.

FIG. 19 shows a method 1900 of dynamically operating a processing tool of a processing system including determining if a material on which processing is to be performed has expected material characteristics or properties, accordingly to one illustrated embodiment. The method 1900 may be useful in executing the method 1800, for example reading an identifier proximally associated with the material 1806.

At 1902, a reader reads an identifier from a data carrier proximally associated with a workpiece. The data carrier may encode the identifier. For example, a reader may read an identifier from a machine-readable symbol or from a wireless transponder (e.g., RFID transponder or tag). Alternatively, the data carrier may directly encode a defined sequence of operations.

Optionally at 1904, at least one processor determines a defined sequence of operations which specifies an ordered set of operations to be performed by and/or with the processing tool to process one or more workpieces. The determination of defined sequence may, for example, be based at least in part on the identifier. For example, the identifier may identify a particular processing operation, with a number of acts or steps. The specific sequence may be set out in a file stored on a nontransitory storage medium, retrievable via the identifier. Alternatively, the reader may directly read the sequence, rather than an identifier. As a further alternative, the processing system may be programmed with defined sequence.

At 1906, at least one processor repeatedly samples a number of operational conditions of a processing tool sensed by at least one sensor at a plurality of respective times while processing a workpiece. The operational conditions may, for example, include at least a first and a second operational condition. The first operational condition may, for example, be a value indicative of one of a pressure, an applied force or a reaction force. The second operational condition may, for example, be a value indicative of at least one of a position of or an amount of travel of a drive member.

At 1908, the processor(s) computationally determines based at least in part of the sampled operational conditions of the processing tool whether an operation of the processing tool is consistent with a first defined sequence of operations. For example, the processor(s) may compare a first ratio of the position or the amount of travel to the applied pressure to a second ratio of an expected position or an expected amount of travel in response to the applied pressure. Also for example, the processor(s) may compare a least a portion of a response relationship with an expected response relationship, the response relationship being a function of a value indicative of one of the position of or the distance of travel of the drive member relative to a value indicative of one of the pressure, the reaction force, or the applied force over at least a portion of an operational cycle for a respective hole.

At 1910, if operation of the processing tool is consistent with the first defined sequence of operations, the processor(s) causes the processing tool to take at least a first action. For example, the processor(s) may cause the processing tool to further expand the expansion segments of the expansion assembly to cold work the workpiece proximate the respective hole. The processor(s) may additionally or alternatively cause the processing tool to further expand the expansion segments of the expansion assembly to create an interference fit between secondary workpiece (e.g., expandable member) to be secured at least partially in the hole of the primary workpiece.

At 1912, if operation of the processing tool is not consistent with the defined sequence of operations, the processor(s) cause the processing tool to take a second action, different from the first action. For example, the processor(s) may cause the processing tool to retract the expansion segments of the expansion assembly. The processor(s) may additionally, or alternatively cause production of an alert discernible by a user of the processing tool. The processor(s) may additionally, or alternatively, cause electronically transmission an alert to a device remote from the processing tool.

Figure 20:
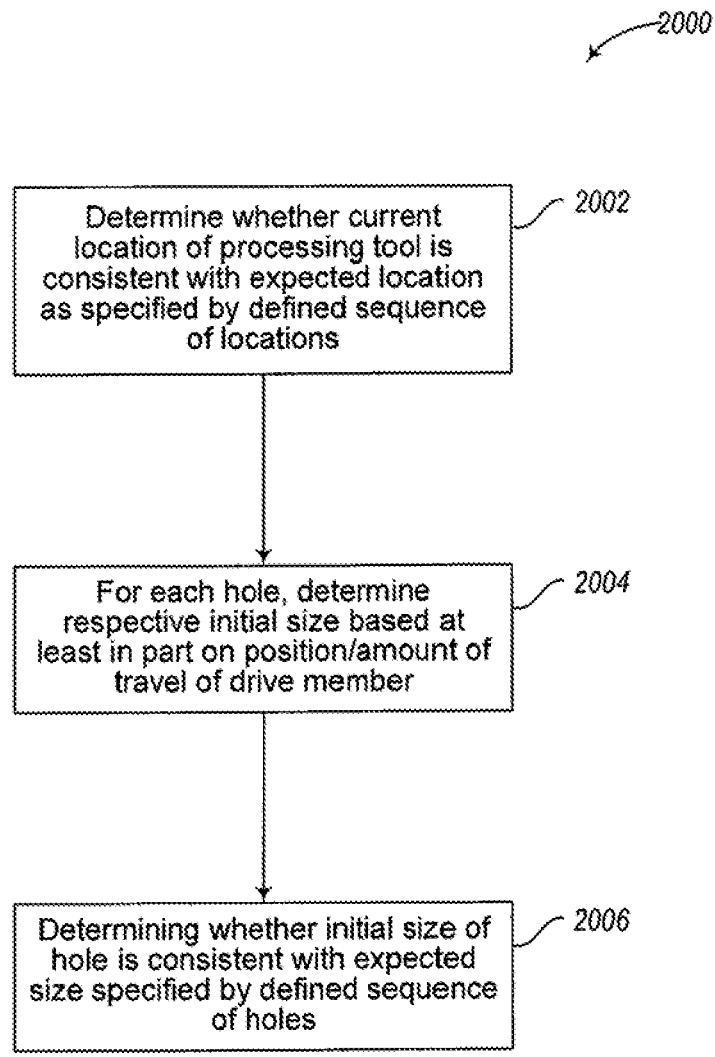
FIG. 20 is a flow diagram of a method of operating a processing system including determining if holes are in correct locations and of initial correct sizes, accordingly to one illustrated embodiment, which may be useful in performing the method of FIG. 19.

FIG. 20 shows a method 2000 of dynamically operating a processing tool of a processing system including determining if holes are in the correct location and have correct initial sizes, accordingly to one illustrated embodiment. The method 1900 may be useful in executing the method 1900, for example in addition thereto.

At 2002, at least one processor may determine whether a current location of the processing tool is consistent with an expected location as specified by a first defined sequence of locations.

At 2004, for each of a number of holes in a primary workpiece, the processor(s) may computationally determine a respective initial size of the hole. The processor(s) may computationally determine a respective initial size of the hole, for example based at least in part on an amount of travel of a drive member of the processing tool which produced the respective initial increase in reaction force.

At 2006, the processor(s) may determine whether the initial size of the hole is consistent with a size of an expected hole as specified by a first defined sequence of holes. The processor(s) may take appropriate action if the determined initial size of the hole is determined to be out-of-tolerance, for example producing or sending alerts, or stopping operation.

Figure 21:
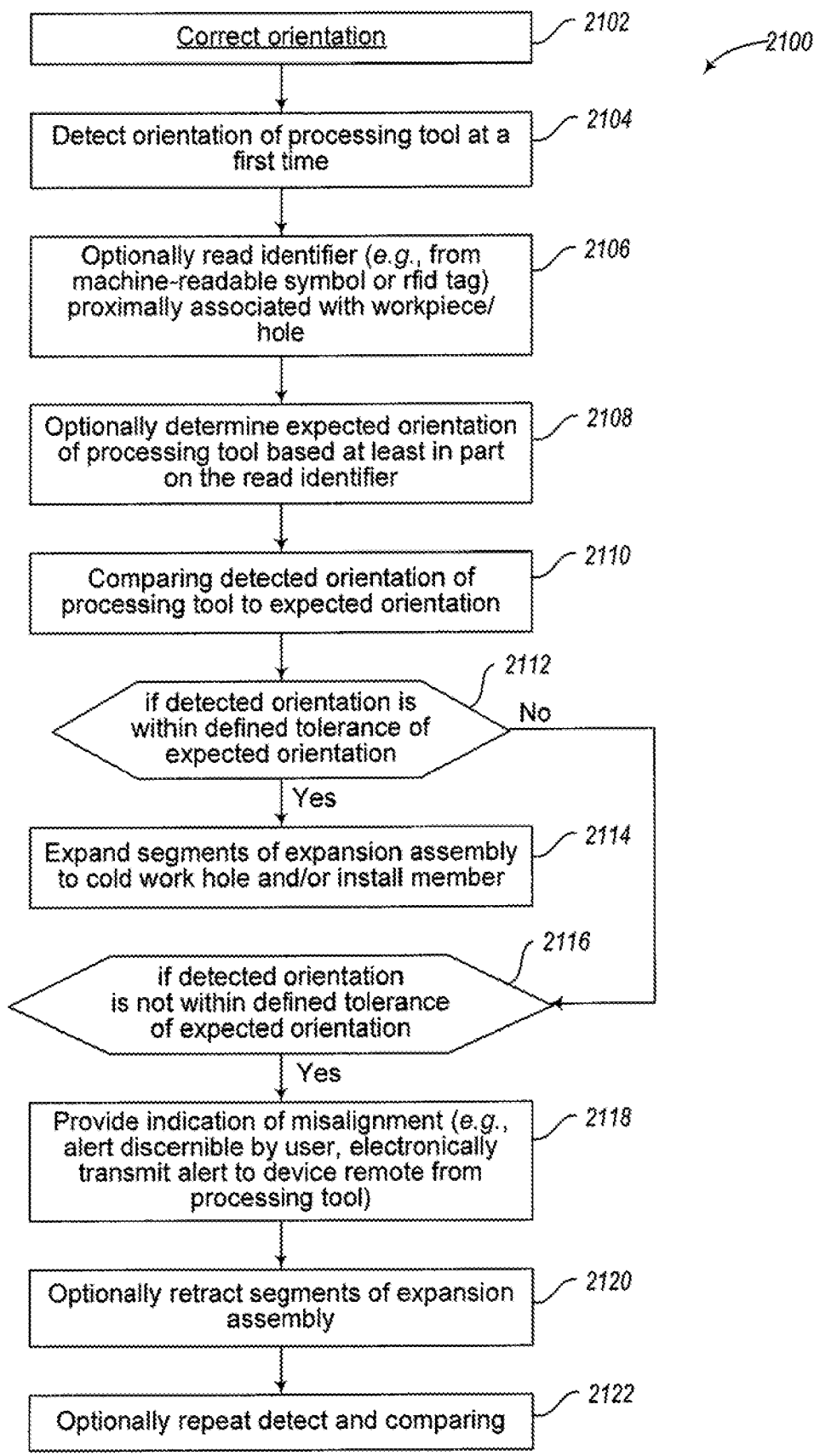
FIG. 21 is a flow diagram of a method of operating a processing system including determining if material characteristics are as expected, accordingly to one illustrated embodiment, which may be useful in performing the method of FIG. 7.

FIG. 21 shows a method 2100 of dynamically operating a processing tool of a processing system including determining if a material on which processing is to be performed has expected material characteristics or properties, accordingly to one illustrated embodiment. The method 2100 may be useful in executing the method 700.

At 2102, at least one sensor detects a current orientation of the processing tool.

Optionally at 2104, a reader of the processing system reads an identifier proximally associated with a respective hole in the primary workpiece. The identifier may be a unique identifier that uniquely identifies a respective hole from any other holes in the primary workpiece. The identifier may be carried by or inscribed on the primary workpiece, for example proximate to a hole. The identifier may, for example, be encoded in at least one of a machine-readable symbol or wireless transponder (e.g., RFID transponder or tag), or some other data carrier. The data carrier may be secured to the workpiece, for example via a pressure sensitive adhesive.

At 2106, processor(s) determine an expected orientation for the respective hole. For example, the processors may determine the expected orientation based at least in part on the read identifier.

At 2108, the processor(s) compare the detected orientation of the processing tool to an expected orientation of the processing tool. For example, the processor(s) may compare the detected orientation to the expected orientation with respect to at least two perpendicular axes, or even three orthogonal axes. The processor(s) may, for instance, compare the detected orientation to the expected orientation in a reference frame of the workpiece. The processor(s) may, for instance, compare the detected orientation to the expected orientation in a real world reference frame oriented with respect to a gravitational force.

At 2110, the processor determines if the detected orientation is within a defined tolerance or threshold of the expected orientation. If so, the processing system takes a first action, for instance the processor(s) causes the processing tool to expand the expansion segments of the expansion assembly at 2112. For example, the processor(s) may cause the processing tool to further expand the expansion segments of the expansion assembly to cold work a portion of the primary workpiece around the hole to advantageously reduce the occurrence or severity of fatigue cracking. Additionally, or alternatively, the processor(s) may cause the processing tool to further expand the expansion segments of the expansion assembly to create an interference fit between a secondary workpiece or expandable member to be secured at least partially in the hole and an interior surface of the respective hole of the primary workpiece.

At 2114, the processor(s) determines if the detected orientation is not within a defined tolerance or threshold of the expected orientation. If not, the processing system takes at least one second action. For example, the processor causes an indication of misalignment to be provided at 2116. Providing an indication of misalignment may include producing an alert discernible by a user of the processing tool. Providing an indication of misalignment may include electronically transmitting an alert to a device remote from the processing tool. At 2118, the processor may additionally, or alternatively, cause the processing tool to retract the expansion segments of the expansion assembly. Such may allow realignment, repositioning or reorientation of the processing tool with respect to the hole and/or primary workpiece. Optionally at 2120, the processor(s) may cause the processing tool to repeatedly detect and compare following the retraction of the expansion segments of the expansion assembly. Such reassessment of the orientation. An upper limit may be placed on the number of cycles or repetition for any give hole and/or user.

Figure 22:
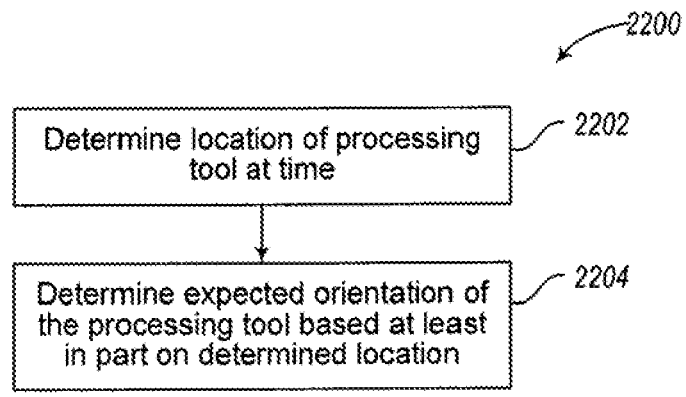
FIG. 22 is a flow diagram of a method of operating a processing system including determining spatial location and orientation, accordingly to one illustrated embodiment, which may be useful in performing the method of FIG. 21.

FIG. 22 shows a method 2200 of dynamically operating a processing tool of a processing system including determining spatial location and orientation based on location, accordingly to one illustrated embodiment. The method 2200 may be useful in executing the method 2100, for example in place of the reading 2104 and determination 2106 thereof.

At 2202, a component of the processing system may determining a current location of the processing tool. Determining location has been discussed in reference to the method 1400 (FIG. 14), and will not be repeated in the interest of brevity.

At 2204, the processor(s) may determine an expected orientation of the processing tool based at least in part on the determined location. The orientation may be with respect to a hole, workpiece, section of workpiece, or other reference frame or coordinate system, such as a global or World coordinate system, and may reflect a gravitational pull or vector. Additionally information may be employed in determining expected orientation, for example information read from a data carrier or previously programmed into the processing system.

Figure 23:
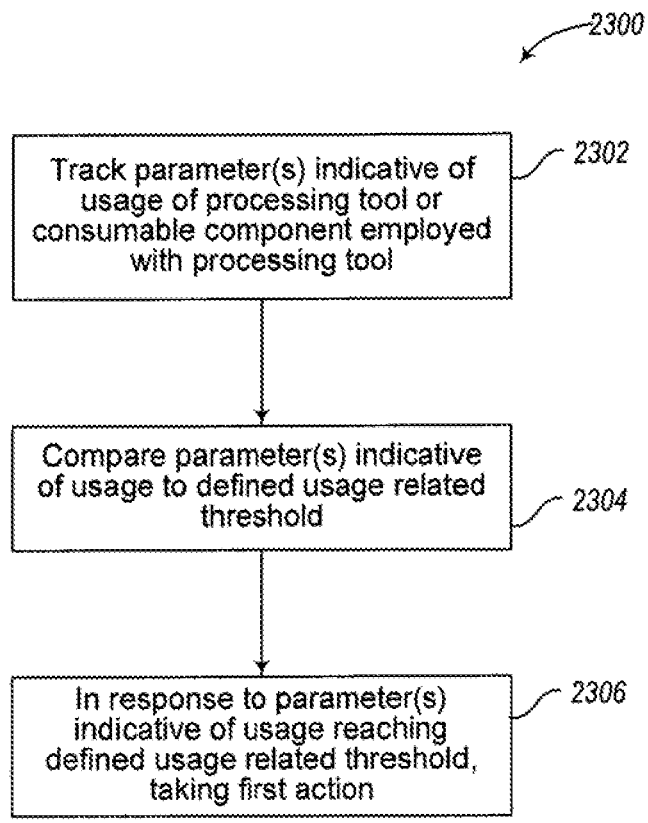
FIG. 23 is a flow diagram of a method of operating a processing system including monitoring usage of the processing tool and/or consumable components, accordingly to one illustrated embodiment, which may be useful in performing the method of FIG. 7.

FIG. 23 shows a method 2300 of dynamically operating a processing tool of a processing system including monitoring usage of the processing tool and/or consumable components, accordingly to one illustrated embodiment. The method 2300 may be useful in executing the method 700, for example in addition thereto.

At 2302, at least one processor track at least one parameter indicative of usage of at least one of a processing tool or a consumable component employed with the processing tool. For example, the processor(s) may track a total number of uses of at least portion of expansion assembly. Also for example, the processor(s) may track a total number of uses of the consumable component. For instance, the processor(s) may track a total number of uses of the consumable component on a hole-by-hole basis. Also for example, Additionally, or alternatively, the processor(s) may track a total number of uses of the processing tool.

At 2304, the processor(s) compare the at least one parameter indicative of usage to a defined usage related threshold. For example, the processor(s) may compare a total number of uses to a maximum permitted number of uses threshold.

At 2306, in response to the at least one parameter indicative of usage reaching the defined usage related threshold, the processor(s) take or cause a first action.

Figure 24:
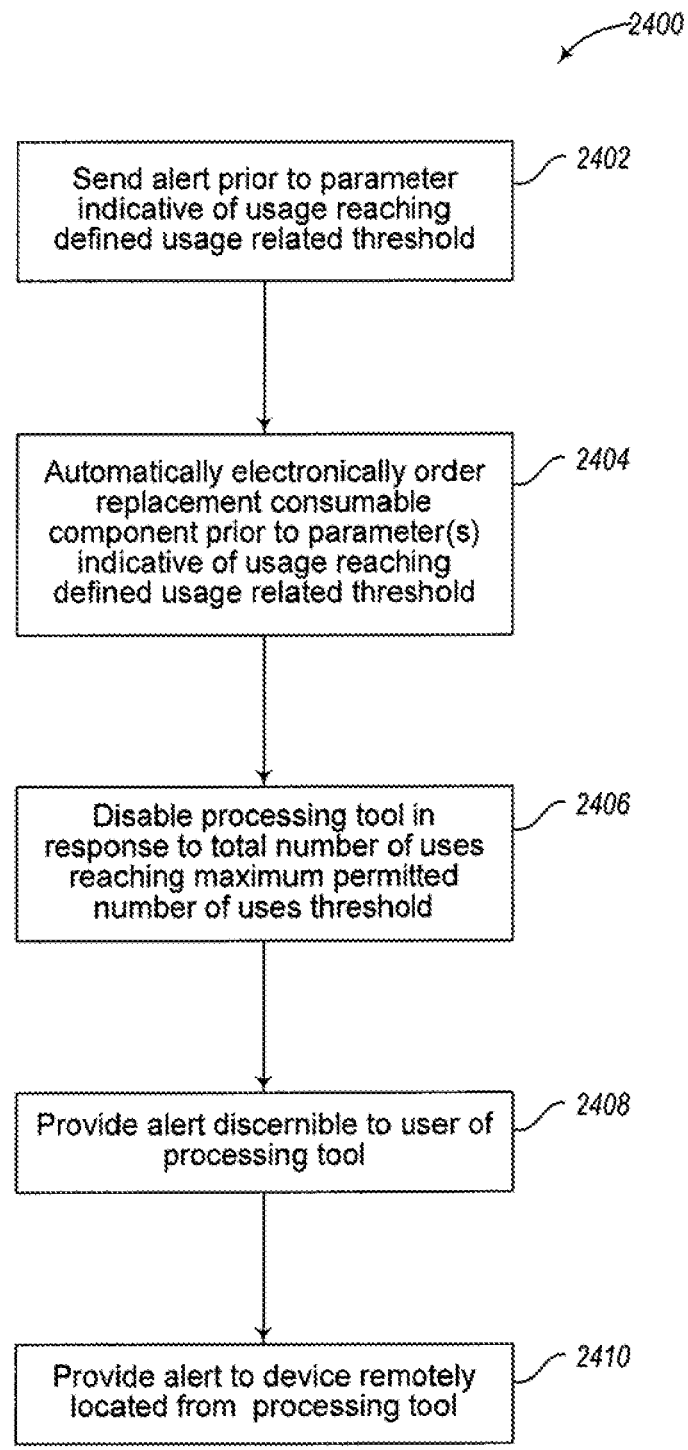
FIG. 24 is a flow diagram of a method of operating a processing system including taking an action, accordingly to one illustrated embodiment, which may be useful in performing the method of FIG. 23.

FIG. 24 shows a method 2400 of dynamically operating a processing tool of a processing system including taking action when monitored usage of the processing tool and/or consumable components is exceeded, accordingly to one illustrated embodiment. The method 2400 may be useful in executing the method 2300, for example in performing taking at least a first action 2306.

At 2402, prior to the at least one parameter indicative of usage reaching the defined usage related threshold, the processor(s) may produce an alert or cause an alert to be produced. The alert may be discernible to a user, for example a visual alert, aural alert and/or tactile alert. Additionally, or alternatively, the alert may include an electronic message sent to a device remote from the processing tool.

At 2404, prior to the at least one parameter indicative of usage reaching the defined usage related threshold, the processor(s) may automatically electronically order one or more replacement consumable components. Such may include an electronic message or use of an electronic fulfillment system.

At 2406, in response to the at least one parameter indicative of usage reaching the defined usage related threshold, the processor(s) may disable the processing tool. The processor may disable any processing tool to which the consumable component is physically coupled or proximate. As described herein, such may include reading information from a wireless transponder, which information is necessary for the processor(s) to allow operation of the processing tool.

At 2408, in response to the at least one parameter indicative of usage reaching the defined usage related threshold, the processor(s) may produce an alert or cause an alert to be produced which is discernible to a user. The alert may, for example, be a visual alert by a display or light(s), an aural alert via a speaker, and/or tactile alert via a vibration element of the processing tool.

Additionally, or alternatively, at 2410, in response to the at least one parameter indicative of usage reaching the defined usage related threshold, the processor(s) may electronically transmit an alert to one or more devices remotely located from the processing tool. For example, the processor(s) may transmit or cause to be transmitted electronic mail messages, text messages, voicemail message, facsimiles, etc.

Figure 25:
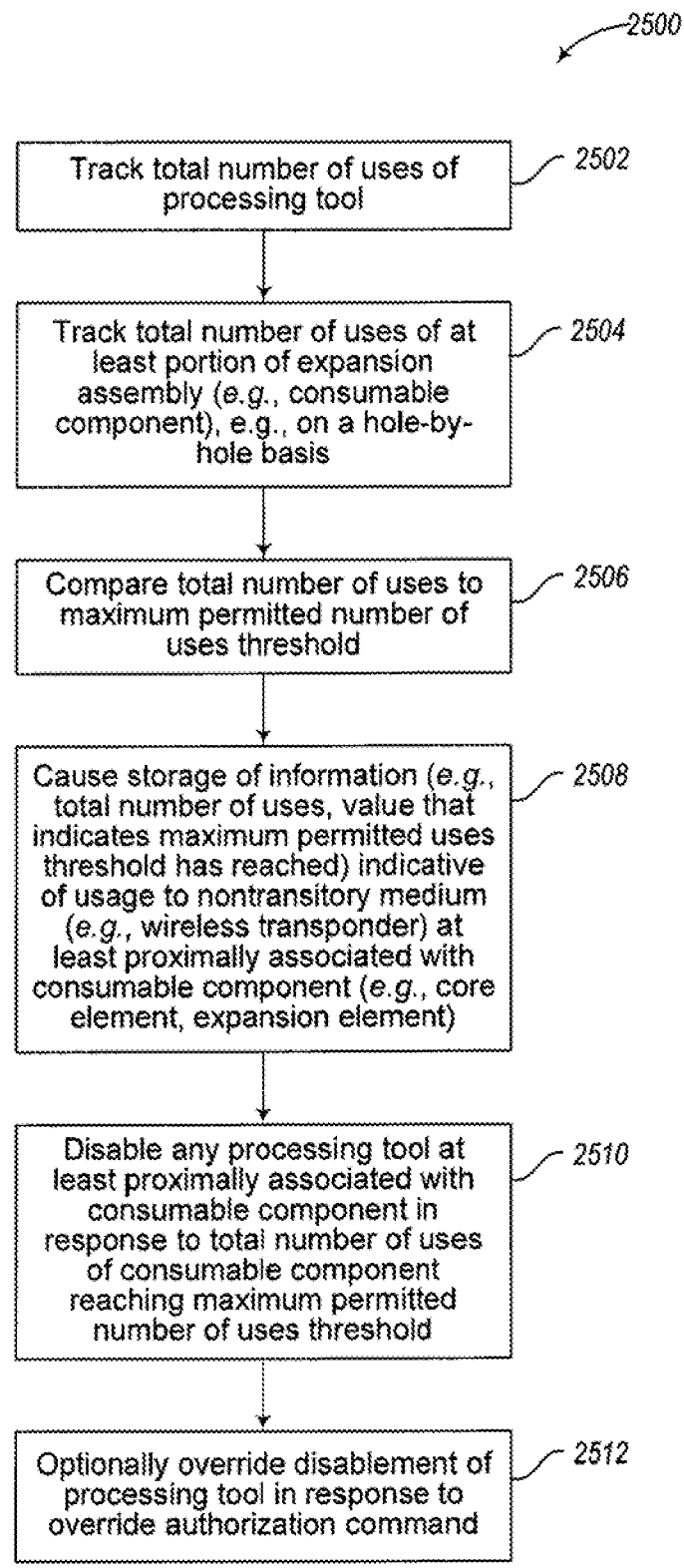
FIG. 25 is a flow diagram of a method of operating a processing system including producing alerts, accordingly to one illustrated embodiment, which may be useful in performing the method of FIG. 23.

FIG. 25 shows a method 2500 of dynamically operating a processing tool of a processing system including monitoring usage of the processing tool and/or consumable components, accordingly to one illustrated embodiment. The method 2500 may be useful in executing the method 2300, for example as part of, in place of, or in addition thereto.

At 2502, at least one processor tracks usage of a processing tool. Such may for example, track a total number of cycles performed by the processing tool, a total number of installations, or a total amount of time in use. The tracking may be from inception or introduction of the processing tool in the manufacturing environment, however will typically be from a most recent servicing or overhaul of the processing tool. Tracking may be focused on wearable components of the processing tool. Tracking may take into account temperatures, particularly where excessive temperature tends to exacerbate wear.

At 2504, at least one processor tracks usage of a consumable component or portion thereof employed with the processing tool. The consumable component may, for example, be detachably physically coupled to the processing tool, and driven thereby. The consumable component may be more susceptible to wear than the processing tool. The consumable component may take a large variety of forms, for instance an expansion assembly or portion thereof used with an actuator or driver unit (e.g., puller, pusher). For example, a core element that is repeatedly driven into engagement with an expansion element of the expansion assembly may be particularly susceptible to wear. Also for example, expansion segments and/or retainment bands of the expansion element of the expansion assembly may be susceptible to wear. Tracking may, for example, include tracking a total number of cycles performed by the expansion assembly or portion thereof, a total number of installations, or a total amount of time in use. The tracking may be from inception or introduction of the expansion assembly or portion thereof in the manufacturing environment, however will typically be from a most recent servicing or overhaul of the expansion assembly or portion thereof. Tracking may be focused on wearable components of the processing tool. Tracking may take into account temperatures, particularly where excessive temperature tends to exacerbate wear.

At 2506, at least one processor compares a value indicative of usage (e.g., total number of uses) to a threshold value (e.g., maximum permitted number of uses).

At 2508, in response to determining that the total usage exceeds the permitted or maximum usage, at least one processor may cause information indicative of having exceed the usage threshold to be stored to a nontransitory medium at least proximally associated with the consumable component.

For example, the processor(s) may cause information indicative a maximum permitted uses threshold having been reached to a nontransitory medium at least proximally associated with the consumable component. For instance, the processor(s) may cause information indicative of a maximum permitted uses threshold having been reached to be stored to a nontransitory medium at least proximally associated with a consumable core element of an expansion assembly. Additionally, or alternatively, the processor(s) may cause information indicative of a maximum permitted uses threshold having been reached to be stored to a nontransitory medium at least proximally associated with a consumable expansion element of an expansion assembly. Additionally, or alternatively, the processor(s) may cause information indicative of a maximum permitted uses threshold having been reached to be stored to a nontransitory medium at least proximally associated with a processing tool to which the expansion assembly having the consumable component is physically coupled.

At 2510, in response to the at least one parameter indicative of usage reaching the defined usage related threshold, the processor(s) may cause or may disable the processing tool. Such may, for instance, occur in response to a total number of uses reaching a maximum permitted number of uses threshold. Also for example, the processor(s) make cause or may disable any processing tool at least proximally associated with the consumable component in response to a total number of uses of the consumable component reaching a maximum permitted number of uses threshold.

Additionally or alternatively, in response to the at least one parameter indicative of usage reaching the defined usage related threshold, at least one processor may cause a wireless transponder at least proximally associated with the consumable component to be rendered incapable of permitting use of the processing tool in conjunction with the consumable component. For example.

Additionally or alternatively, in response to the at least one parameter indicative of usage reaching the defined usage related threshold, at least one processor may provide or cause provision of an alert discernible to a user of the processing tool.

Additionally or alternatively, in response to the at least one parameter indicative of usage reaching the defined usage related threshold, at least one processor may provide or may cause provision of an alert to a device remotely located from the processing tool.

Additionally or alternatively, in response to the at least one parameter indicative of usage reaching the defined usage related threshold, at least one processor may send or cause the sending of an alert prior to the at least one parameter indicative of usage reaching the defined usage related threshold.

Additionally or alternatively, in response to the at least one parameter indicative of usage reaching the defined usage related threshold, at least one processor may automatically electronically order a replacement consumable component.

Additionally or alternatively, in anticipation of the at least one parameter indicative of usage reaching the defined usage related threshold, at least one processor may automatically electronically order a replacement consumable component. Such may rely on a preliminary threshold, set to assure that a replacement consumable component will be available, for example on a just in time basis. The preliminary threshold may be set based on past experience, reflecting how quickly the consumable component wears, particular over the final stages of its useful life, as well as delivery times for various consumable components.

Optionally at 2512, the processor(s) may override the disabling of a processing tool, for example in response to an override authorization command. The override authorization may require an authorization code, which may be provided to users on an individual basis, or which may be retained only by supervisory personnel. Such may be a value that may be keyed into the processing tool via a keypad or other user interface device. Alternatively or additionally, the authorization code may be stored in electronic form in some nontransitory storage medium, for example associated with a smartcard or wireless transponder.

Figure 26:
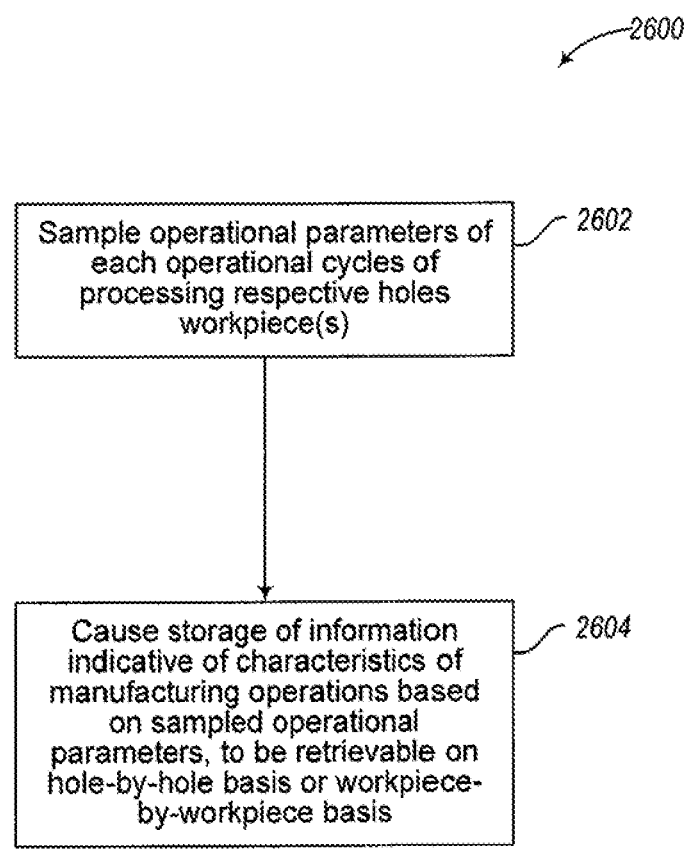
FIG. 26 is a flow diagram of a method of operating a processing system including monitoring usage of the processing tool and/or consumable components, accordingly to one illustrated embodiment, which may be useful in performing the method of FIG. 7.

FIG. 26 shows a method 2600 of dynamically operating a processing tool of a processing system including monitoring usage of the processing tool and/or consumable components, accordingly to one illustrated embodiment. The method 2600 may be useful in executing the method 700, for example in addition thereto or in place thereof.

At 2602, at least one processor may sample a number of sensors which sense a number of operational parameters of each of a number of operational cycles of a processing of respective ones of a number of holes in a number of primary workpieces.

At 2604, the processor(s) may store or cause the storage of information to at least one nontransitory storage medium, the information indicative of characteristics of a number of manufacturing operations based on the sensed operational parameters. The stored information may represent a number of aspects of at least one of the processing or the materials that are the subject of the processing. The information may preferably be stored in a form or format to be retrievable on at least one of a hole-by-hole basis or a workpiece-by-workpiece basis. For example, the information may be stored in records of a database, searchable by hole identifier or workpiece identifier.

Figure 27:
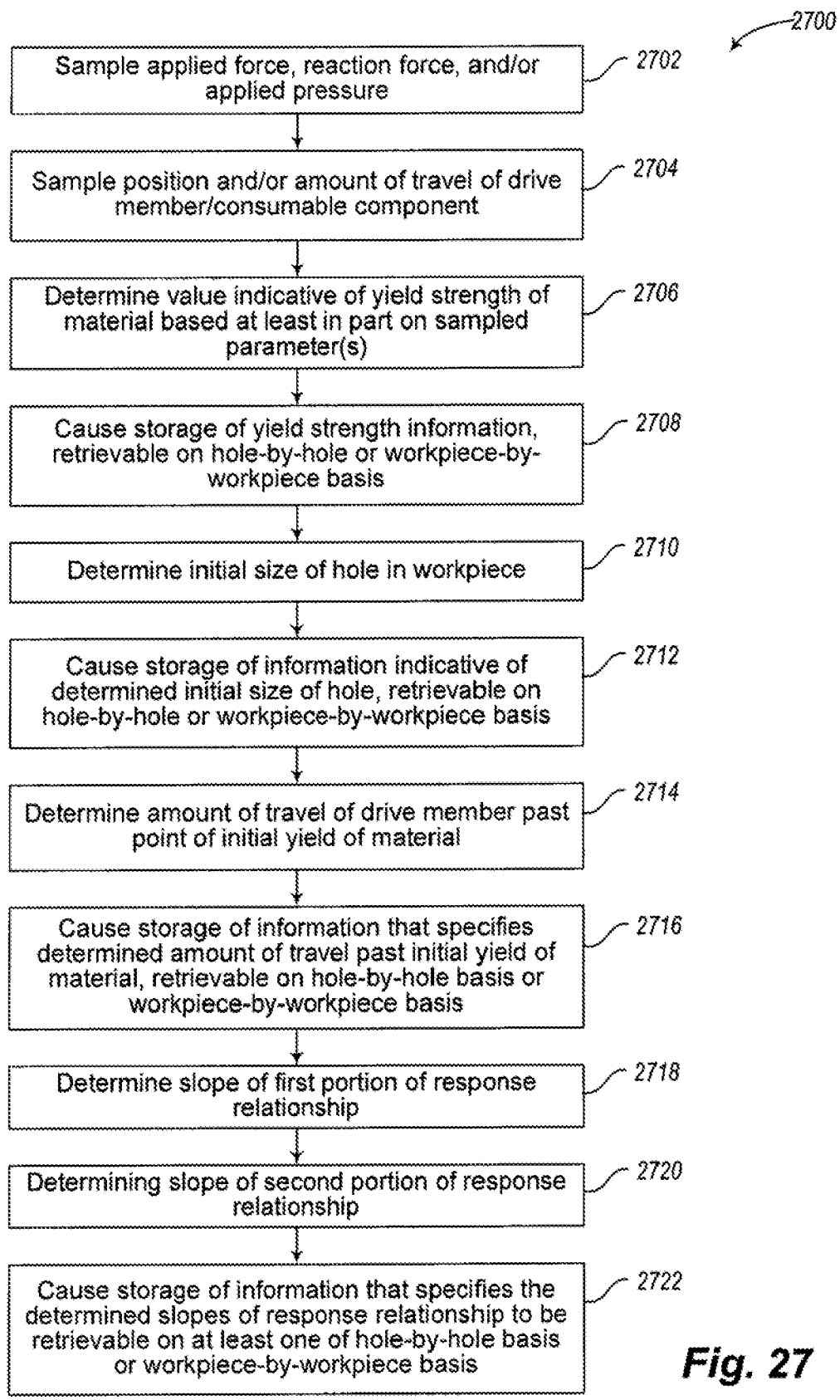
FIG. 27 is a flow diagram of a method of operating a processing system including tracking and storing information about processing, accordingly to one illustrated embodiment, which may be useful in performing the method of FIG. 26.

FIG. 27 shows a method 2700 of dynamically operating a processing tool of a processing system including tracking and storing information about the processing, accordingly to one illustrated embodiment. The method 2700 may be useful in executing the method 2600, for example in addition thereto or in place thereof.

At 2702, at least one processor samples at least one of an applied force, a reaction force resulting from the applied force or an applied pressure sensed by at least one sensor. For example, the processor(s) may sample the applied pressure sensed proximate a piston of the processing tool.

At 2704, at least one processor samples at least one of a position or an amount of travel of a drive member sensed by at least one sensor. For example, the processor(s) may sample at least one of the position or the amount of travel of the drive member of the processing tool or a consumable expansion component physically detachably coupled to the processing tool.

At 2706, at least one processor determines at least one value indicative of a yield strength of a material. The processor(s) may determine the value(s) indicative of yield strength of the material based at least in part of the sampled or sensed operational parameters. The processor(s) determine at least one value indicative of a yield strength of a material. For example, the processor(s) may determine a value indicative of a yield strength of a material by determining an inflection between a first portion of a response relationship and a second portion of the response relationship. The response relationship may, for example, being a function of a value indicative of one of the position of or the distance of travel of the drive member relative to a value indicative of one of the pressure, the reaction force, or the applied force over at least a portion of an operational cycle for a respective hole.

At 2708, at least one processor stores or causes the storage of information indicative of the determined yield strength of the material to at least one nontransitory storage medium. The information indicative of the determined yield strength may be stored in a form or format retrievable on at least one of a hole-by-hole basis or a work-piece-by-workpiece basis. For example, the information indicative of the determined yield strength may be stored in records of a database, retrievable based on a hole identifier or workpiece identifier.

At 2710, at least one processor may determine an initial size of a hole in a primary workpiece. For example, sampling may, for example, include sampling a sensed reaction force resulting from contact, directly or indirectly, with an interior surface of a respective one of the holes. The processor(s) may detect an increase in the reaction force resulting from an initial contact of the segments directly or indirectly with the interior surface of the respective hole. The processor(s) may then determine an initial size of the respective hole in the workpiece based at least in part on the detection of the increase in reaction force, as previously described herein.

At 2712, at least one processor stores or causes the storage of information indicative of the determined initial size of the respective hole to at least one nontransitory storage medium. The information indicative of the determined initial size of the respective hole may be stored in a form or format retrievable on at least one of a hole-by-hole basis or a work-piece-by-workpiece basis. For example, the information indicative of the determined initial size of the respective hole may be stored in records of a database, retrievable based on a hole identifier or workpiece identifier.

At 2714, at least one processor may determine an amount of travel of a drive member past a point of initial yield of a material. For example, the processor(s) may find a point of inflection between two relatively linear portions of a response relationship (e.g., position versus pressure), with respective slopes similar to respective expected slopes.

At 2716, at least one processor stores or causes the storage of information indicative of the determined amount of travel of a drive member past a point of initial yield of a material to at least one nontransitory storage medium. The information indicative of the determined amount of travel of a drive member past a point of initial yield of a material may be stored in a form or format retrievable on at least one of a hole-by-hole basis or a work-piece-by-workpiece basis. For example, the information indicative of the determined amount of travel of a drive member past a point of initial yield of a material may be stored in records of a database, retrievable based on a hole identifier or workpiece identifier.

At 2718, at least one processor may determine a first slope of a first portion of a response relationship. At 2720, at least one processor may determine a slope of a second portion of the response relationship. The response relationship may, for example, be a function of a value indicative of one of a position of or a distance of travel of a drive member relative to a value indicative of one of a pressure, an applied force, or a reaction force to the applied force, over at least a portion of an operational cycle for a respective one of the holes.

At 2722, at least one processor stores or causes the storage of information indicative of the determined slopes to at least one nontransitory storage medium. The information indicative of the determined slopes may be stored in a form or format retrievable on at least one of a hole-by-hole basis or a work-piece-by-workpiece basis. For example, the information indicative of the determined slopes may be stored in records of a database, retrievable based on a hole identifier or workpiece identifier.

Figure 28:
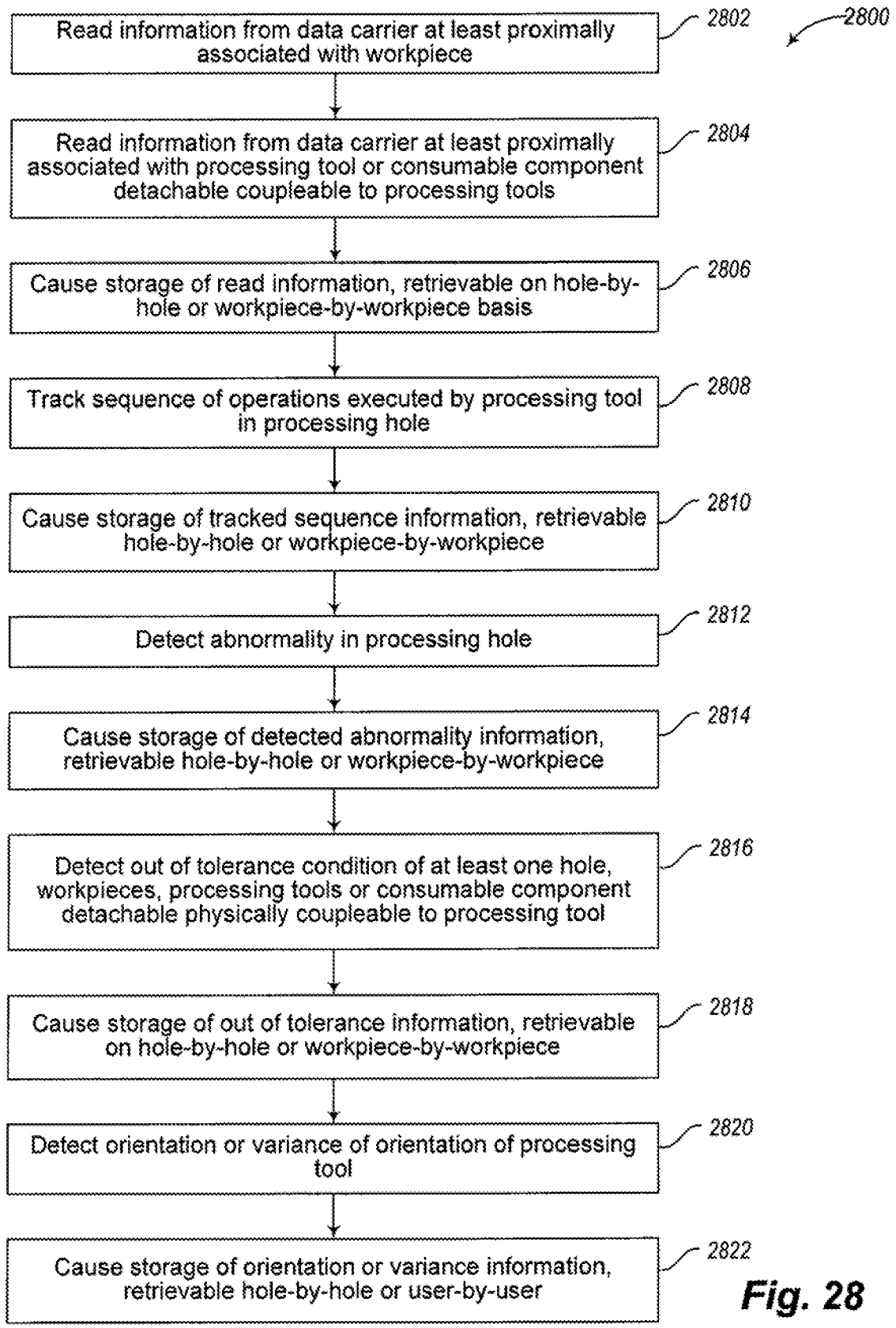
FIG. 28 is a flow diagram of a method of operating a processing system including tracking and storing information about processing, accordingly to one illustrated embodiment, which may be useful in performing the method of FIG. 27.

FIG. 28 shows a method 2800 of dynamically operating a processing tool of a processing system including tracking and storing information about the processing, accordingly to one illustrated embodiment. The method 2800 may be useful in executing the method 2700, for example in addition thereto or in place thereof.

At 2802, at least one processor or reader reads information from at least one data carrier at least proximally associated with a respective workpiece. As previously explained, a reader of the processing system may read information from, for example, a machine-readable symbol or wireless transponder which may be attached to or proximate the workpiece.

At 2804, at least one processor reads or causes the reading of information from a data carrier at least proximally associated with a respective one of the processing tools or a consumable component detachably coupleable to the processing tools. As previously explained, a reader of the processing system may read information from, for example, a machine-readable symbol or wireless transponder which may be attached to or proximate the processing tool and/or consumable component (e.g., expansion assembly).

At 2806, at least one processor stores or causes the storage of read from the data carrier to at least one nontransitory storage medium. The information is preferably stored to be retrievable on at least one of a hole-by-hole basis or a work-piece-by-workpiece basis. The nontransitory storage medium may be part of, or collocated with a processor-based controller which controls the respective processing tool. Alternatively or additionally, the nontransitory storage medium may be part of, or collocated with a host computer system, which may be communicatively coupled with a plurality of processor-based controllers, each of the processor-based controllers controlling a respective one or more processing tools.

At 2808, at least one processor tracks a sequence of operations executed by one of the processing tools in processing a respective one of the holes. The sequence may specify various acts or steps performed, either with or without parameters or conditions sensed at the various acts or steps. The sequence may, for example, specify at time and date of starting an operation of a particular hole, and completing the operation. The sequence may specify a determined initial hole size. May specify that various dimensions to which the hole was expanded at sequential times, positions or steps of the processing operation. The sequence may specify various ratios, inflection points, slopes or other relationships sensed, measured or otherwise determined during the processing operation. The sequence may specify an initial expansion step, an elastic expansion step, a plastic expansion step, a travel limit step, and a retraction step. The sequence may also specify any abnormalities, out of tolerance conditions and/or alerts issued during the processing operation.

At 2810, at least one processor stores or causes the storage of information that specifies the tracked sequence of operations executed by one of the processing tools in processing a respective one of the holes to at least one nontransitory storage medium. The information is preferably stored to be retrievable on at least one of a hole-by-hole basis or a work-piece-by-workpiece basis. As noted, the nontransitory storage medium may be part of the processor-based controller, or separate therefrom.

At 2812, at least one processor detects an abnormality in processing a respective one of the holes. Abnormalities may, for example, include processing tool mispositioned, misoriented or misaligned, occurrence of an act or step out of sequence, unexpected values such as values indicative of an incorrect type of material for the workpiece, variation in speed of operation from expected, variation in starting or end point (e.g., stroke) from expected, variation in amount of travel between two points (e.g., points of inflection), excessive temperature or excessive vibration, etc.

At 2814, at least one processor stores or causes the storage of information that specifies the detected abnormality to at least one nontransitory storage medium. The information is preferably stored to be retrievable on at least one of a hole-by-hole basis or a work-piece-by-workpiece basis. As noted, the nontransitory storage medium may be part of the processor-based controller, or separate therefrom.

At 2816, at least one processor detects an out of tolerance condition of a respective hole, workpiece, processing tool and/or consumable component. Out of tolerance conditions for holes may, for example, include initial hole size too large, initial hole size too small, initial hole not symmetrical (i.e., out of round), hole out of position on the workpiece, etc. Out of tolerance conditions for workpieces may, for example, include too thick, too thin, incorrect type of material, yield strength out of acceptable range, surface too rough, surface too smooth, etc. Out of tolerance conditions for processing tools may, for example, include over pressure, under pressure, insufficient lubrication, excessive temperature, excessive vibration, over voltage, under voltage, excessive wear, etc. Out of tolerance conditions for consumable components may, for example, include excessive use or wear, out of round, diameter too small, uneven surfaces, etc.

At 2818, at least one processor stores or causes the storage of information that specifies the detected abnormality to at least one nontransitory storage medium. The information is preferably stored to be retrievable on at least one of a hole-by-hole basis or a work-piece-by-workpiece basis. As noted, the nontransitory storage medium may be part of the processor-based controller, or separate therefrom.

At 2820, at least one processor detects a current orientation or variance of orientation of a processing tool. The processor(s) may base such at least in part on information sampled from at least one sensor. The sensor may, for example, take the form of a three axis accelerometer.

At 2822, at least one processor stores or causes the storage of information that specifies the detected orientation or variance of orientation to at least one nontransitory storage medium. The information is preferably stored to be retrievable on at least one of a hole-by-hole basis or a work-piece-by-workpiece basis. As noted, the nontransitory storage medium may be part of the processor-based controller, or separate therefrom.

Figure 29:
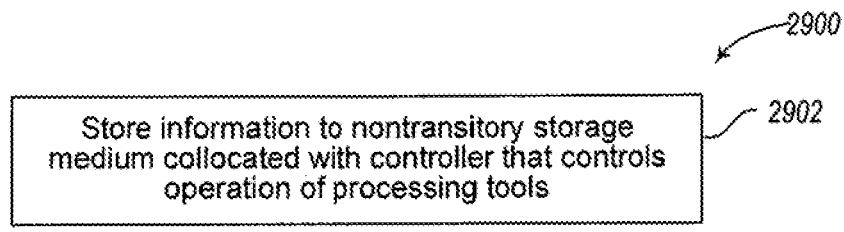
FIG. 29 is a flow diagram of a method of operating a processing system including storing information locally, accordingly to one illustrated embodiment, which may be useful in performing the method of FIG. 28.

FIG. 29 shows a method 2900 of dynamically operating a processing tool of a processing system including storing information about the processing, accordingly to one illustrated embodiment. The method 2900 may be useful in executing the method 2800.

At 2902, at least one processor stores or causes the storage of information indicative of characteristics of a manufacturing operation to at least one nontransitory storage medium which is collocated with a process-based controller that controls operation of a respective processing tool.

Figure 30:
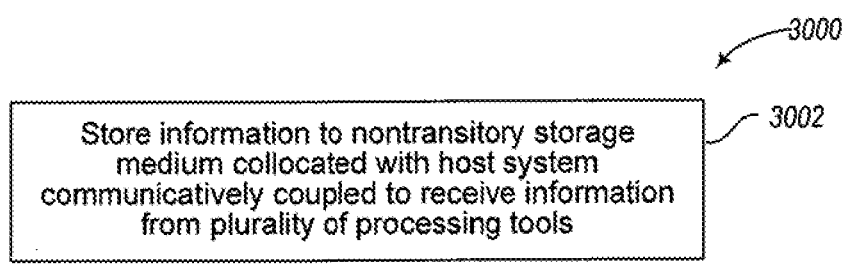
FIG. 30 is a flow diagram of a method of operating a processing system including storing information remotely, accordingly to one illustrated embodiment, which may be useful in performing the method of FIG. 28.

FIG. 30 shows a method 3000 of dynamically operating a processing tool of a processing system including storing information about the processing, accordingly to one illustrated embodiment. The method 3000 may be useful in executing the method 2800.

At 3002, at least one processor stores or causes the storage of information indicative of characteristics of a manufacturing operation to at least one nontransitory storage medium which is collocated with a host computer system, which is communicatively coupled to receive the information from a plurality of processor-based controllers, each of which control at least one respective processing tool.

Figure 31:
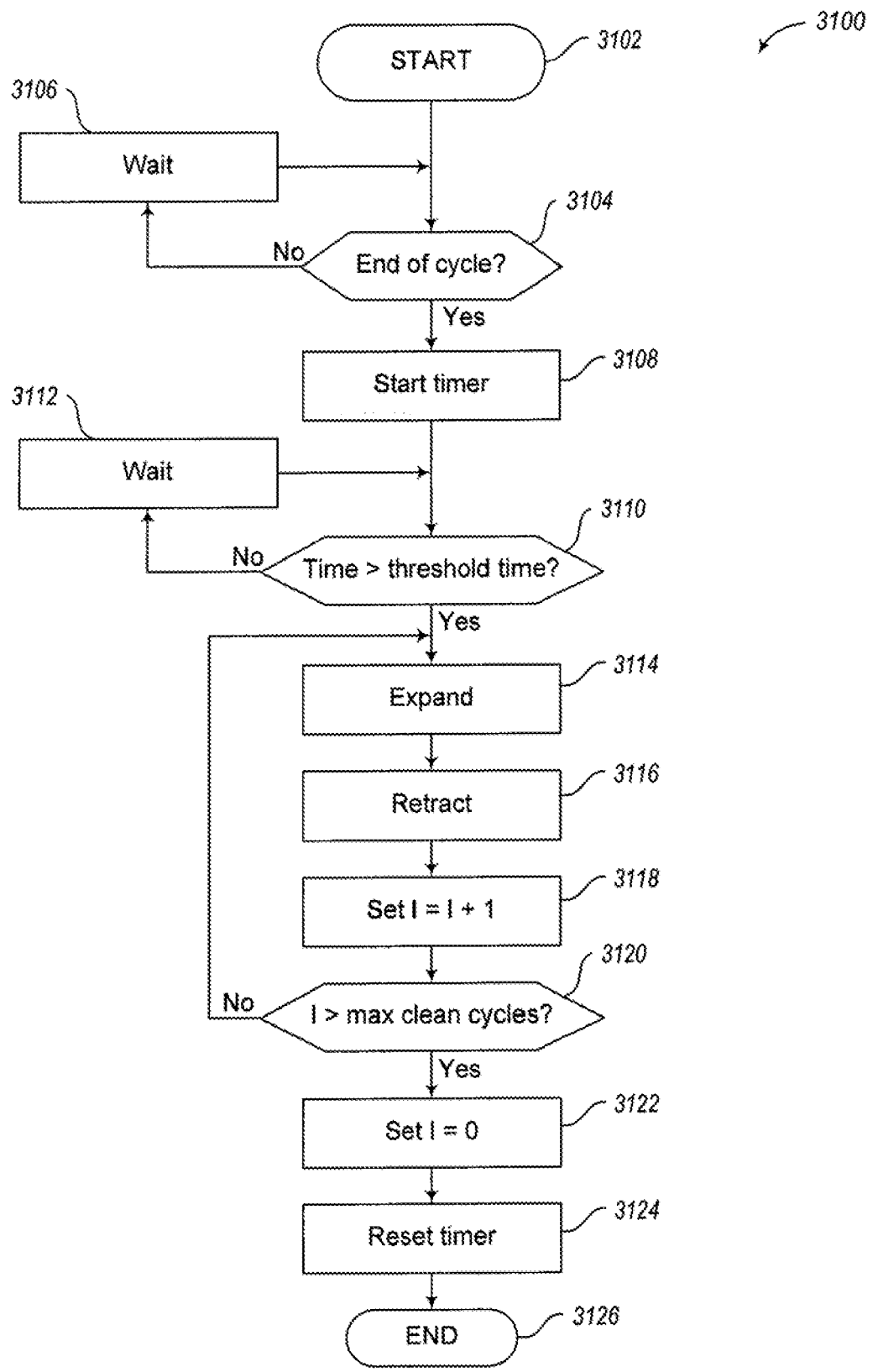
FIG. 31 is a flow diagram of a method of operating a processing system including self cleaning of the processing tool, accordingly to one illustrated embodiment, which may be useful in performing the method of FIG. 7.

FIG. 31 shows a method 3100 of operating a processing system including self cleaning of the processing tool, accordingly to one illustrated embodiment. The method 3100 may be useful in performing the method of FIG. 7, for example in addition thereto. The method 3100 may, for example, be executed as a parallel process.

The method 3100 starts at 3102, for example starting in response to activation of the processing tool, processing system, or in response to a call or invocation from another routine, program or method. The method 3100 may automatically trigger a self cleaning cycle for the processing tool, for example as explained below. Alternatively, or additionally, the self cleaning may be triggered response to a user or operator input indicative of a desire to trigger self cleaning of the processing tool.

At 3004, at least one processor determines whether a processing cycle has ended. For example, the processor(s) may determine whether a final operation of a cycle to either radially expand a hole in a primary workpiece and/or install or fix an expandable member in a hole of a primary workpiece has been completed. Such may, for example be determined based on the sensed information, data or parameters, for instance position of a drive member.

If the end of the processing cycle has not occurred, the processor(s) wait at 3106, for some defined time. If the end of the processing cycle has occurred, control passes to 3108.

At 3018, the processor(s) start a timer. At 3110, the processor(s) determine whether a threshold time has been exceeded. In particular, the threshold time may be a time after the completion of a processing cycle after which self cleaning is to be triggered. Such may be set to accommodate the normal delays incurred in operating the processing tool, so may be specific to a type of processing being performed and/or a type of workpiece being processed, or even specific to a user or operator. Such may also be set to accommodate the material to be cleaned from the processing tool. For example, the self cleaning may be intended to clean a sealant or an adhesive employed in the processing operation. Those materials may have a set or cure time, after which the material properties change, rendering cleaning significantly more difficult, if not practically impossible.

If the timer has not reached the timer threshold or the timer otherwise expired, the processor(s) wait at 3112, for some defined time. If the timer threshold has been reached or the timer otherwise expired, control passes to 3114.

At 3114, the processor(s) cause the expansion assembly to expand. For example, the processor(s) may provide signals to control one or more actuators and/or valves to drive a drive member a desired amount. Such may tend to force accumulated material which constitute contaminants (e.g., sealer, adhesive) from the processing tool.

At 3116, the processor(s) cause the expansion assembly to retract. For example, the processor(s) may provide signals to control one or more actuators and/or valves to drive a drive member a desired amount.

At 3118, the processor(s) increment a counter. The counter may be used to track a total number of expansion and retraction cycles performed as part of a single cleaning cycle or operation. At 3120, the processor(s) determine whether the counter has reached a defined counter threshold or maximum number of cycles for a cleaning cycle or operation. The counter threshold or maximum number of cycles may be selected to assure removal or substantial elimination of the contaminants. Such may be based upon empirical observation.

If the defined counter threshold or maximum number of cycles has not been reached, control returns to 3114 for another repetition. If the defined counter threshold or maximum number of cycles has been reached, control passes to 3122. Such indications that the self cleaning of the processing tool has been completed.

At 3122, the processor(s) set the counter to zero and at 3124 resets the timer in preparation for another self cleaning cycle. The method 3100 terminates at 3126. Optionally, the method 3100 may continually repeat, monitoring for a break in use of the processing tool to trigger another self cleaning cycle.

Conclusions

Expandable Member

The processing system 100 of FIG. 1 may be used to radially expand holes in workpieces, for example to cold work the area surrounding the hole, thereby relieving stress in the workpiece and increasing fatigue life.

As noted above, the processing system 100 of FIG. 1 may be used to install expandable members. The term "expandable member" is used herein interchangeably with "secondary workpiece", and is a broad term which includes, but is not limited to, a bushing (including flanged bushing, no flange bushing), washer, sleeve (including a split sleeve), fitting, fastener, grommet, nut plate, conduit connectors, structural expandable member (e.g., expandable members that are incorporated into structural workpieces), and other structures that are suitable for securing to or otherwise physically coupling to a primary workpiece. In some embodiments, the expandable member can be expanded from a first configuration (pre-installed configuration) to a second configuration (installed configuration). For example, the expandable member may be a bushing having at least a portion that is radially expanded an amount sufficient to form an interference fit with an interior surface of a hole in a primary workpiece. The term expandable member refers to a member in a pre-expanded state and a post-expanded state, unless the context dictates otherwise.

In some embodiments, the expandable member is in a form of a non-through hole expandable member. As used herein, the term "non-through hole expandable member" is a broad term and includes, but is not limited to, an expandable member which is sized and dimensioned to fit within a non-through hole, such as a blind hole or other hole that does not extend completely through a workpiece, or otherwise has limited backside access.

Various types of expansion processes can be employed to expand the expandable members. In a cold expansion process, for example, the expandable member is radially expanded, without appreciably raising the temperature of the expandable member, to produce residual stresses in a workpiece and/or expandable member to enhance fatigue performance. The residual stresses are preferably compressive stresses that can minimize, limit, inhibit, or substantially prevent initiation and/or crack propagation.

Expansion Assembly

As illustrated in FIGS. 1, 2A and 2D, the expansion assembly 104 includes a mandrel or core element 130 and an expandable portion 114 which includes a plurality (e.g., four) expansion segments 150.

The core element 130 may be a generally elongated member, and has one or more contact surfaces. The contact surfaces of the core element 130 may be beveled, tapered or otherwise contoured. As illustrated, the core element 130 has four contact surfaces. In other embodiments, the core element 130 may have a greater number of contact surfaces (e.g., five, six, eight, or more) or fewer contact surfaces (e.g., three, two, one). The core element 130 may take the form of a shaft, rod, link, shank, elongate member, or other member suitable for driving the expansion segments.

The expansion segments 150 each have a first surface (e.g., outer surface) that in use contacts either an expandable member 108, or an interior surface of a hole 110 in the primary workpiece 112. The expansion segments 150 each have a second surface (e.g., inner surface), which in use is contacted by the contact surfaces of the core element. The second surfaces of the expansion segments 150 may be beveled, tapered or otherwise contoured. For example, second surfaces of the expansion segments 150 may be beveled, tapered or otherwise contoured to be complementary bevel, taper or contour of the second surfaces of the expansion segments 150.

The expansion segments 150 may be arrayed in a generally annular arrangement. The expansion segments 150 may be retained, and optionally biased, by one or more retainment members, for instance a pair of bands 154. The bands 154 may bias or urge the expansion segments 150 toward a first, radially contracted or unexpanded configuration.

The mandrel or core element 130 is received in a central passageway 156 formed between the expansion segments 150, for translation therethrough. When the core element 130 is in a first position, the expansion segments 150 are in first, radially contracted or unexpanded configuration. As the core element 130 is translated to a second position, the contact surfaces contact the second surfaces of the expansion segments 150, driving the expansion segments 150 radially outward, toward a second, radially expanded configuration.

Thus, the expansion assembly 104 can be resiliently and controllably expanded and contracted. As used herein, the term "resilient" is a broad term and includes, without limitation, being capable of withstanding working loads or movements without appreciable permanent or plastic deformation. In some embodiments, the expandable portion 114 of the resilient expansion assembly 104 can be moved from the first configuration to the second configuration repeatedly without appreciable permanent or plastic deformation. Of course, there may be a minimal degree of localized plastic yielding even though the expansion assembly generally experiences elastic deformation. In some embodiments, visual inspection can be used to determine whether there is appreciable plastic deformation. After the expandable portion 114 is actuated, any plastic deformation in the expansion assembly 104 may not be recognizable upon visual inspection with the naked eye. In some preferred embodiments, the deformation of the expansion assembly 104 is substantially elastic deformation during operation. Accordingly, the resilient expansion assembly 104 can be actuated any desired number of times.

Additionally or alternatively, the expansion assembly 104, or a portion thereof, can contain a liner, lubricant, combinations thereof, or other structure that reduces or increases the frictional interaction between the core element 130 and expansion portion 114. In some embodiments, a friction reducer in the form of a lubricant is applied to the bearing surfaces of the expansion assembly 104, expansion segments, and/or core element. For example, the inner surfaces of the expansion segments 150 can be coated with a lubricant for minimizing frictional interaction between the core element 130 and expansion segments 150. A coating (e.g., polymer, such as synthetic resins like polytetrafluoroethylene (PTFE), TEFLON®, nylon, NEDOX® CR+, blends, mixtures, etc.) can be used to reduce frictional forces. Other surface treatments can be used to achieve the desired frictional interaction between moving components of the processing system 100.

As noted above, the expansion assembly 104 may be used to install an expandable member 108 in a hole 110 in a primary workpiece 112. The expansion assembly 104 (preferably in the fully collapsed configuration or partially expanded configuration) can be sized to tightly receive the expandable member 108 to form, for example, an interference fit (e.g., a slight interference fit). In other embodiments, the expansion assembly 104 is sized to allow some play between the expandable member 108 and expandable portion 114. Alternatively, the expansion assembly 104 may be used to radial expand and/or cold work an opening or hole 110 without installation of an expandable member 108 therein or thereto.

The processing system 100 can be used to expand the expandable member 108 even though there is limited or no backside access. To position the expandable member 108 in the hole 110 of the workpiece 112, the unexpanded expansion portion 114 and associated expandable member 108 are inserted into the hole 110. In some embodiments, the hole 110 can be sized to closely receive the expandable member 108 to form a slight interference fit.

During the expansion process, the elongate expansion segments 150 are generally expanded radially outward. In the illustrated embodiment, the expansion segments 150 radially expand without pivoting. As such, the portions of the expansion segments 150 contacting the expandable member 108 can be generally expanded uniformly along their lengths, thereby ensuring proper placement of the expandable member 108 in the hole 110. This uniform expansion can minimize, limit, or substantially prevent axial displacement of the expandable member 108 relative to the hole 110. The expandable member 108, for example, can be generally axially fixed relative to the longitudinal axis of the hole 110 during the expansion process.

Advantageously, the expansion segments 150 can protect the expandable member 108 from the linear movement of the core element 130. As the expansion portion expands outwardly, the expansion segments 150 can be axially stationary relative to the hole 110, thus minimizing, limiting, or preventing frictional interaction and wear between the expansion assembly 104 and expandable member 108.

The processing system 100 can be used with one or more clamps or other positioning devices. If the installer has backside access, a clamp (e.g., a C-clamp) can help position the processing tool 104 relative to the primary workpiece 112. The processing system 100 can also be used without a positioning device, unlike traditional mandrel installation systems. Traditional mandrel installation systems react relatively large axial reactive forces to the installer requiring clamping devices for proper installation. These axial forces may cause undesirable movement between a bushing and workpiece, thus requiring a clamp for proper installation.

Because the expandable portion 114 expands generally radially outward (not linearly through the expandable member), the expansion assembly 104 can be easily held within the expandable member 108 without using a clamp. The reactive forces from the core element 130 are transferred to the processing tool 102 via the cap 158 (FIGS. 2A, 2B). The installer can conveniently position the expansion assembly 104 and expandable member 108 within the hole 110 of the primary workpiece 112 with minimal insertion forces, thereby eliminating the need for any clamps. The installer can therefore manually hold the processing tool 102 in proper position during the expansion process without the need of clamps or other holding devices.

To facilitate removal from the installed expandable member 108, a clearance fit can be formed between the collapsed expandable portion 114 and expandable member 108. Accordingly, the expansion assembly 104 can be easily removed from the expandable member 108 and used again to install another expandable member.

The processing system 100 of FIG. 1 can also be used to treat one or more features of a primary workpiece 112, without installing an expandable member 108. The processing system 100, for example, can be used to expand a hole 110 in a similar manner as the expandable member 108 described above. The processing system 100 can treat a hole 110 in a primary workpiece 112. At least a portion of the expandable portion 114 of the expansion assembly 104 can be inserted into the hole 110. The processing tool 102 can be activated to expand the expandable portion 114 and associated hole 110. For cold expansion, the expandable portion 114 can be expanded to cold work the hole 108 to produce residual stresses in the material forming the hole 108. Of course, the processing system 100 can also be used to perform other types of expansion processes.

Alternative Expansion Assemblies

As illustrated in FIGS. 1, 2A and 2D, the expansion assembly 104 includes a mandrel or core element 130 and an expandable portion 114 which includes a plurality (e.g., four) expansion segments 150.

While a specific expansion assembly 104 has been illustrated and described, many of the structures and acts described herein can be employed with other expansion assemblies. For example, the processing tool 102 may operate using an expansion assembly including an expansion jaw having plurality of elongate members that pivot radially outward. Some examples of a pivoting expansion jaw are described in U.S. Pat. No. 8,069,699. Such may not realize as uniform expansion as the expansion assembly 104 described herein, yet may still produce desired results. The various control systems and method described herein, as well as the storage systems and methods may be employed with such an expansion jaw.

Conventional Mandrels

Also, the processing tool 102 may operate with more traditional or conventional mandrels. Such mandrels typically include an elongated shaft with an expansion portion, having a gradually increasing taper to a maximum circumference, followed by a gradually decreasing taper. Conventional mandrels are drawn through either an expandable member to be secured in a hole or through a hole without an expandable member. Conventional mandrels disadvantageously directly contacting the surface if the expandable member or the hole, and hence applying axial or translation forces to the expandable member and/or the interior surface of the hole. Some examples of a pivoting expansion jaw are described in U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,111; 5,433,100. The various control systems and method described herein, as well as the storage systems and methods may be employed with such conventional mandrels.

Pause/Stop Operation

As explained previously, for example with respect to description of the methods 2000 (FIG. 20) and 2100 (FIG. 21), information regarding the materials and operation of the processing tool which is sensed or measured by one or more sensors may be used to pause, stop, abandon or abort a processing operation or processing cycle. Such may allow correction of some aspect of processing tool operation, for example, repositioning, realignment or reorientation, or replacement of some consumable component. Such may also implement one or more safety functions, preventing or limiting operation of the processing tool when an abnormality or out-of-tolerance condition is detected. Such may, for instance, be used to ensure safety of the use or operator of the processing tool, or to ensure that a primary workpiece is not damaged or destroyed. This is particularly advantageous where primary workpieces are large, expensive assemblies of other workpieces, such as fuselages or wings of aircraft. Examples, may include detecting pressure ramping up or increasing too quickly, or detecting a change of position of a drive member that does not match an expected change. These may indicated an abnormality, for example undersized hole, foreign matter in the interfaces, or the processing tool not inserted at a desired angle (e.g., 90°) relative to surface of the workpiece proximate the hole.

Cycle Counting

As explained previously, a count may be maintained of a total number of operational cycles to which a tool or portion thereof has been subjected. Such may be maintained for a consumable portion (e.g., core element 130, selectively expandable portion 114). Such may be maintained for the processing tool 102. The total cycles may be stored in some processor-readable non-transitory medium such as static memory. In some implementations, only successful completion of an operational cycle with cause the count to increment or decrement. A tool 102 to which a consumable portion is coupled may automatically check the total number of cycles to which the consumable portion has been subjected. The tool 102 may lock out operation if the consumable portion is past some defined number of cycles. Likewise, the tool 102 may lock out operation if the tool itself is past some defined number of cycles and thus requires refurbishment or replacement. The consumables, tool, and/or memory or circuit boards may each have unique identifiers (e.g., stored as machine-readable symbols or in RFID transponders) to implement such lock outs. On connecting a tool 102 to a processing system, the processing system may automatically download cycle information for the tool. The processing system may verify that the tool 102 is below a defined number of operational cycles before allowing the tool to be used. Likewise, on connecting a consumable portion (e.g., core element or expandable member) the tool 102 to tool processing system, the tool and/or processing system may automatically download cycle information for the consumable portion. The tool or processing system may verify that the consumable portion is below a defined number of operational cycles before allowing the tool with the attached consumable portion to be used.

Size to Fit

Employing sensors allows more precise control over the processing operations than conventional processing tools. Such, for example, allows installation of expandable members to size. Respective dimensional variation of the hole, mandrel, and expandable member to be installed, as well as variation in the material characteristics (e.g., yield strength) of the primary work piece results in a tolerance stack up. That is, these individual variances from nominal values accumulate for each installation. In contrast to conventional processing tools, the processing systems described herein allow installing expandable members to size, (FORCEMATE TO SIZE™).

The tool may be easily programmed, even "on-the-fly" to change parameters, for example to accommodate different materials, hole sizes, etc. For instance, the tool may be programmed to change or set the stroke or distance traveled and hence the percentage of radial expansion, the pressure or other value that defines the full forward and/or rearward travel. The tool may be programmed to set or define the dwell time at the fully forward and hence fully extended position is maintained prior to rearward travel. The tool may be programmed to set or adjust various other operational parameters. The tool may read and/or recognize certain characteristic and set parameters accordingly. For example, the tool may have one or more sensors that automatically determine a grip length of a consumable component, and may automatically select an appropriate set of operational parameters based on the determined grip length.

Robotics

While generally illustrated as a handheld tool, the above teachings may be employed with one or more robots. For example, the above described tool may take the form of an end effector placed at the end of a robotic member or arm. One or more cameras may be carried by the robotic member or placed elsewhere in a manufacturing or production environment. Conventional machine-vision techniques may be employed to recognize features (e.g., holes) in images captured by the cameras or other image acquisition devices. A computer- or processor may determine a path that drives the robotic member or arm to position the tool relative to a hole, placing a selectively expandable portion 114 in the hole and triggering a full cycle. Robotics may be particular advantageous given the repetitive nature of these tasks and the well defined geometry which may exist in many applications such as automotive manufacturing or aircraft manufacturing.

General Observations

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via microprocessors, Application Specific Integrated Circuits (ASICs), programmable logic controllers (PLCs), or programmable gate arrays (PGAs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multithreaded approach.

In addition, those skilled in the art will appreciate that the mechanisms taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as portable disks and memory, hard disk drives, CD/DVD ROMs, digital tape, computer memory, and other non-transitory computer-readable storage media.

The various embodiments described above can be combined to provide further embodiments. All patents and publications mentioned herein are hereby incorporated by reference in their entireties. Except as described herein, the embodiments, features, systems, devices, materials, methods and techniques described herein may, in some embodiments, be similar to any one or more of the embodiments, features, systems, devices, materials, methods and techniques described in U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,111; 5,433,100; 8,069,699; and in U.S. patent application Ser. Nos. 09/603,857; 10/726,809; 10/619,226; 10/633,294, 11/897,270; 61/592,419, and 61/592,500 which are incorporated herein by reference. In addition, the embodiments, features, systems, devices, materials, methods and techniques described herein may, in certain embodiments, be applied to or used in connection with any one or more of the embodiments, features, systems, devices, materials, methods and techniques disclosed in the incorporated U.S. patents and patent applications.

The information collected, tracked or discerned may allow separation of variations related to human (e.g., user or operator) performance from variations related to materials and/or tools. Such may be particularly useful in targeting remedial actions. Remedial actions may include training of individuals or groups, redesign or reengineering of processes, changing material procurement procedures, directives or specifications, or even suppliers or vendors. Remedial action may also include dynamically providing prompts (e.g., aural and/or visual and/or tactile) to the user or operator to make a change or adjustment. Such may be a simple as a feedback signal which simply indicates that an adjustment is needed. Such may be more sophisticated, for example providing specific direction or at least some insight into the needed adjustment. For example, an aural or visual prompt may instruct a user or operator to reinsert the expansion assembly, to insert the expansion assembly to a specific depth or to adjust the depth to be either deeper or shallower, to reorient the processing tool in some given direction, to reposition the processing tool in another hole, giving a position of the other hole, for example relative to a current position of the processing tool.

The various primary and/or secondary workpieces and consumable components disclosed herein may be formed through any suitable means. For example, the workpieces can be formed through injection molding, casting, rolling, forming, electrical discharge machining, other machining, and other methods disclosed herein. The various methods and techniques described above provide a number of ways to carry out the various embodiments. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and acts discussed above, as well as other known equivalents for each such feature or act, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A method of operating a system to process a number of workpieces, each having at least one hole, with a processing tool, the method comprising:
    sensing by a number of sensors a number of operational parameters of each of a number of operational cycles of processing respective ones of the holes in the number of workpieces;
    causing by at least one processor, storing of information to at least one nontransitory storage medium, the information indicative of characteristics of a number of manufacturing operations based on the sensed operational parameters, where the stored information represents a number of aspects of at least one of the processing or the materials and is stored to be retrievable on at least one of a hole-by-hole basis or a workpiece-by-workpiece basis,
    wherein the sensing by the at least one sensor includes sensing the reaction force resulting from contact directly or indirectly with an interior surface of a respective one of the holes, and further comprising:
    detecting by at least one processor an increase in the reaction force resulting from an initial contact of the segments directly or indirectly with the interior surface of the respective hole;
    determining an initial size of the respective hole in the workpiece based at least in part on the detection of the increase in reaction force;
    wherein causing storing of information to at least one nontransitory storage medium, includes causing storage of information indicative of the determined initial size of the respective hole retrievable on at least one of a hole-by-hole basis or a workpiece-by-workpiece basis, and
    controlling, by the processor, the processing tool based on the determined initial size of the respective hole.

2. The method of 1 wherein sensing a number of operational parameters of each of a number of operational cycles of processing respective ones of the holes in the number of workpieces includes sensing at least one of an applied force, a reaction force resulting from the applied force or an applied pressure.

3. The method of claim 1 wherein sensing a number of operational parameters of each of a number of operational cycles of processing respective ones of the holes in the number of workpieces includes sensing at least one of a position or an amount of travel of a drive member or a consumable expansion component physically detachably coupled to the processing tool.

4. The method of claim 1, further comprising:
    determining by at least one processor a value indicative of a yield strength of a material based at least in part on the sensed operational parameters; and
    wherein causing storing of information to at least one nontransitory storage medium, includes causing storage of information indicative of the determined yield strength of the material retrievable on at least one of a hole-by-hole basis or a workpiece-by-workpiece basis.

5. The method of claim 1, further comprising:
    reading information from a data carrier at least proximally associated with a respective one of the number of workpieces; and
    wherein causing storing of information to at least one nontransitory storage medium, includes causing storage of information read from the data carrier to be retrievable on at least one of a hole-by-hole basis or a workpiece-by-workpiece basis.

6. The method of claim 1, further comprising:
    reading information from a data carrier at least proximally associated with a respective one of the processing tools or a consumable component detachably coupleable to the processing tools; and
    wherein causing storing of information to at least one nontransitory storage medium, includes causing storage of information read from the data carrier to be retrievable on at least one of a hole-by-hole basis or a workpiece-by-workpiece basis.

7. The method of claim 1, further comprising:
    tracking of a sequence of operations executed by one of the processing tools in processing a respective one of the holes; and
    wherein causing storing of information to at least one nontransitory storage medium, includes causing storage of information that specifies the tracked sequence of operations executed by one of the processing tools in processing a respective one of the holes to be retrievable on at least one of a hole-by-hole basis or a workpiece-by-workpiece basis.

8. The method of claim 1, further comprising:
    determining an amount of travel of a drive member past a point of initial yield of a material; and
    wherein causing storing of information to at least one nontransitory storage medium, includes causing storage of information that specifies the determined amount of travel of the drive member past the point of initial yield of the material to be retrievable on at least one of a hole-by-hole basis or a workpiece-by-workpiece basis.

9. The method of any of claim 1, further comprising:
    determining a first slope of a first portion of a response relationship, the response relationship being a function of a value indicative of one of a position of or a distance of travel of a drive member relative to a value indicative of one of a pressure, an applied force, or a reaction force to the applied force, over at least a portion of an operational cycle for a respective one of the holes;

determining a second slope of a second portion of the response relationship; and wherein causing storing of information to at least one nontransitory storage medium, includes causing storage of information that specifies the determined first and the determined second slopes of the response relationship to be retrievable on at least one of a hole-by-hole basis or a workpiece-by-workpiece basis.

10. The method of claim 1, further comprising:
detecting an abnormality in processing a respective one of the holes; and
wherein causing storing of information to at least one nontransitory storage medium, includes causing storage of information that specifies at least the existence of the detected abnormality to be retrievable on at least one of a hole-by-hole basis or a workpiece-by-workpiece basis.

11. The method of claim 1, further comprising:
detecting an out of tolerance condition of at least one of the holes, the workpieces, the processing tools or a consumable component detachably physically coupleable to the processing tools; and
wherein causing storing of information to at least one nontransitory storage medium, includes causing storage of information that specifies at least an existence of the out of tolerance condition to be retrievable on at least one of a hole-by-hole basis or a workpiece-by-workpiece basis.

12. The method of claim 1, further comprising:
detecting by at least one sensor an orientation of the processing tool at a first time; and
wherein causing storing of information to at least one nontransitory storage medium, includes causing storage of information indicative of the detected orientation or a variance of the detected orientation from a defined orientation to be retrievable on a hole-by-hole basis or a processing tool user-by-processing tool user basis.

13. The method of claim 1 wherein storing information indicative of characteristics of a manufacturing operation includes storing the information to the at least one nontransitory storage medium which is collocated with a controller that controls operation of a respective one of the number of processing tools.

14. The method of claim 1 wherein storing information indicative of characteristics of a manufacturing operation includes storing the information to the at least one nontransitory storage medium which is collocated with a host system communicatively coupled to receive the information from a plurality of the number of processing tools.

15. The method of claim 1 wherein the processing tool is a handheld actuator and the expansion assembly is a consumable component detachably coupled thereto, and further comprising:
positioning at least a portion of the expansion assembly with respect to the first hole; and
activating a processing cycle to cold work the workpiece proximate the first hole.

16. The method of claim 1 wherein controlling the processing tool includes expanding at least a portion of an expansion assembly.

17. The method of claim 1 wherein controlling the processing tool includes retracting at least a portion of an expansion assembly.

18. The method of claim 1 wherein controlling the processing tool includes causing at least one of an alert discernible by a user of the processing tool to be produced or an alert to be electronically transmitted to a device remote from the processing tool.

19. A method of operating a system to process a number of workpieces, each having at least one hole, with a processing tool, the method comprising: sensing by a number of sensors a number of operational parameters of each of a number of operational cycles of processing respective ones of the holes in the number of workpieces;
causing by at least one processor, storing of information to at least one nontransitory storage medium, the information indicative of characteristics of a number of manufacturing operations based on the sensed operational parameters, where the stored information represents a number of aspects of at least one of the processing or the materials and is stored to be retrievable on at least one of a hole-by-hole basis or a workpiece-by-workpiece basis,
wherein determining by at least one processor a value indicative of a yield strength of a material based at least in part on the sensed operational parameters includes determining an inflection between a first portion of a response relationship and a second portion of the response relationship by the at least one processor, the response relationship being a function of a value indicative of one of the position of or the distance of travel of the drive member relative to a value indicative of one of the pressure, the reaction force, or the applied force over at least a portion of an operational cycle for the respective hole, and
controlling, by the processor, the processing tool based on the determined inflection.

20. A workpiece processing system for processing workpieces having holes, comprising:
a processing tool to process a workpiece having a number of holes;
an expansion assembly detachable physically coupled to the processing tool;
at least one sensor responsive to a number of operational parameters of each of a number of operational cycles of processing respective ones of the holes in the number of workpieces;
at least one nontransitory processor-readable medium; and
at least one processor communicatively coupled to at least one nontransitory processor-readable medium and the at least one sensor, the at least one processor which causes storage of information to at least one nontransitory storage medium, the information indicative of characteristics of a number of manufacturing operations based on the sensed operational parameters, where the stored information represents a number of aspects of at least one of the processing or the materials and is stored to be retrievable on at least one of a hole-by-hole basis or a workpiece-by-workpiece basis, wherein the at least one sensor is positioned to sense the reaction force resulting from contact directly or indirectly with an interior surface of a respective one of the holes, and the at least one processor is further configured to:
detect an increase in the reaction force resulting from an initial contact of the segments directly or indirectly with the interior surface of the respective hole;
determine an initial size of the respective hole in the workpiece based at least in part on the detection of the increase in reaction force; and cause storage of information to at least one nontransitory storage medium, including causing storage of information indicative of the determined initial size of the respective hole retrievable on at least one of a hole-by-hole basis or a workpiece-by-workpiece basis, and the at least one processor controls the processing tool based on the determined initial size of the respective hole.

21. The workpiece processing system of 20 wherein the at least one sensor is responsive to at least one of an applied force, a reaction force resulting from the applied force, an applied pressure, at least one of a position or an amount of travel of a drive member, or a position or an amount of travel of a consumable expansion component physically detachably coupled to the processing tool.

22. The workpiece processing system of 20 wherein the at least one processor is further configured to determine a value indicative of a yield strength of a material based at least in part on the sensed operational parameters, and to cause storage of information to at least one nontransitory storage medium including causing storage of information indicative of the determined yield strength of the material retrievable on at least one of a hole-by-hole basis or a workpiece-by-workpiece basis.

23. The workpiece processing system of claim 20, further comprising:
a reader operable to read information from a data carrier at least proximally associated with a respective one of the processing tools or a consumable component detachably coupleable to the processing tools, and wherein the at least one processor causes storage of information read from the data carrier to be retrievable on at least one of a hole-by-hole basis or a workpiece-by-workpiece basis.

24. The workpiece processing system of claim 20 wherein the at least one processor is further configured to:
track a sequence of operations executed by one of the processing tools in processing a respective one of the holes; and
cause storage of information to at least one nontransitory storage medium that specifies the tracked sequence of operations executed by one of the processing tools in processing a respective one of the holes to be retrievable on at least one of a hole-by-hole basis or a workpiece-by-workpiece basis.

25. The workpiece processing system of claim 20 wherein the at least one processor is further configured to:
determine an amount of travel of a drive member past a point of initial yield of a material; and
cause storage of information to at least one nontransitory storage medium that specifies the determined amount of travel of the drive member past the point of initial yield of the material to be retrievable on at least one of a hole-by-hole basis or a workpiece-by-workpiece basis.

26. The workpiece processing system of claim 20 wherein the at least one processor is further configured to:
determine a first slope of a first portion of a response relationship, the response relationship being a function of a value indicative of one of a position of or a distance of travel of a drive member relative to a value indicative of one of a pressure, an applied force, or a reaction force to the applied force, over at least a portion of an operational cycle for a respective one of the holes;

determine a slope of a second portion of the response relationship; and
cause storage of information to at least one nontransitory storage medium that specifies the determined first and the determined second slopes of the response relationship to be retrievable on at least one of a hole-by-hole basis or a workpiece-by-workpiece basis.

27. The workpiece processing system of claim 20 wherein the at least one processor is further configured to:
detect an abnormality in processing a respective one of the holes; and
cause storage of information to at least one nontransitory storage medium that specifies the detected abnormality to be retrievable on at least one of a hole-by-hole basis or a workpiece-by-workpiece basis.

28. The workpiece processing system of claim 20 wherein the at least one processor is further configured to:
detect an out of tolerance condition of at least one of the holes, the workpieces, the processing tools or a consumable component detachably physically coupleable to the processing tools; and
cause storage of information to at least one nontransitory storage medium that specifies at least the occurrence of the out of tolerance condition to be retrievable on at least one of a hole-by-hole basis or a workpiece-by-workpiece basis.

29. The workpiece processing system of claim 20 wherein the at least one sensor is responsive to an orientation of the processing tool, and the at least one processor is further configured to:
cause storage of information to at least one nontransitory storage medium indicative of the detected orientation or a variance of the detected orientation from a defined orientation to be retrievable on a hole-by-hole basis or a processing tool user-by-processing tool user basis.

30. The workpiece processing system of claim 20, further comprising:
at least one imager associated with the processing tool, the at least imager operated to capture a plurality of images during the operational cycle of processing respective ones of the holes in the number of workpieces by the processing tool, and wherein the at least one processor is configured to cause the storage of captured image data to at least one nontransitory storage medium, to be retrievable on at least one of a hole-by-hole basis or a workpiece-by-workpiece basis.

31. The workpiece processing system of claim 20 wherein to control the processing tool the at least one processor determines whether at least one of the sensed operation parameters satisfies a respective condition and in response to the sensed operational parameters satisfying the respective condition takes a first action and in response to the sensed operational parameters not satisfying the respective condition takes a second action, wherein to take the first action the at least one processor further expands the expansion assembly to cold work the workpiece proximate the hole and to take the second action the at least one processor retracts the expansion assembly.

32. The workpiece processing system of claim 31 wherein to take the second action the at least one processor causes at least one of an alert to be produced, the alert discernible by a user of the processing tool or an electronic transmission of an alert to a device remote from the processing tool.

* * * * *